(12) United States Patent
Flake et al.

(10) Patent No.: US 8,831,973 B2
(45) Date of Patent: Sep. 9, 2014

(54) SYSTEMS FOR REWARDING INFLUENCERS

(75) Inventors: Gary W. Flake, Bellevue, WA (US); William H. Gates, III, Redmond, WA (US); Alexander G. Gounares, Kirkland, WA (US); W. Daniel Hillis, Encino, CA (US); Royce A. Levien, Lexington, MA (US); Mark A. Malamud, Seattle, WA (US); Craig J. Mundie, Seattle, WA (US); Christopher D. Payne, Seattle, WA (US); Richard F. Rashid, Redmond, WA (US); Clarence T. Tegreene, Bellevue, WA (US); Charles Whitmer, North Bend, WA (US); Lowell L. Wood, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 383 days.

(21) Appl. No.: 12/290,675

(22) Filed: Oct. 31, 2008

(65) Prior Publication Data

US 2009/0248493 A1    Oct. 1, 2009

Related U.S. Application Data

(63) Continuation-in-part of application No. 11/799,460, filed on Apr. 30, 2007, and a continuation-in-part of application No. 11/811,349, filed on Jun. 7, 2007, and a continuation-in-part of application No. 11/799,461, filed on Apr. 30, 2007, and a continuation-in-part of application No. 11/811,402, filed on Jun. 8, 2007, and a continuation-in-part of application No. 11/824,551, filed on Jun. 29, 2007, and a continuation-in-part of application No. 11/824,582, filed on Jun. 29, 2007, and a continuation-in-part of application No. 11/906,537, filed on Oct. 1, 2007, and a continuation-in-part of application No. 11/824,580, filed on Jun. 29, 2007, and a continuation-in-part of application No. 11/881,800, filed on Jul. 27, 2007, now Pat. No. 8,712,837, and a continuation-in-part of application No. 11/906,780, filed on Oct. 2, 2007, and a continuation-in-part of application No. 12/290,310, filed on Oct. 28, 2008.

(51) Int. Cl.
*G06Q 30/00* (2012.01)
*G06Q 90/00* (2006.01)

(52) U.S. Cl.
CPC ..................................... *G06Q 90/00* (2013.01)
USPC ....................................................... 705/14.1

(58) Field of Classification Search
CPC ....................................................... G06Q 90/00
USPC ....................................................... 705/14.1
See application file for complete search history.

(56) References Cited

U.S. PATENT DOCUMENTS

| 4,870,591 A | 9/1989 | Cicciarelli et al. |
| 4,961,224 A | 10/1990 | Yung |

(Continued)

OTHER PUBLICATIONS

U.S. Appl. No. 12/660,799, Flake et al.

(Continued)

*Primary Examiner* — Daniel Lastra

(57) ABSTRACT

The present disclosure relates generally to systems for rewarding influencers in a Web 2.0 environment. More specifically, in some implementations, a system is configured to assess an influence of an electronically-accessed content on an involvement between an accessor and a third party, and may also be configured to facilitate a reward to one or more influencers based on one or more assessed influences.

57 Claims, 45 Drawing Sheets

(56) References Cited

U.S. PATENT DOCUMENTS

| | | | |
|---|---|---|---|
| 4,962,532 | A | 10/1990 | Kasiraj et al. |
| 5,884,270 | A | 3/1999 | Walker et al. |
| 5,933,811 | A | 8/1999 | Angles et al. |
| 6,041,326 | A | 3/2000 | Amro et al. |
| 6,061,692 | A | 5/2000 | Thomas et al. |
| 6,061,789 | A | 5/2000 | Hauser et al. |
| 6,129,276 | A | 10/2000 | Jelen et al. |
| 6,735,601 | B1 | 5/2004 | Subrahmanyam |
| 6,873,314 | B1 | 3/2005 | Campbell |
| 6,886,000 | B1 | 4/2005 | Aggarwal et al. |
| 6,961,562 | B2 | 11/2005 | Ross |
| 7,143,075 | B1 | 11/2006 | Chickering et al. |
| 7,269,664 | B2 | 9/2007 | Hutsch et al. |
| 7,516,094 | B2 | 4/2009 | Perkowski |
| 7,627,660 | B2 | 12/2009 | Naitoh |
| 7,769,626 | B2 | 8/2010 | Reynolds |
| 7,797,204 | B2 | 9/2010 | Balent |
| 7,818,399 | B1 | 10/2010 | Ross, Jr. et al. |
| 7,933,956 | B2 | 4/2011 | Hon et al. |
| 7,966,369 | B1 | 6/2011 | Briere et al. |
| 7,996,256 | B1 | 8/2011 | Anand et al. |
| 8,005,697 | B1 | 8/2011 | Cohen et al. |
| 8,013,729 | B2 | 9/2011 | Buehler |
| 2001/0032210 | A1 | 10/2001 | Frank et al. |
| 2001/0042064 | A1 | 11/2001 | Davis et al. |
| 2001/0049681 | A1 | 12/2001 | Bova |
| 2001/0052761 | A1 | 12/2001 | Taniguchi et al. |
| 2002/0004727 | A1 | 1/2002 | Knaus et al. |
| 2002/0010679 | A1 | 1/2002 | Felsher |
| 2002/0055909 | A1 | 5/2002 | Fung et al. |
| 2002/0103789 | A1 | 8/2002 | Turnbull et al. |
| 2003/0009451 | A1 | 1/2003 | Bates et al. |
| 2003/0014331 | A1 | 1/2003 | Simons |
| 2003/0055723 | A1 | 3/2003 | English |
| 2003/0182162 | A1 | 9/2003 | Stevens |
| 2003/0187739 | A1 | 10/2003 | Powers |
| 2003/0220837 | A1 | 11/2003 | Asayama |
| 2003/0220844 | A1 | 11/2003 | Marnellos et al. |
| 2003/0233278 | A1 | 12/2003 | Marshall |
| 2004/0073570 | A1 | 4/2004 | Janakiraman et al. |
| 2005/0137939 | A1 | 6/2005 | Calabria et al. |
| 2005/0234917 | A1 | 10/2005 | Branham et al. |
| 2006/0116926 | A1* | 6/2006 | Chen ............... 705/14 |
| 2006/0155842 | A1 | 7/2006 | Yeung et al. |
| 2006/0161553 | A1 | 7/2006 | Woo |
| 2006/0282328 | A1 | 12/2006 | Gerace et al. |
| 2006/0287916 | A1 | 12/2006 | Starr et al. |
| 2006/0293951 | A1 | 12/2006 | Patel et al. |
| 2007/0038516 | A1 | 2/2007 | Apple et al. |
| 2007/0067215 | A1* | 3/2007 | Agarwal et al. ........... 705/14 |
| 2007/0083640 | A1 | 4/2007 | Wagner et al. |
| 2007/0198339 | A1 | 8/2007 | Shen et al. |
| 2007/0244914 | A1 | 10/2007 | Kreiner |
| 2007/0258460 | A1 | 11/2007 | Momtahan et al. |
| 2007/0265918 | A1 | 11/2007 | McMahon et al. |
| 2008/0306820 | A1 | 12/2008 | Passmore |
| 2009/0282052 | A1 | 11/2009 | Evans et al. |

OTHER PUBLICATIONS

Carson, Mel; "Microsoft LookingGlass Helps Businesses Catch the Social Media Wave at Advertising Week 2009"; Microsoft Advertising Blog; bearing a date of Sep. 23, 2009; located at: http://community.microsoftadvertising.com/Blogs/Advertising/archive/2009/09/23/microsoft-lookingglass-helps-businesses-catch-the-social-media-wave-at-advertising-week-2009.aspx; printed on Apr. 22, 2011; 10 pages.

Croft, Ali et al.; "e-bay Social Media Case Study"; bearing a date of Oct. 21, 2010; located at: http://www.slideshare.net/influencepeoples/ali-croft-monitoring-social-media- ebay; printed on Apr. 22, 2011; 3 pages.

"Harkable: The Influencer Community"; bearing a date of 2011; located at: http://www.harkable.com/; printed on Apr. 22, 2011; 1 page.

"Klout identifies influencers on topics across the social web"; located at: http://klout.com/; printed on Apr. 22, 2011; 1 page.

"Meteor: Word-of-Mouth Analytics & Optimization"; located at: https://www.meteorsolutions.com/products.php?fbid=p-9xahc1KYK&wom=true; printed on Apr. 22, 2011; 2 pages.

ObjectiveMarketer; "How it works"; located at: http://objectivemarketer.com/objectivemarketer/how-it-works.html; printed on Apr. 22, 2011; 2 pages; ObjectiveMarketer.

Radian6; "Uncover Influencers"; bearing a date of 2011; located at: http://www.radian6.com/products/applications/uncover-influencers/; printed on Apr. 22, 2011; 7 pages.

Rao, Leena; "Social Influence Measurement Startup Klout Passes 2K API Partners" ; bearing a date of Apr. 13, 2011; located at http://techcrunch.com/2011/04/13/social-influence-measurement-startup-klout-passes-2k-api-partners/; printed on Apr. 22, 2011; 1 page; TechCrunch.

"Salesforce for Twitter and Facebook (v4)"; bearing a date of Jul. 15, 2010; located at: http://appexchange.salesforce.com/listingDetail?listingId=a0N30000003HpEQEA0; printed on Apr. 22, 2011; 1 page; Salesforce.com, Inc.

"Service Cloud"; located at: http://www.salesforce.com/crm/customer-service-support/; printed on Apr. 22, 2011; 2 pages; Salesforce.com, Inc.

"Social Analytics for Marketers: Passionate about Influencers and High Tech Datamining"; located at: http://www.peoplebrowsr.com/; printed on Apr. 22, 2011; 2 pages; PeopleBrowsr.

"Social CRM"; located at: http://www.salesforce.com/crm/customer-service-support/social-networking/; printed on Apr. 22, 2011; 2 pages; Salesforce.com, Inc.

"Social Eyez"; bearing a date of 2010; located at: http://www.socialeyez.ae/index.htm; printed on Apr. 22, 2011; 1 page; Social Eyez.

"Social Media Monitoring and Analysis with Alterian SM2"; located at: http://socialmedia.alterian.com/; printed on Apr. 22, 2011; 6 pages.

"Social media reputation"; located at: http://www.mysocialmediareputation.com/; printed on Apr. 22, 2011; 1 page; Yomego.

"Socialseek: social goodness all in one place"; bearing a date of 2011; located at: http://socialseek.com/; printed on Apr. 22, 2011; 1 page; Sensidea Corp.

Viralheat; "Human intent identified: using advanced algorithms, see who is about to purchase products or services. Reach out. Create relationships. Make sales. The future of social media analytics is here"; located at: http://www.viralheat.com/; printed on Apr. 22, 2011; 2 pages.

Wauters, Robin.; "Salesforce Buys Social Media Monitoring Company Radian6 for $326 Million"; bearing a date of Mar. 30, 2011; located at: http://techcrunch.com/2011/03/30/salesforce-buys-social-media-monitoring-company-radian6-for-326-million/; printed on Apr. 22, 2011; 3 pages.

"Yomego—the social media agency"; located at: http://www.yomego.com/; printed on Apr. 22, 2011; 3 pages; Yomego.

Yomego Social; "How are global brands managing their international audience on Facebook?"; bearing a date of Apr. 21, 2011; located at: http://blog.yomego.com/2011/04/how-are-global-brands-managing-their.html; printed on Apr. 22, 2011; 3 pages; Yomego.

Zaihan Yang and Chengfei Liu, Implementing a Flexible Compensation Mechanism for Business Processes in Web Service Environment, IEEE International Conference on Web Services (ICWS'06)—Jan. 2006.

Palamida, Security Implications of Web 2.0 Services, www.palamida.com—Mar. 2008.

Cisco, Web 2.0 in the Enterprise Cisco IT helps to build a scalable, secure communications and collaboration platform, Cisco on Cisco: Inside Cisco IT Trends in IT—Mar. 2008.

Claye Stokes, Small Business Web Design Guide—Part I, www.clayestokes.com—Jul. 16, 2008.

Dustin Whittle, Yahoo, Web 2.0 Expo—printed on Nov. 19, 2008.

Jesse James Garrett, Ajax: A New Approach to Web Applications Recent, http://adaptivepath.com/ideas/essays/archives/000385.php—Feb. 18, 2005.

(56) References Cited

OTHER PUBLICATIONS

William White, RIA Applications and the Web Presentation, Yahoo! Media Innovation Group—printed on Nov. 19, 2008.

Philip McCarthy, Software development consultant, Independent, Ajax for Java developers: Build dynamic Java applications, http://www-128.ibm.com/developerworks/library/j-ajax1—Sep. 20, 2005.

Dion Hinchcliffe, Building Next Generation Web 2.0 Applications, www.web20university.com—Apr. 2008.

James Snell, Call Soap Web Services with Ajax Part 1: Build the Web Services Client, http://www-128.ibm.com/developerworks/webservices/library/ws-wsajax—Sep. 18, 2008.

Paul Hammond and Simon Wilson, d.Construct 2006, http://www.paulhammond.org/2006/dconstruct—Sep. 8, 2006.

Steven Webster, Macromedia Flash MX Professional 2004, http://store2.adobe.com/devnet/flash/articles/ria_dataservices.html—Sep. 18, 2008.

Aral Balkan, Mash my Flex up, aralbalkan.com—printed on Nov. 19, 2008.

O'Reilly Media Inc., Mastering Ajax, Part 1: Introduction to Ajax, http://www.ibm.com/developerworks/web/library/wa-ajaxintro1.html—Dec. 6, 2005.

O'Reilly Media Inc., Mastering Ajax, Part 2: Make asynchronous requests with JavaScript and Ajax, http://www-128.ibm.com/developerworks/java/library/wa-ajaxintro2/index.html—Jan. 17, 2006.

Jesse James Garrett, OK/Cancel, http://www.ok-cancel.com/archives/article/2005/09/why-ajax-matters-now.html—Sep. 16, 2005.

Tim O'Reilly, What is Web 2.0, http://r2computing.blogspot.com/2008/04/web-20-democracy-of-ideas.html—Sep. 30, 2005.

O'Reilly Media, Spreading the knowledge of innovators—printed on Nov. 19, 2008.

Satayam, Service-Oriented Architecture (SOA)—2008.

Karl Bishop and Doug Phillips, Using Ajax with WebSphere Portal, http://www.ibm.com/developerworks/websphere/library/techarticles/0606_bishop/0606_bishop.html—Jun. 28, 2006.

O'R Eilly Radar, Web 2.0 Principles and Best Practices, Tim O'Reilly, Executive Summary—Fall 2006.

James Snell, Call SOAP Web services with Ajax, Part 1: Build the Web services client, ibm.com/developerWorks—Oct. 11, 2005.

Microsoft Corporation, XML Developer Center, http://msdn.microsoft.com/en-us/xml/default.aspx—printed on Nov. 19, 2008.

Philip McCarthy, Software development consultant, Independent, Ajax for Java developers: Build dynamic Java applications, http://www-128.ibm.com/developerworks/library/j-ajax2—Oct. 4, 2005.

\* cited by examiner

SYSTEMS FOR REWARDING INFLUENCERS

CROSS REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)):

RELATED APPLICATIONS

For purposes of the United States Patent and Trademark Office (USPTO) extra-statutory requirements (described more fully below), the present application constitutes:

1. A continuation-in-part application of U.S. patent application Ser. No. 11/799,460 entitled REWARDING INFLUENCERS, naming Gary W. Flake, William H. Gates, III, Alexander G. Gounares, W. Daniel Hillis, Royce A. Levien, Mark A. Malamud, Craig J. Mundie, Christopher D. Payne, Richard F. Rashid, Clarence T. Tegreene, Charles Whitmer, and Lowell L. Wood, Jr. as inventors, filed 30 Apr., 2007, which is currently co-pending, or is an application of which a currently co-pending application is entitled to the benefit of the filing date.

2. A continuation-in-part application of U.S. patent application Ser. No. 11/811,349 entitled REWARDING INFLUENCERS, naming Gary W. Flake, William H. Gates, III, Alexander G. Gounares, W. Daniel Hillis, Royce A. Levien, Mark A. Malamud, Craig J. Mundie, Christopher D. Payne, Richard F. Rashid, Clarence T. Tegreene, Charles Whitmer, and Lowell L. Wood, Jr. as inventors, filed 7 Jun., 2007, which is currently co-pending, or is an application of which a currently co-pending application is entitled to the benefit of the filing date.

3. A continuation-in-part application of U.S. patent application Ser. No. 11/799,461 entitled DETERMINING INFLUENCERS, naming Gary W. Flake, William H. Gates, III, Alexander G. Gounares, W. Daniel Hillis, Royce A. Levien, Mark A. Malamud, Craig J. Mundie, Christopher D. Payne, Richard F. Rashid, Clarence T. Tegreene, Charles Whitmer, and Lowell L. Wood, Jr. as inventors, filed 30 Apr., 2007, which is currently co-pending, or is an application of which a currently co-pending application is entitled to the benefit of the filing date.

4. A continuation-in-part application of U.S. patent application Ser. No. 11/811,402 entitled DETERMINING INFLUENCERS, naming Gary W. Flake, William H. Gates, III, Alexander G. Gounares, W. Daniel Hillis, Royce A. Levien, Mark A. Malamud, Craig J. Mundie, Christopher D. Payne, Richard F. Rashid, Clarence T. Tegreene, Charles Whitmer, and Lowell L. Wood, Jr. as inventors, filed 8 Jun., 2007, which is currently co-pending, or is an application of which a currently co-pending application is entitled to the benefit of the filing date.

5. A continuation-in-part application of U.S. patent application Ser. No. 11/824,551 entitled REPORTING INFLUENCE ON A PERSON BY NETWORK-AVAILABLE CONTENT filed Jun. 29, 2007, which is currently co-pending, or is an application of which a currently co-pending application is entitled to the benefit of the filing date.

6. A continuation-in-part application of U.S. patent application Ser. No. 11/824,582 entitled COLLECTING INFLUENCE INFORMATION, naming Gary W. Flake, William H. Gates, III, Alexander G. Gounares, W. Daniel Hillis, Royce A. Levien, Mark A. Malamud, Craig J. Mundie, Christopher D. Payne, Richard F. Rashid, Clarence T. Tegreene, Charles Whitmer, and Lowell L. Wood, Jr. as inventors, filed 29 Jun., 2007, which is currently co-pending, or is an application of which a currently co-pending application is entitled to the benefit of the filing date.

7. A continuation-in-part application of U.S. patent application Ser. No. 11/906,537 entitled COLLECTING INFLUENCE INFORMATION, naming Gary W. Flake, William H. Gates, III, Alexander G. Gounares, W. Daniel Hillis, Royce A. Levien, Mark A. Malamud, Craig J. Mundie, Christopher D. Payne, Richard F. Rashid, Clarence T. Tegreene, Charles Whitmer, and Lowell L. Wood, Jr. as inventors, filed 1 Oct., 2007, which is currently co-pending, or is an application of which a currently co-pending application is entitled to the benefit of the filing date.

8. A continuation-in-part application of U.S. patent application Ser. No. 11/824,580 entitled DETERMINING AN INFLUENCE ON A PERSON BY WEB PAGES, naming Gary W. Flake, William H. Gates, III, Alexander G. Gounares, W. Daniel Hillis, Royce A. Levien, Mark A. Malamud, Craig J. Mundie, Christopher D. Payne, Richard F. Rashid, Clarence T. Tegreene, Charles Whitmer, and Lowell L. Wood, Jr. as inventors, filed 29 Jun., 2007, which is currently co-pending, or is an application of which a currently co-pending application is entitled to the benefit of the filing date.

9. A continuation-in-part application of U.S. patent application Ser. No. 11/881,800 entitled REWARDING INDEPENDENT INFLUENCERS, naming Gary W. Flake, William H. Gates, III, Alexander G. Gounares, W. Daniel Hillis, Royce A. Levien, Mark A. Malamud, Craig J. Mundie, Christopher D. Payne, Richard F. Rashid, Clarence T. Tegreene, Charles Whitmer, and Lowell L. Wood, Jr. as inventors, filed 27 Jul., 2007, which is currently co-pending, or is an application of which a currently co-pending application is entitled to the benefit of the filing date.

10. A continuation-in-part application of U.S. patent application Ser. No. 11/906,780 entitled REWARDING INDEPENDENT INFLUENCERS, naming Gary W. Flake, William H. Gates, III, Alexander G. Gounares, W. Daniel Hillis, Royce A. Levien, Mark A. Malamud, Craig J. Mundie, Christopher D. Payne, Richard F. Rashid, Clarence T. Tegreene, Charles Whitmer, and Lowell L. Wood, Jr. as inventors, filed 2 Oct., 2007, which is currently co-pending, or is an application of which a currently co-pending application is entitled to the benefit of the filing date.

A continuation-in-part application of U.S. patent application Ser. No. 12/290,310 entitled REWARDING INFLUENCERS, naming Gary W. Flake, William H. Gates, III, Alexander G. Gounares, W. Daniel Hillis, Royce A. Levien, Mark A. Malamud, Craig J. Mundie, Christopher D. Payne, Richard F. Rashid, Clarence T. Tegreene, Charles Whitmer, and Lowell L. Wood, Jr. as inventors, filed 28 Oct., 2008, which is currently co-pending, or is an application of which a currently co-pending application is entitled to the benefit of the filing date.

The United States Patent and Trademark Office (USPTO) has published a notice to the effect that the USPTO's computer programs require that patent applicants both reference a serial number and indicate whether an application is a continuation or continuation in part. Stephen G. Kunin, Benefit of Prior-Filed Application, USPTO Electronic Official Gazette, Mar. 18, 2003. The present applicant entity has provided a specific reference to the application(s) from which priority is being claimed as recited by statute. Applicant entity understands that the statute is unambiguous in its specific reference language and does not require either a serial number or any characterization such as "continuation" or "continuation-in-part." Notwithstanding the foregoing, applicant entity understands that the USPTO's computer programs have certain data entry requirements, and hence applicant entity is designating the present application as a continuation in part of its parent applications, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

FIELD OF THE DISCLOSURE

The present disclosure relates generally to systems for rewarding influencers in a Web 2.0 environment. More specifically, in some implementations, a system is configured to assess an influence of an electronically-accessed content on an involvement between an accessor and a third party, and may also be configured to facilitate a reward to one or more influencers based on one or more assessed influences.

BACKGROUND

As the communication network commonly known as the Web (or Internet) continues to evolve, contemporary web development efforts are being directed toward improved Web-based applications that improve user interaction, functionality, and utility. These development efforts, widely referred to as "Web 2.0," are leading to a surge of innovation and are resulting in a rapid evolution of the means through which electronic content is being provided and accessed on the Web. While desirable results are being achieved, there remains a need to incentivize providers of electronically accessed content.

SUMMARY

The present disclosure relates generally to rewarding influencers, and more specifically, to assessing an influence of an electronically accessed content on an involvement between an accessor and a third party. In some implementations, the assessment of the influence may be performed in a Web 2.0 environment, and a provider of the electronically accessed content may be rewarded based on the assessed influence.

DETAILED DESCRIPTION

Techniques for rewarding influencers, and more specifically, for assessing an influence of an electronically accessed content on an involvement between an accessor and a third party, are disclosed. It should be appreciated that many specific details of certain implementations are set forth in the following description, and in FIGS. 1 through 47 to provide a thorough understanding of such implementations. One skilled in the art will understand from the teachings of the present disclosure, however, that the present disclosure may have other possible implementations, and that such other implementations may be practiced with/without some of the details set forth in the following description.

Exemplary Systems and Environments

Exemplary systems and environments in which various implementations in accordance with the present disclosure may be implemented are described in this section with reference to FIGS. 1 through 4. It will be appreciated, however, that the following description of exemplary systems and environments is not exhaustive of all possible environments in which the teachings of the present disclosure may be implemented.

Figure 1:
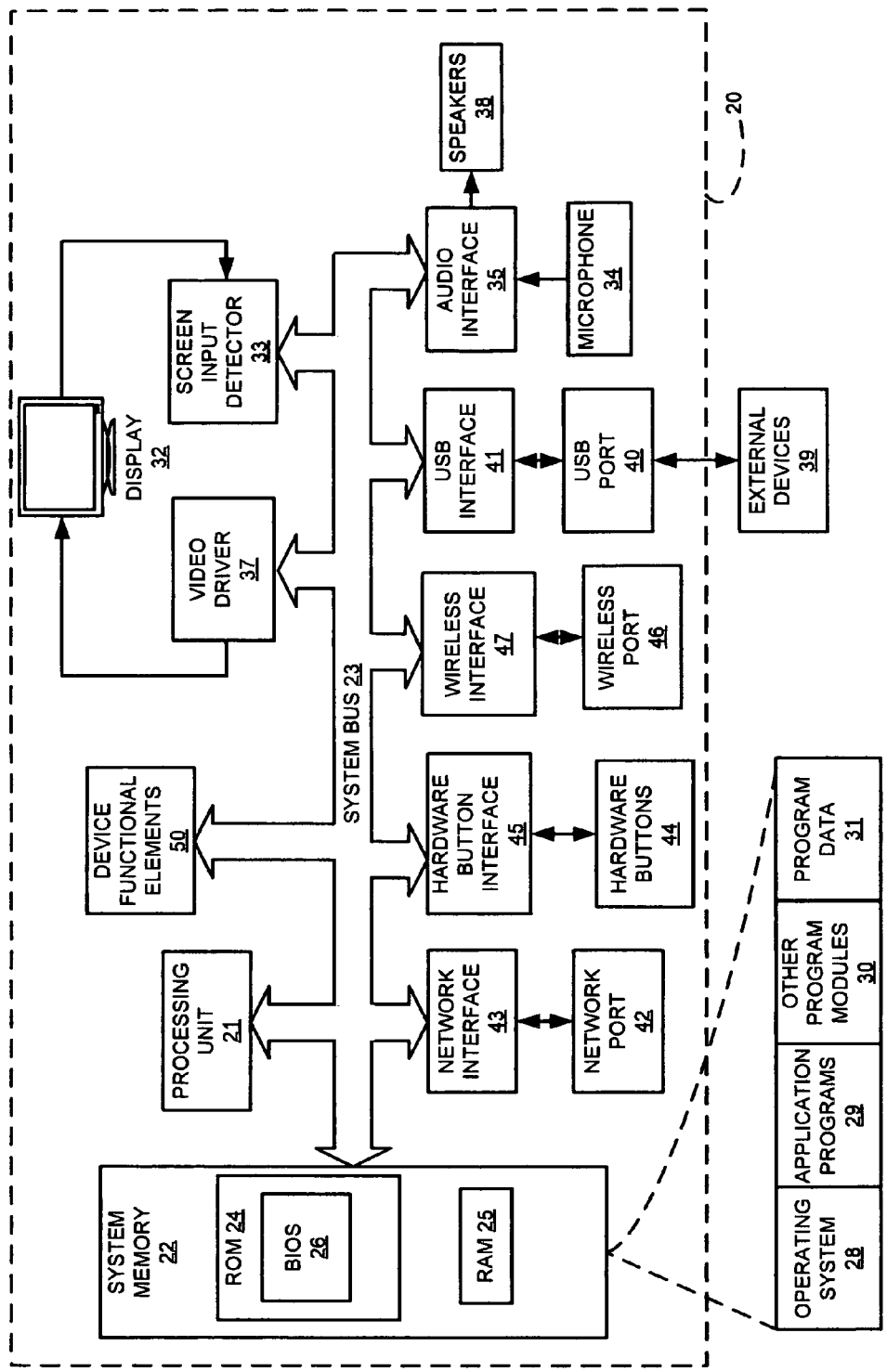
FIG. 1 illustrates an exemplary embodiment of a thin computing device in which embodiments may be implemented.

For example, FIG. 1 illustrates an exemplary system that includes a thin computing device 20, which may be included in an electronic device that also includes a device functional element 50. For example, the electronic device may include any item having electrical and/or electronic components playing a role in a functionality of the item, such as a limited resource computing device, an electronic pen, a handheld electronic writing device, a digital camera, a scanner, an ultrasound device, an x-ray machine, a non-invasive imaging device, a cell phone, a printer, a refrigerator, a car, and an airplane. The thin computing device 20 includes a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system (BIOS) 26, containing the basic routines that help to transfer information between sub-components within the thin computing device 20, such as during start-up, is stored in the ROM 24. A number of program modules may be stored in the ROM 24 and/or RAM 25, including an operating system 28, one or more application programs 29, other program modules 30 and program data 31.

A user may enter commands and information into the computing device 20 through input devices, such as a number of switches and buttons, illustrated as hardware buttons 44, connected to the system via a suitable interface 45. Input devices may further include a touch-sensitive display screen 32 with suitable input detection circuitry 33. The output circuitry of the touch-sensitive display 32 is connected to the system bus 23 via a video driver 37. Other input devices may include a microphone 34 connected through a suitable audio interface 35, and a physical hardware keyboard (not shown). In addition to the display 32, the computing device 20 may include other peripheral output devices, such as at least one speaker 38.

Other external input or output devices 39, such as a joystick, game pad, satellite dish, scanner or the like may be connected to the processing unit 21 through a USB port 40 and USB port interface 41, to the system bus 23. Alternatively, the other external input and output devices 39 may be connected by other interfaces, such as a parallel port, game port or other port. The computing device 20 may further include or be capable of connecting to a flash card memory (not shown) through an appropriate connection port (not shown). The computing device 20 may further include or be capable of connecting with a network through a network port 42 and network interface 43, and through wireless port 46 and corresponding wireless interface 47 which may be provided to facilitate communication with other peripheral devices, including other computers, printers, and so on (not shown). It will be appreciated that the various components and connections shown are exemplary and other components and means of establishing communications links may be used.

The computing device 20 may be primarily designed to include a user interface. The user interface may include a character, a key-based, and/or another user data input via the touch sensitive display 32. The user interface may include using a stylus (not shown). Moreover, the user interface is not limited to an actual touch-sensitive panel arranged for directly receiving input, but may alternatively or in addition respond to another input device such as the microphone 34. For example, spoken words may be received at the microphone 34 and recognized. Alternatively, the computing device 20 may be designed to include a user interface having a physical keyboard (not shown).

The device functional elements 50 are typically application specific and related to a function of the electronic device, and are coupled with the system bus 23 through an interface (not shown). The functional elements may typically perform a single well-defined task with little or no user configuration or setup, such as a refrigerator keeping food cold, a cell phone connecting with an appropriate tower and transceiving voice or data information, and a camera capturing and saving an image.

Figure 2:
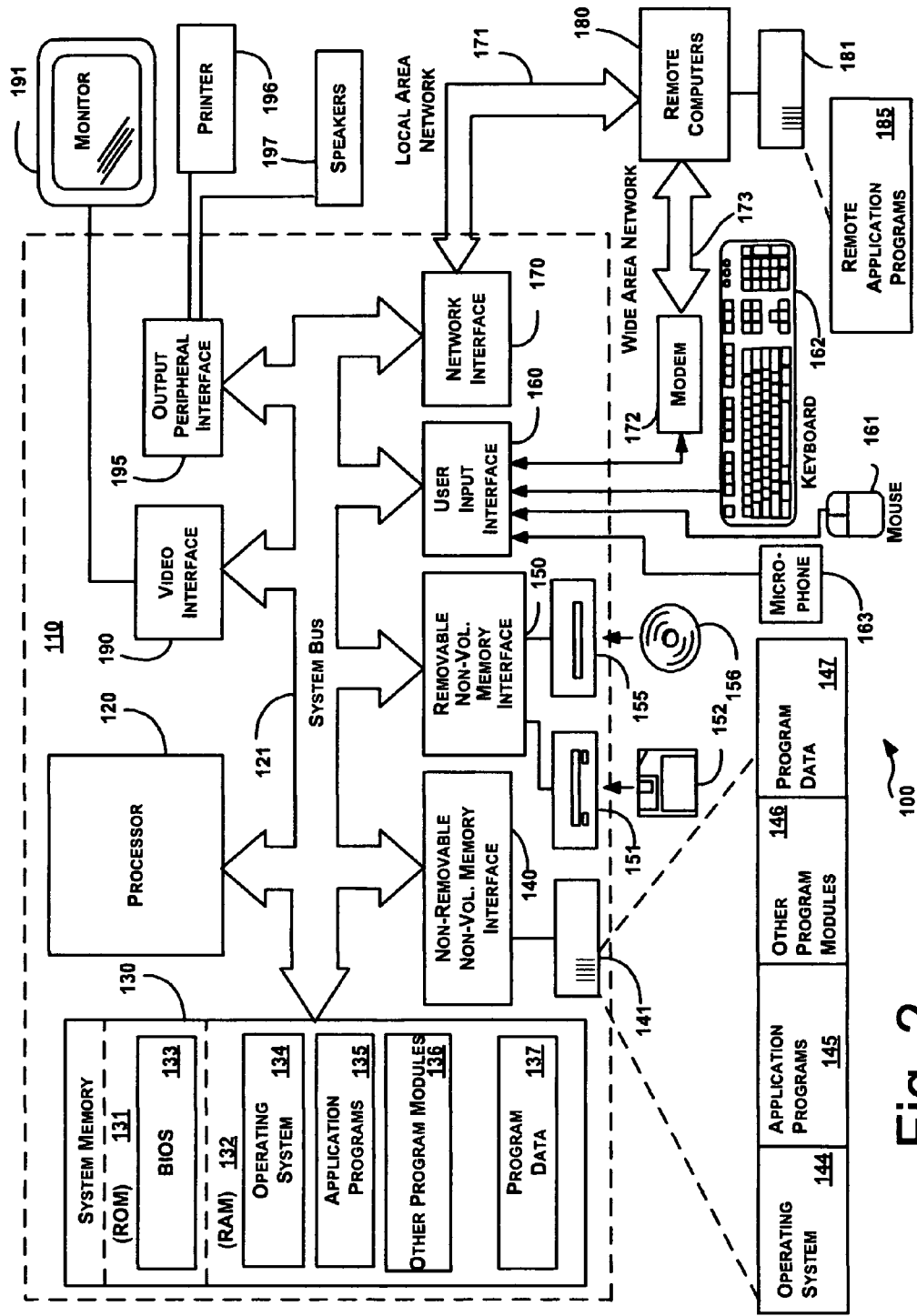
FIG. 2 illustrates an exemplary embodiment of a general-purpose computing system in which embodiments may be implemented.

FIG. 2 illustrates an exemplary embodiment of a general-purpose computing system in which embodiments may be implemented, shown as a computing system environment 100. Components of the computing system environment 100 may include, but are not limited to, a computing device 110 having a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

The computing system environment 100 typically includes a variety of computer-readable media products. Computer-readable media may include any media that can be accessed by the computing device 110 and include both volatile and nonvolatile media, removable and non-removable media. By way of example, and not of limitation, computer-readable media may include computer storage media and communications media. Computer storage media includes volatile and nonvolatile, removable and non-removable media implemented in any method or technology for storage of information such as computer-readable instructions, data structures, program modules, or other data. Computer storage media includes, but is not limited to, random-access memory (RAM), read-only memory (ROM), electrically erasable programmable read-only memory (EEPROM), flash memory, or other memory technology, CD-ROM, digital versatile disks (DVD), or other optical disk storage, magnetic cassettes, magnetic tape, magnetic disk storage, or other magnetic storage devices, or any other medium which can be used to store the desired information and which can be accessed by the computing device 110. In a further embodiment, a computer storage media may include a group of computer storage media devices. In another embodiment, a computer storage media may include an information store. In another embodiment, an information store may include a quantum memory, a photonic quantum memory, and/or atomic quantum memory. Combinations of any of the above may also be included within the scope of computer-readable media.

Communications media may typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media such as a wired network and a direct-wired connection and wireless media such as acoustic, RF, optical, and infrared media.

The system memory 130 includes computer storage media in the form of volatile and nonvolatile memory such as ROM 131 and RAM 132. A RAM may include at least one of a DRAM, an EDO DRAM, a SDRAM, a RDRAM, a VRAM, and/or a DDR DRAM. A basic input/output system (BIOS) 133, containing the basic routines that help to transfer information between elements within the computing device 110, such as during start-up, is typically stored in ROM 131. RAM 132 typically contains data and program modules that are immediately accessible to or presently being operated on by processing unit 120. By way of example, and not limitation, FIG. 2 illustrates an operating system 134, application programs 135, other program modules 136, and program data 137. Often, the operating system 134 offers services to applications programs 135 by way of one or more application programming interfaces (APIs) (not shown). Because the operating system 134 incorporates these services, developers of applications programs 135 need not redevelop code to use the services. Examples of APIs provided by operating systems such as Microsoft's "WINDOWS" are well known in the art.

The computing device 110 may also include other removable/non-removable, volatile/nonvolatile computer storage media products. By way of example only, FIG. 2 illustrates a non-removable non-volatile memory interface (hard disk interface) 140 that reads from and writes for example to non-removable, non-volatile magnetic media. FIG. 2 also illustrates a removable non-volatile memory interface 150 that, for example, is coupled to a magnetic disk drive 151 that reads from and writes to a removable, non-volatile magnetic disk 152, and/or is coupled to an optical disk drive 155 that reads from and writes to a removable, non-volatile optical disk 156, such as a CD ROM. Other removable/nonremovable, volatile/non-volatile computer storage media that can be used in the exemplary operating environment include, but are not limited to, magnetic tape cassettes, memory cards, flash memory cards, DVDs, digital video tape, solid state RAM, and solid state ROM. The hard disk drive 141 is typically connected to the system bus 121 through a non-removable memory interface, such as the interface 140, and magnetic disk drive 151 and optical disk drive 155 are typically connected to the system bus 121 by a removable non-volatile memory interface, such as interface 150.

The drives and their associated computer storage media discussed above and illustrated in FIG. 2 provide storage of computer-readable instructions, data structures, program modules, and other data for the computing device 110. In FIG. 2, for example, hard disk drive 141 is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers here to illustrate that, at a minimum, they are different copies. A user may enter commands and information into the computing device 110 through input devices such as a microphone 163, keyboard 162, and pointing device 161, commonly referred to as a mouse, trackball, or touch pad. Other input devices (not shown) may include a joystick, game pad, satellite dish, and scanner. These and other input devices are often connected to the processing unit 120 through a user input interface 160 that is coupled to the system bus, but may be connected by other interface and bus structures, such as a parallel port, game port, or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computing system environment 100 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computing device 110, although only a memory storage device 181 has been illustrated in FIG. 2. The logical connections depicted in FIG. 2 include a local area network (LAN) 171 and a wide area network (WAN) 173, but may also include other networks such as a personal area network (PAN) (not shown). Such networking environments are commonplace in offices, enterprise-wide computer networks, intranets, and the Internet.

When used in a LAN networking environment, the computing system environment 100 is connected to the LAN 171 through a network interface or adapter 170. When used in a WAN networking environment, the computing device 110 typically includes a modem 172 or other means for establishing communications over the WAN 173, such as the Internet. The modem 172, which may be internal or external, may be connected to the system bus 121 via the user input interface 160, or via another appropriate mechanism. In a networked environment, program modules depicted relative to the computing device 110, or portions thereof, may be stored in a remote memory storage device. By way of example, and not limitation, FIG. 2 illustrates remote application programs 185 as residing on computer storage medium 181. It will be appreciated that the network connections shown are exemplary and other means of establishing communications link between the computers may be used.

Figure 3:
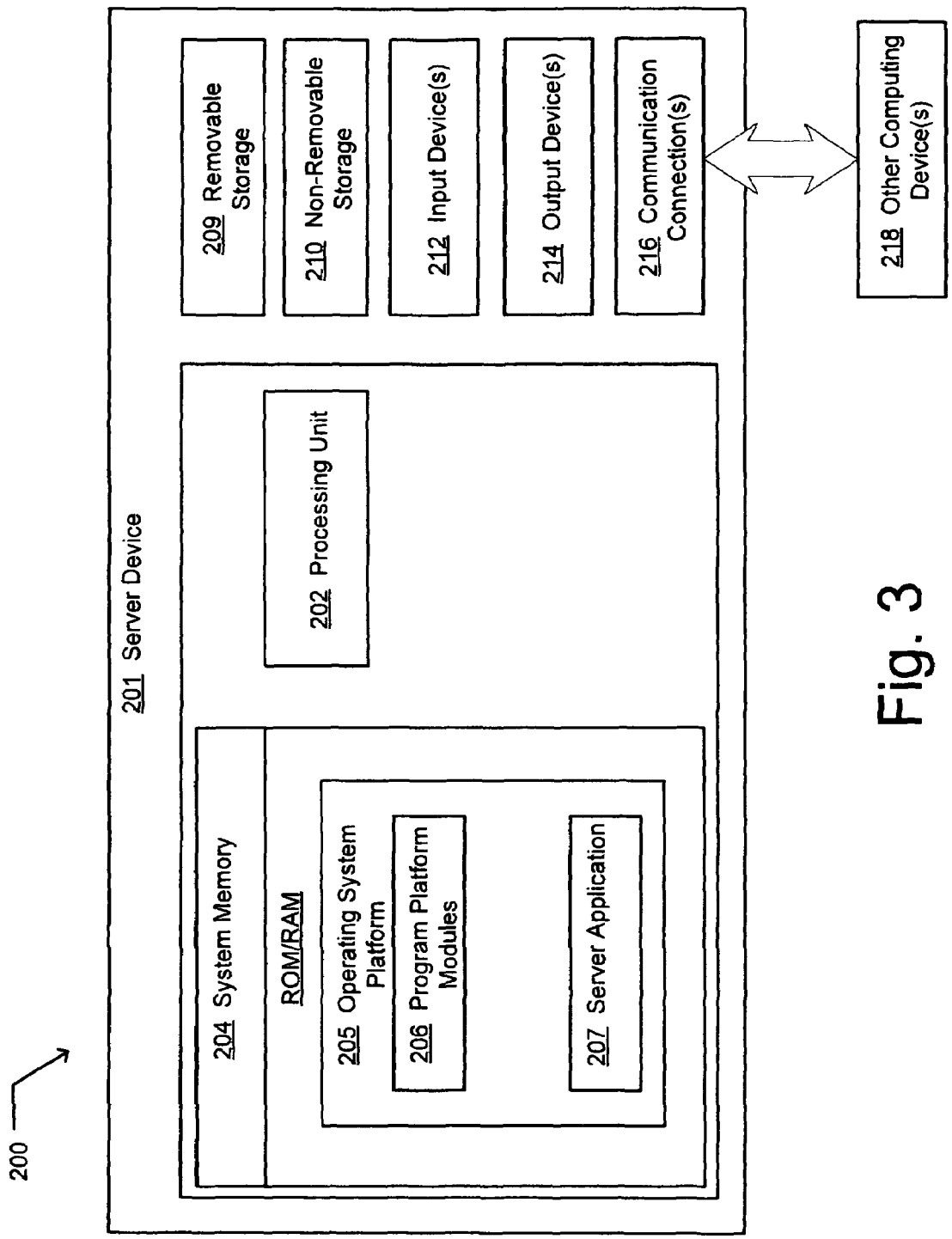
FIG. 3 illustrates another exemplary system in which embodiments may be implemented.

FIG. 3 illustrates an exemplary system 200 in which embodiments may be implemented. The exemplary system includes a computing system couplable to a network and operable to provide electronic content, such as a server 201. In an embodiment, the server may include an application server, audio server, database server, fax server, file server, intranet server, mail server, merchant server, modem server, network access server, network server, print server, proxy server, remote access server, telephony server, terminal server, video server, and/or Web server. In another embodiment, the server may include a network intermediary, a network switch, and/or a router. Server functionality may be implemented in software, hardware, firmware, and/or a combination thereof. Server functionality may be provided by a computing device that also provides other functionality. The network may include an electronic network, an optical network, and/or a combination of optical and electronic networks.

In a configuration, the server 201 typically includes at least one processing unit 202 and system memory 204. System memory 204 typically includes operating system platform 205 and one or more program modules 206 running on an operating system. In addition to the program modules 206, a server application 207 may also be running on the operating system. The server application 207 may be operable to deliver electronic content and/or files to applications via a protocol, and may include and/or interact with other computing devices, application servers, applications, and application interfaces (APIs) residing in other applications. For example, the server application may include a Web server operable to deliver Web pages and/or electronic content to Web browser applications via HTTP protocols.

The server 201 may have additional features or functionality. For example, the server may also include additional data storage devices (removable and/or non-removable), as illustrated in FIG. 3 by removable storage 209 and non-removable storage 210. System memory 204, removable storage 209 and non-removable storage 210 are all examples of computer storage media. The server may include input device(s) 212 and output device(s) 214. The server also contains communication connections 216 that allow the device to communicate with and perform a service associated with a network, including communicating with other servers and/or with other computing device(s), illustrated as other computing device(s) 218. Communication connections 216 are one example of communication media.

FIGS. 1-3 are intended to provide a brief, general description of an illustrative and/or suitable exemplary environments in which embodiments may be implemented. An exemplary system may include the thin computing device 20 of FIG. 1, the computing system environment 100 of FIG. 2, and/or the server of FIG. 3. FIGS. 1-3 are examples of a suitable environment and is not intended to suggest any limitation as to the structure, scope of use, or functionality of an embodiment. A particular environment should not be interpreted as having any dependency or requirement relating to any one or combination of components illustrated in an exemplary environment. For example, in certain instances, one or more elements of an environment may be deemed not necessary and omitted. In other instances, one or more other elements may be deemed necessary and added. Further, it will be appreciated that device(s) and/or environment(s) described herein may include numerous electrical, optical, mechanical, and/or digital components that may be necessary to operate the device, but are not needed to illustrate the subject matter described herein. As such, some of these electrical, optical, mechanical, and/or digital components may be omitted from the specification for clarity.

In the description that follows, certain embodiments may be described with reference to acts and symbolic representations of operations that are performed by one or more computing devices, such as the computing device 110 of FIG. 2. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures in which data is maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

Embodiments may be implemented with numerous other general-purpose or special-purpose computing devices and computing system environments or configurations. Examples of well-known computing systems, environments, and configurations that may be suitable for use with an embodiment include, but are not limited to, personal computers, handheld or laptop devices, personal digital assistants, multiprocessor systems, microprocessor-based systems, set top boxes, programmable consumer electronics, network, minicomputers, server computers, game server computers, web server computers, mainframe computers, and distributed computing environments that include any of the above systems or devices.

Embodiments may be described in a general context of computer-executable instructions, such as program modules, being executed by a computer. Generally, program modules include routines, programs, objects, components, data structures, etc., that perform particular tasks or implement particular abstract data types. An embodiment may also be practiced in a distributed computing environment where tasks are performed by remote processing devices that are linked through a communications network. In a distributed computing environment, program modules may be located in both local and remote computer storage media including memory storage devices.

Figure 4:
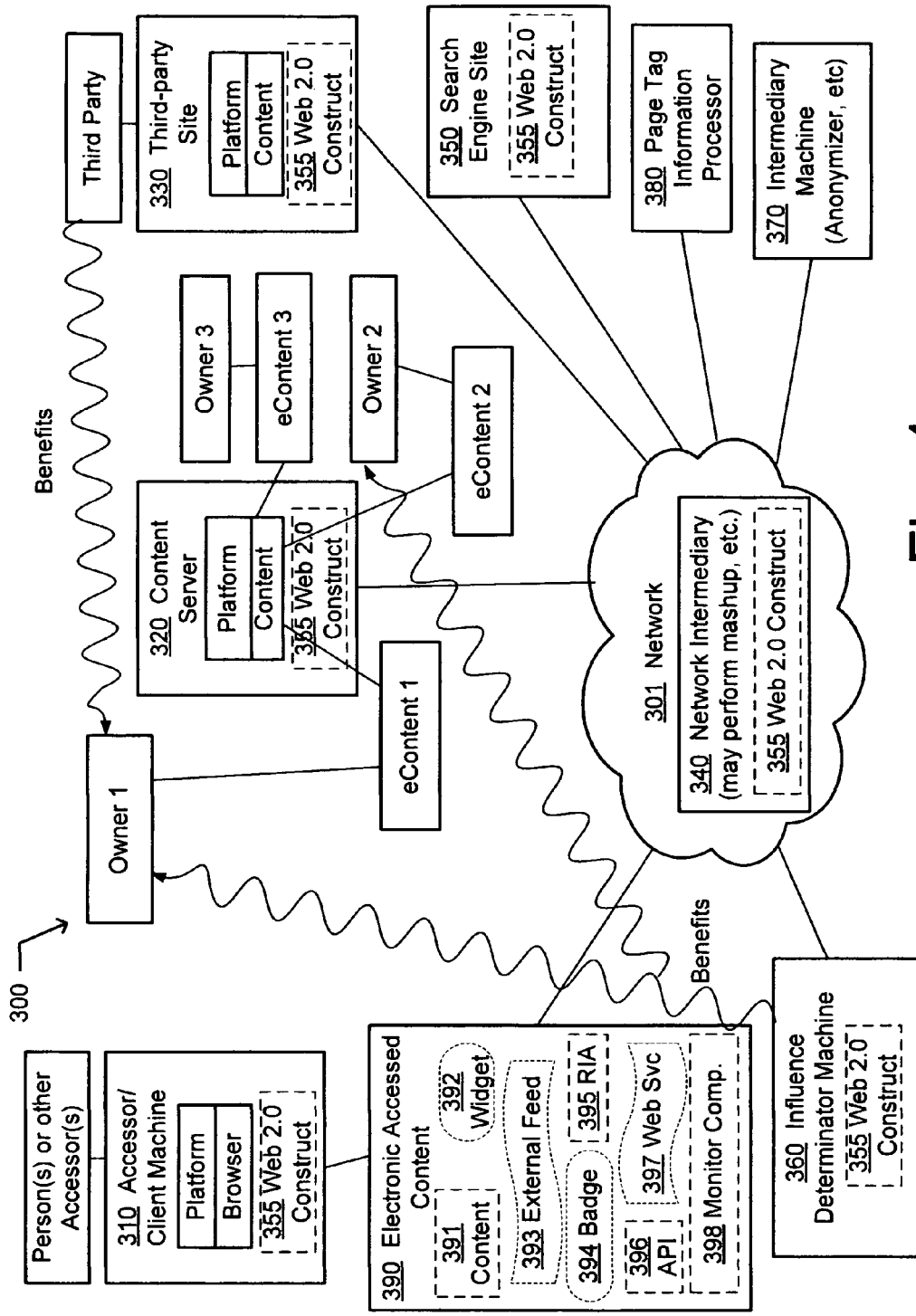
FIG. 4 illustrates an exemplary network environment in which embodiments may be implemented.

FIG. 4 illustrates an exemplary network environment 300 in which embodiments may be implemented. The exemplary environment may include one or more networks, illustrated as a network 301, and one or more client (or accessor) machines, illustrated as client (or accessor) machine 310. A fabric of the network 301 may include network intermediaries, illustrated as a network intermediary 340 running on a platform (not shown). In an embodiment, the client machine includes a computing device used by a human user. In another embodiment, the client machine includes a computing device used by a human user to communicate in a peer-to-peer environment (P2P), and/or to communicate in a cloud-to-cloud environment (C2C). In a further embodiment, the client machine includes a computing device used by a human user to communicate with a server. The client machine may include the thin computing device 20 illustrated in FIG. 1, and/or the computing device 110 illustrated in FIG. 2.

The exemplary environment 300 may also include one or more servers, illustrated as a content server 320. In an embodiment, the content server is operable to provide electronic content (illustrated as eContent 1 and/or eContent 2) to one or more client machines. In another embodiment, the content server includes the server 201 illustrated in FIG. 3. In a further embodiment, the content server(s) includes a node in P2P and/or a C2C network. The node may include the thin computing device 20 illustrated in FIG. 1, and/or the computing device 110 illustrated in FIG. 2. The exemplary environment 300 may also include one or more third-party sites, illustrated as a third-party site 330. The third-party site may include a merchant site, such as amazon.com for books, a manufacturer site, such as subaru.com for automobiles, a religious institution, such as catholic.org and/or hinduism.com, and/or a political site, such as rnc.org and/or democrats.org. The exemplary environment 300 may also include one or more search engine sites, illustrated as a search engine site 350. The search engine site may include a general search engine site, such as google.com and/or live.com. In another embodiment, the search engine site may include a topical search site, such as HONMedhunt and/or FindLaw.com.

The exemplary environment 300 may also include an influence determinator machine 360, an intermediary machine 370, and/or a page tag information processor 380. Each of these machines may be operable to receive data and/or information gathered by at least one of the client machine 310, the content server 320, the third-party site 330, and/or the network intermediary 340, and to produce an output usable in assessing an influence on a person using the client machine by a content of the content server.

As further shown in FIG. 4, one or more components of the network environment 300 may cooperatively provide an electronic accessed content 390 that may be accessed by the accessor (or client) machine 310. In some implementations, the electronic accessed content 390 may include one or more portions or components. For example, in some implementations, the electronic accessed content 390 may include a mashup of similar or different portions or components, or a plurality of mashups.

More specifically, with continued reference to FIG. 4, in some implementations, the electronic accessed content 390 may include one or more of the following components or types: a content 391 (e.g. text, audio, visual, video, or other suitable content), a widget 392 (e.g. clock, weather monitor, music provider, news provider, game, entertainment provider, story provider, article provider, stock market tracker, etc.), an external feed 393 (e.g. clock, weather monitor, music provider, news provider, game, entertainment provider, story provider, article provider, stock market tracker, etc.), a badge 394 (e.g. animal, brand name, musical group, sports content, humorous content, entertainment content, nationality content, religious content, affinity content, affiliation content, etc.), a Rich Internet Application (RIA) 395 (e.g. virtual weather provider, virtual experience provider, news provider, designer, entertainment provider, shopping facilitator, analytical facilitator, etc.), an Application Programming Interface (API) 396 (e.g. file operations, file references, geometry and topology operations, feature operations, projects, drawing and dimensional operations, assembly operations, user interfaces, user preferences, etc.), a web service 397 (e.g. search service, mapping service, directions service, spelling and grammar services, etc.), and a monitoring component 398 (e.g. tracking component, access monitor, registration component, etc.). Of course, in alternate implementations, the electronic accessed content 390 may include any other suitable components or content types.

The network environment 300 further includes one or more Web 2.0 constructs 355 which may be located or distributed on one or more components within the environment 300. For example, in some implementations, a Web 2.0 construct 355 may be located on the network 301, the accessor/client machine 310, the content server 320, the third-party site 330, the network intermediary 340, the search engine site 350, the influence determinator machine 360, or any other component of the network environment 300. As used herein, the term "Web 2.0 construct" (or "machine-implemented Web 2.0 construct") may include a wide variety of constructs implemented in software, hardware, firmware, or combinations thereof. For example, a "Web 2.0 construct" may include a web-based application, a web service, an asynchronous application, an API, an RIA application, an Ajax (Asynchronous JavaScript and XML (Extensible Markup Language)) application, a Flex application, a Flash® application, a Web 2.0 engine, or a mashup that includes one or more of the aforementioned constructs.

Figure 41:
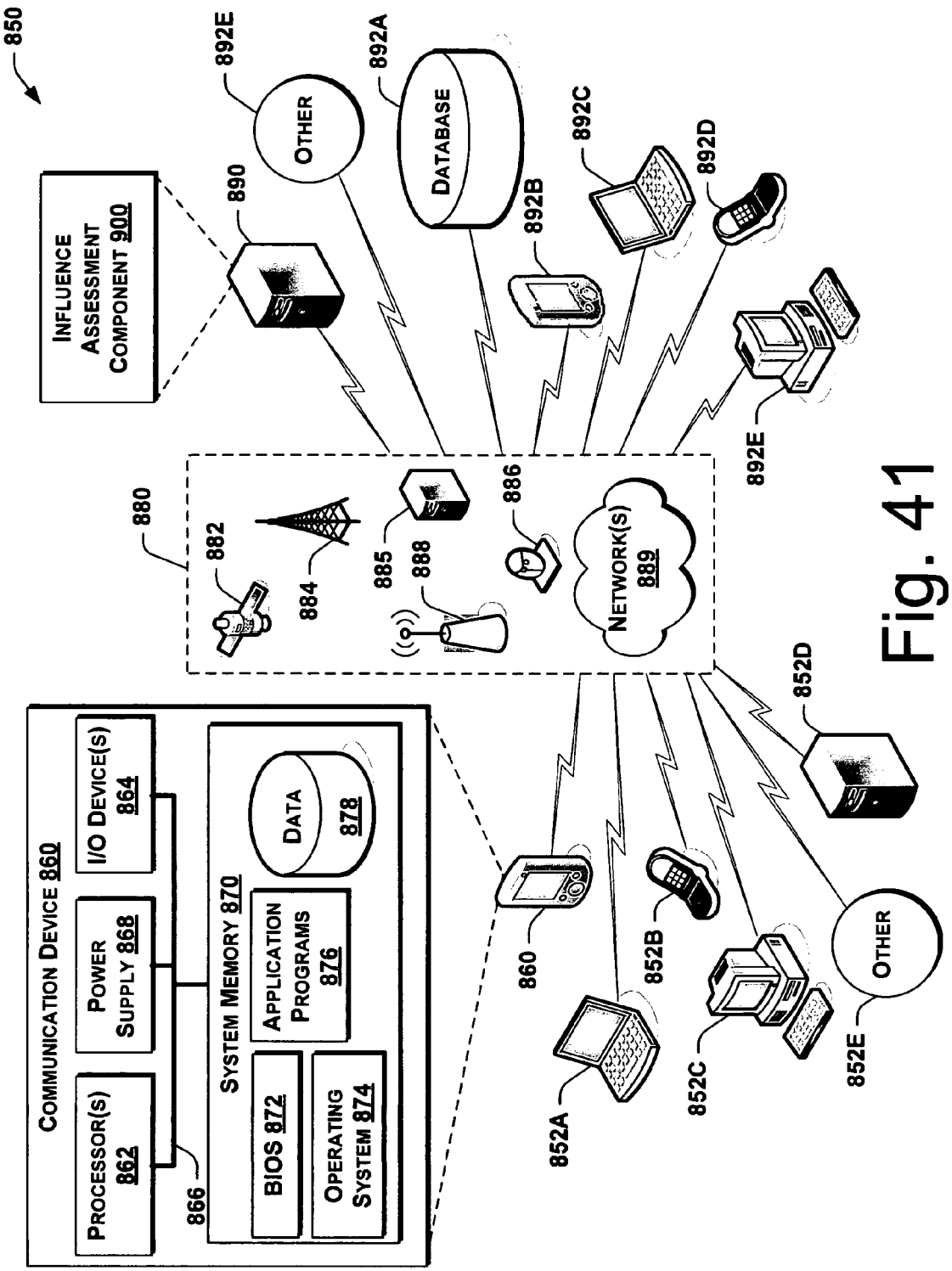
FIGS. 41-47 illustrate exemplary embodiments of alternate computing systems and environments in which embodiments may be implemented.

FIG. 41 illustrates an exemplary environment 850 in which further embodiments may be implemented. In this implementation, the environment 850 includes a communication device 860 that communicates via a communication infrastructure 880 with an influence determiner 890. The influence determiner 890 includes an influence assessment component 900 in accordance with the teachings of the present disclosure. In some implementations, the communication device 860 may bypass the infrastructure 880 and communicate directly with the influence determiner 890, or may simply communicate with the infrastructure 880 itself.

As further shown in FIG. 41, in some implementations, the environment 850 may include one or more additional communication devices 852. In will be appreciated that the communication devices 860, 852 may be a wide variety of suitable devices. For example, in some implementations, the communication device 860 (or 852) may be a hand-held device (860) (e.g. personal data assistant (PDA), global positioning system (GPS), radio, television, audio device, audio-visual device, mobile communicator, signal processor, etc.), a laptop or mobile computer (852A), a cellular telephone (852B), a desktop computer (852C), a server (852D), or any other suitable device (852E) having the desired communication capabilities.

In some implementations, the influence determiner 890 may provide electronic content for access by the communication devices 860, 852. In further implementations, the environment 850 may include one or more content providers 892. The content providers 892 (and the influence determiner 890) may include a wide variety of suitable devices. For example, in some implementations, the content providers 892 may include a server (890), a database (892A), a hand-held device (892B) (e.g. personal data assistant (PDA), global positioning system (GPS), radio, television, audio device, audio-visual device, mobile communicator, signal processor, etc.), a laptop or mobile computer (892C), a cellular telephone (892D), a desktop computer (892E), or any other suitable device (892E) having the desired content-providing capabilities.

In some implementations, the infrastructure 880 may include a variety of suitable components that cooperatively provide a wired or wireless communications functionality. Various exemplary communication components of the infrastructure 880 are shown in FIG. 41 for illustrative purposes. For example, in some implementations, the infrastructure 880 may include one or more of the following: a communications satellite 882, an antenna tower 884, a computer 885, a communications dish 886, a signal carrier 888, and one or more networks 889. Alternately, other communications components may be used. In particular implementations, for example, the infrastructure 880 may include components that make up a Core Network (CN) and/or a UMTS Terrestrial Radio Access Network (UTRAN) of a modern UMTS (Universal Mobile Telecommunication System).

As further illustrated in FIG. 41, in some implementations, the communication device 860 includes one or more processors 862 and one or more input/output (I/O) devices 864 coupled to a system memory 870 by a bus 866. Power may be provided to the components of the communication device 860 via a power supply 868. The system bus 866 of the communication device 860 represents any of the several types of bus structures, including a memory bus or memory controller, a peripheral bus, an accelerated graphics port, and a processor or local bus using any of a variety of bus architectures. The I/O component 864 may be configured to operatively communicate with one or more external components, such as one or more components of the infrastructure 880, one or more other communication devices 852, the influence determiner 890, one or more content providers 892, or other communications networks, such a cellular telephone network, a satellite network, an information network (e.g., Internet, intranet, cellular network, cable network, fiber optic network, LAN, WAN, etc.), an infrared or radio wave communication network, or any other suitable network.

The system memory 870 may include computer-readable media configured to store data and/or program modules for implementing the techniques disclosed herein that are immediately accessible to and/or presently operated on by the processor 862. For example, the system memory 870 may store a basic input/output system (BIOS) 872, an operating system 874, one or more application programs 876 (e.g. a web browser, a communications program, etc.), and program data 878 that can be accessed by the processor 872 for performing various tasks desired by a user of the communication device 860. The other communication devices 852 of the environment 850 may have an internal structure similar to (or different than) that of the communication device 860 shown in FIG. 41.

The computer-readable media included in the system memory 870 can be any available media that can be accessed by the device 860, including computer storage media and communication media. Computer storage media may include both volatile and nonvolatile, removable and non-removable media implemented in any method or technology for storage of information such as computer-readable instructions, data structures, program modules, or other data. Computer storage media includes, but is not limited to, and random access memory (RAM), read only memory (ROM), electrically erasable programmable ROM (EEPROM), flash memory or other memory technology, compact disk ROM (CD-ROM), digital versatile disks (DVD) or other optical disk storage, magnetic cassettes, magnetic tape, magnetic disk storage or other magnetic storage devices, or any other medium, including paper, punch cards and the like, which can be used to store the desired information and which can be accessed by the communication device 860.

Similarly, communication media may include computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF (radio-frequency), infrared and other wireless media. Combinations of any of the above should also be included within the scope of computer readable media.

Generally, program modules executed on the communication devices 860, 852, the influence determiner 890, or the content providers 892 (FIG. 41) may include routines, programs, objects, components, data structures, etc., for performing particular tasks or implementing particular abstract data types. These program modules and the like may be executed as a native code or may be downloaded and executed such as in a virtual machine or other just-in-time compilation execution environments. Typically, the functionality of the program modules may be combined or distributed as desired in various implementations.

Figure 42:
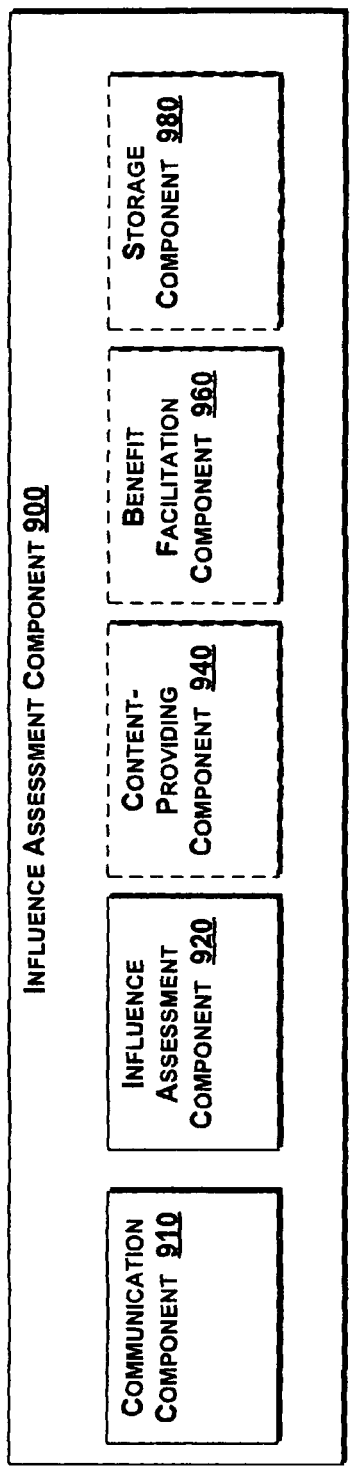

FIG. 42 shows an exemplary implementation of the influence assessment component 900 of the influence determiner 890 of FIG. 41. Although the influence assessment component 900 is depicted as being resident on the influence determiner 890 in FIG. 41, in some implementations, one or more portions or functionalities of the influence assessment component 900 may be distributed to other portions of the environment 850 (e.g. infrastructure 880, communication devices 860, 852, content providers 892, etc.).

As shown in FIG. 42, in some implementations, the influence assessment component 900 may include a communication component 910 operatively communicating with an influence assessment component 930. In further implementations, the influence assessment component 900 may also include a content-providing component 940, a benefit facilitation component 960, and a storage component 980. The various components 910, 920, 940, 960, 980 of the influence assessment component 900 may operatively communicate using known techniques to accomplish the desired functionalities described herein. In addition, unless otherwise specified, it will be appreciated that the various components 910, 920, 940, 960, 980 of the influence assessment component 900 may be implemented using hardware, software, firmware, or combinations thereof.

Figure 43:
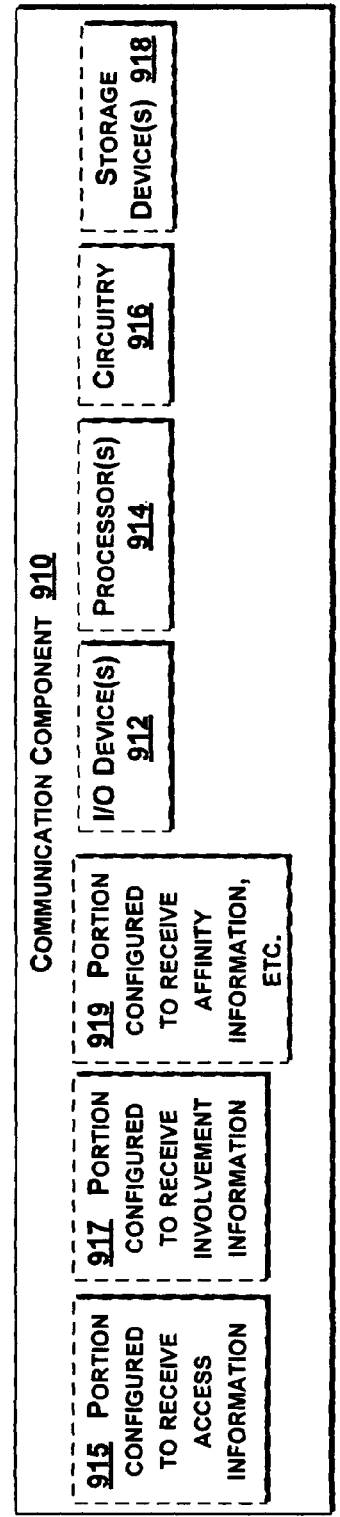

FIG. 43 illustrates an exemplary implementation of the communication component 910 of FIG. 42. In some implementations, the communication component 910 may include a portion 915 configured to receive access information, and a portion 917 configured to receive involvement information 917, as described more fully below. In some implementations, the portion 917 configured to receive involvement information is further configured to receive involvement information using a machine-implemented Web 2.0 construct, as described more fully below. In further implementations, the communication component 910 may include a portion 919 configured to receive affinity information, or any other desired information. Further possible implementations and aspects of the communication component 910 are described more fully below.

As further shown in FIG. 43, the communication component 910 may also include one or more I/O devices 912 (e.g. antennas, ports, etc.), processors 914, circuitry 916 (e.g. ASICs, signal conditioning, etc.), storage devices 918, or any other suitable desired sub-components or sub-systems to cooperatively perform the desired functionalities described herein. Although the portions and components of the communication component 910 are depicted in FIG. 43 as being separate portions and components for the sake of clarity, it should be appreciated that these portions and components are not necessarily separate, and may variously be combined or may have overlapping portions, components, or functionalities.

Figure 44:
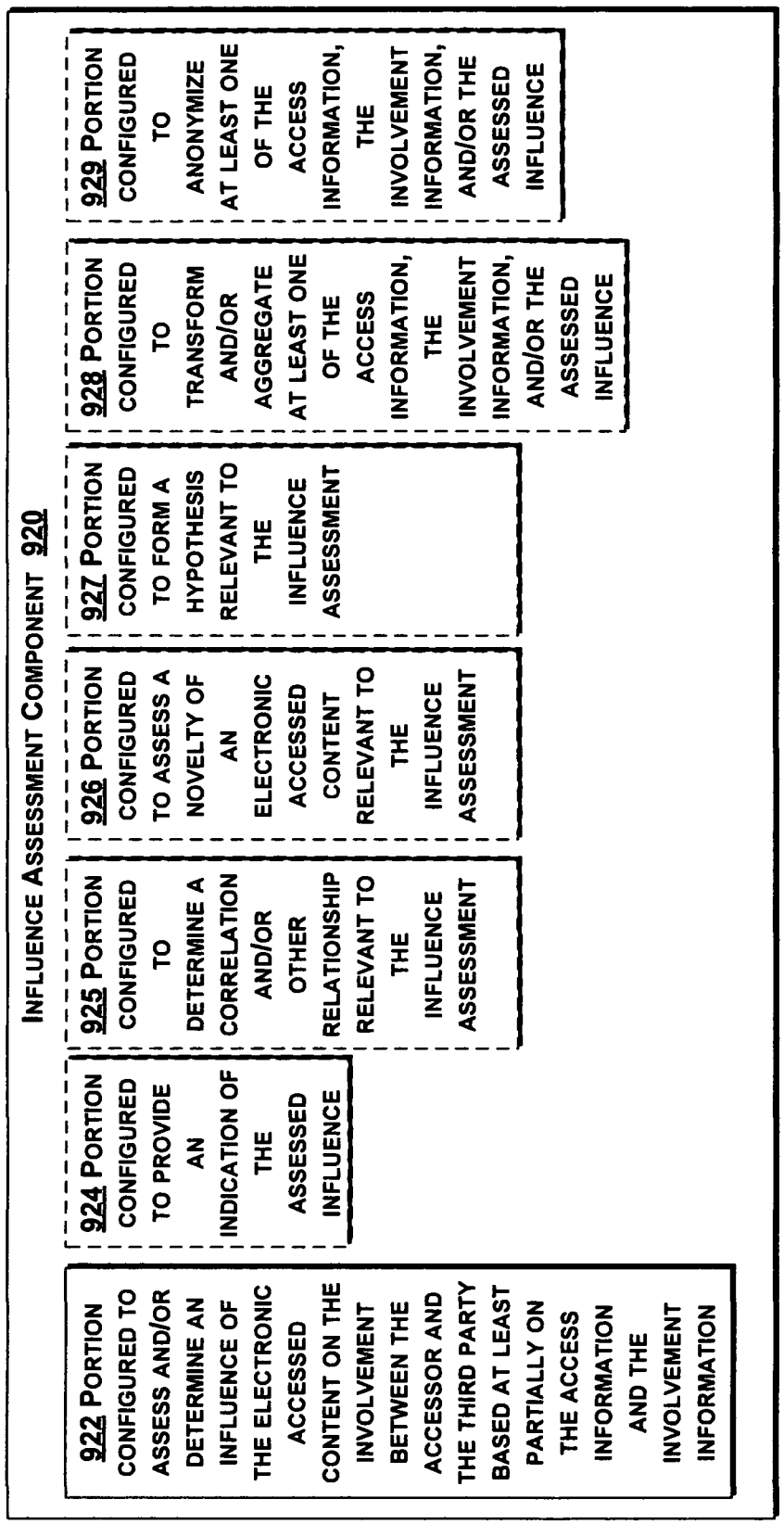

FIG. 44 shows an exemplary implementation of the influence assessment component 920 of FIG. 42. In some implementations, the influence assessment component 920 may include a portion 922 configured to assess and/or determine an influence of the electronic accessed content on the involvement between the accessor and the third party based at least partially on the access information and the involvement information. In further implementations, the influence assessment component 920 may include a portion 924 configured to provide an indication of the assessed influence. The influence assessment component 920 may also include a portion 925 configured to determine a correlation and/or other relationship relevant to the influence assessment (e.g. a correlation between a communication between a content site and a computing device responsive to a human user input, and a communication between the computing device and a beneficiary site).

In some implementations, the influence assessment component 920 may include a portion 926 configured to assess a novelty of an electronic accessed content relevant to the influence assessment. In further implementations, the influence assessment component 920 may include a portion 927 configured to form a hypothesis relevant to the influence assessment. Similarly, the influence assessment component 920 may include a portion 928 configured to transform and/or aggregate at least one of the access information, the involvement information, and/or the assessed influence. In some implementations, the influence assessment component 920 may include a portion 929 configured to anonymize at least one of the access information, the involvement information, and/or the assessed influence. Further possible implementations and aspects of the influence assessment component 920 are described more fully below.

Although such components are not shown in FIG. 44 for the sake of clarity, in some implementations, the influence assessment component 920 may also include one or more I/O devices 912 (e.g. antennas, ports, etc.), processors 914, circuitry 916 (e.g. ASICs, signal conditioning, etc.), or storage devices 918 (see FIG. 43). Again, although the portions and components of the influence assessment component 920 are depicted in FIG. 44 as being separate portions and components for the sake of clarity, it should be appreciated that these portions and components are not necessarily separate, and may variously be combined or may have overlapping portions, components, or functionalities.

Figure 45:
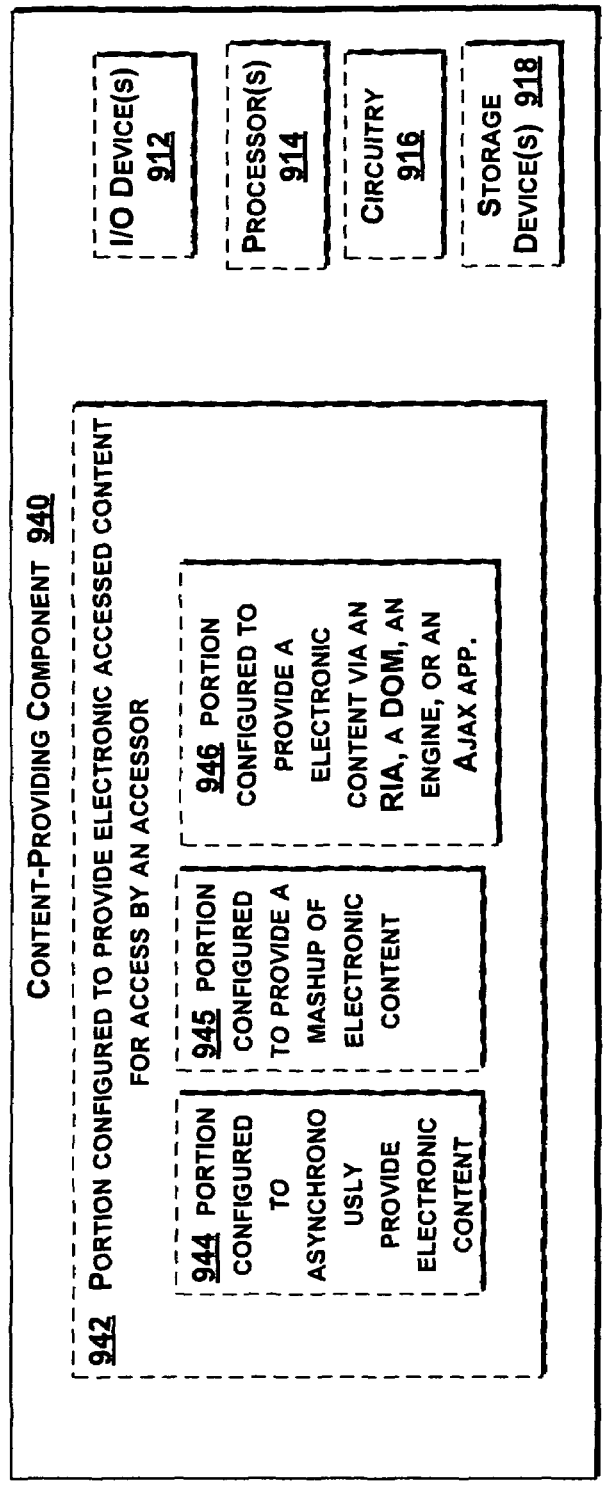

FIG. 45 shows an exemplary implementation of the content-providing component 940 of FIG. 42. In some implementations, the content-providing component 940 may include a portion 942 configured to provide electronic accessed content for access by an accessor. More specifically, in some implementations, the portion 942 configured to provide electronic accessed content for access by an accessor may include a portion 944 configured to asynchronously provide electronic content, or a portion 945 configured to provide a mashup of electronic content, a portion 946 configured to provide electronic content via a Rich Internet Application (RIA) (e.g. a Flash application, etc.), or a Document Object Model (DOM), or an engine, or an Ajax application, or other portions configured to provide electronic content in a variety of ways, as described more fully below. In addition, further possible implementations and aspects of the content-providing component 940 are described more fully below.

As shown in FIG. 45, the content-providing component 940 may also include one or more I/O devices 912 (e.g. antennas, ports, etc.), processors 914, circuitry 916 (e.g. ASICs, signal conditioning, etc.), or storage devices 918. Again, although the portions and components of the content-providing component 940 are depicted in FIG. 45 as being separate portions and components for the sake of clarity, it should be appreciated that these portions and components are not necessarily separate, and may variously be combined or may have overlapping portions, components, or functionalities.

Figure 46:
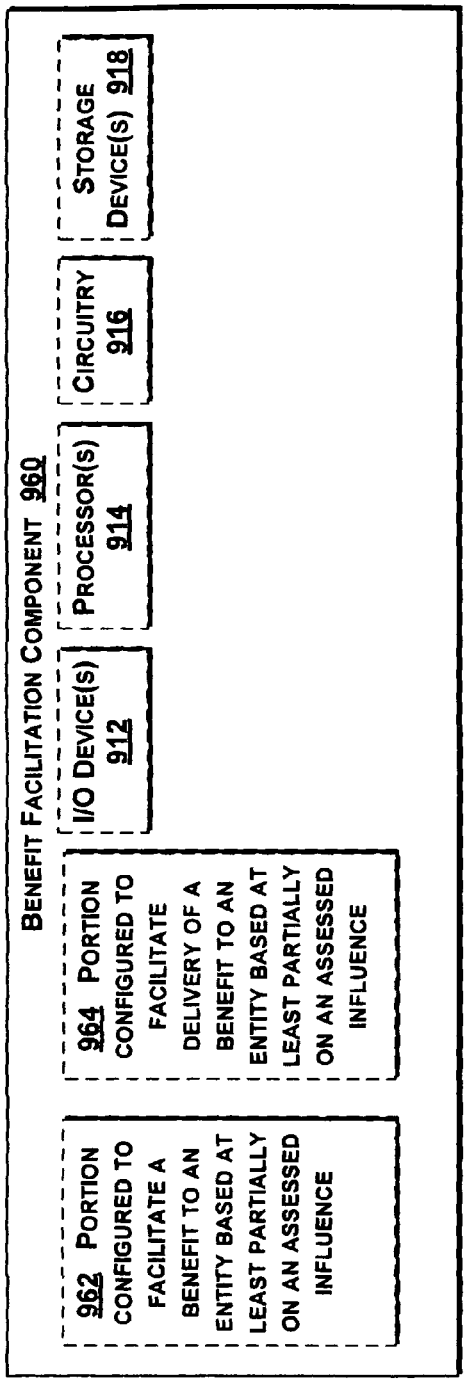

FIG. 46 shows an exemplary implementation of the benefit facilitation component 960 of FIG. 42. In some implementations, the benefit facilitation component 960 may include a portion 962 configured to facilitate a benefit to an entity based at least partially on an assessed influence. In further implementations, the benefit facilitation component 960 may include a portion 964 configured to facilitate delivery of a benefit to an entity based at least partially on an assessed influence. In addition, further possible implementations and aspects of the benefit facilitation component 960 are described more fully below.

As shown in FIG. 46, the benefit facilitation component 960 may also include one or more I/O devices 912 (e.g. antennas, ports, etc.), processors 914, circuitry 916 (e.g. ASICs, signal conditioning, etc.), or storage devices 918. Again, although the portions and components of the benefit facilitation component 960 are depicted in FIG. 46 as being separate portions and components for the sake of clarity, it should be appreciated that these portions and components are not necessarily separate, and may variously be combined or may have overlapping portions, components, or functionalities.

Figure 47:
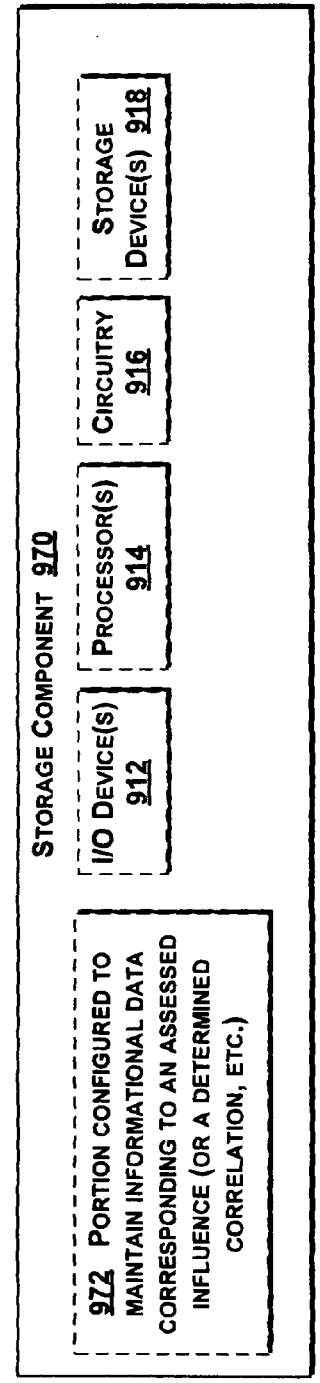

FIG. 47 shows an exemplary implementation of the storage component 970 of FIG. 42. In some implementations, the storage component 970 may include a portion 972 configured to maintain informational data corresponding to the assessed influence, or information relevant to the assessed influence (e.g. a determined correlation, etc.). In addition, further possible implementations and aspects of the storage component 970 are described more fully below.

As shown in FIG. 47, the storage component 970 may also include one or more I/O devices 912 (e.g. antennas, ports, etc.), processors 914, circuitry 916 (e.g. ASICs, signal conditioning, etc.), or storage devices 918. Again, although the portions and components of the storage component 970 are depicted in FIG. 47 as being separate portions and components for the sake of clarity, it should be appreciated that these portions and components are not necessarily separate, and may variously be combined or may have overlapping portions, components, or functionalities.

It should be appreciated that the exemplary systems and environments described above with reference to FIGS. 1-4 and 41-47 are merely illustrative of a few of the many possible systems and environments in which the teachings of the present disclosure may be implemented, and that the teachings herein are not limited to the particular systems and environments described above.

Exemplary Processes for Rewarding Influencers

Exemplary processes for rewarding influencers in accordance with the teachings of the present disclosure are described below with reference to FIGS. 5 through 40. It will be appreciated, however, that the following description of exemplary processes is not exhaustive of all possible processes in accordance with the teachings of the present disclosure.

Figure 5:
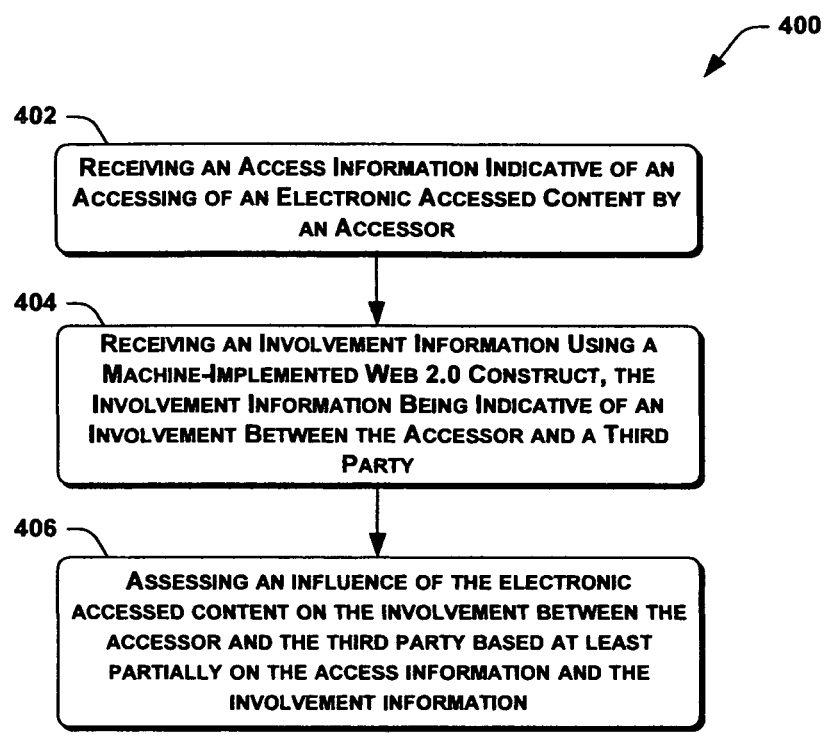
FIGS. 5 through 40 are flowcharts of methods of assessing an influence of an electronically accessed content in accordance with various implementations of the present disclosure.

For example, FIG. 5 is a flowchart of method 400 of assessing an influence of an electronically accessed content in accordance with the present disclosure. More specifically, in this implementation, the method 400 includes access information indicative of an accessing of an electronic accessed content by an accessor at 402. For example, in a representative implementation, access information indicative of an accessing of an electronic accessed content by an accessor at 402 may include receiving data indicating that a web browser associated with a particular consumer has accessed a particular website for a particular duration of time, or that a mobile device (e.g. cellular telephone) has requested a download of a particular podcast of information.

The method 400 further includes involvement information using a machine-implemented Web 2.0 construct, the involvement information being indicative of an involvement between the accessor and a third party at 404. In some implementations, the involvement information using a machine-implemented Web 2.0 construct, the involvement information being indicative of an involvement between the accessor and a third party at 404 may include, for example, receiving data indicating that the above-mentioned consumer conducted a transaction with a particular vendor of goods or services, or that a user of the aforesaid cellular telephone conducted business with a broker. It will be appreciated that a wide variety of machine-implemented Web 2.0 constructs may be used for receiving the involvement information at 404, including, for example, an Ajax (Asynchronous JavaScript and XML (Extensible Markup Language)) application, an asynchronous application, a Flash® application, a web service, any other suitable Web 2.0 engine (or content or construct), or a mashup that includes one or more of the afore-mentioned constructs.

As further shown in FIG. 5, the method 400 also includes assess an influence of the electronic accessed content on the involvement between the accessor and the third party based at least partially on the access information and the involvement information at 406. For example, in a representative implementation, the assess an influence of the electronic accessed content on the involvement between the accessor and the third party based at least partially on the access information and the involvement information at 406 may include assessing whether the website accessed by the consumer using the browser was the primary reason the consumer purchased the good or service from the vendor, or assessing whether the cell phone user's interaction with the broker was attributable to the podcast that was downloaded by the user. Of course, many other representative scenarios in accordance with the method 400 may be conceived.

Figure 6:
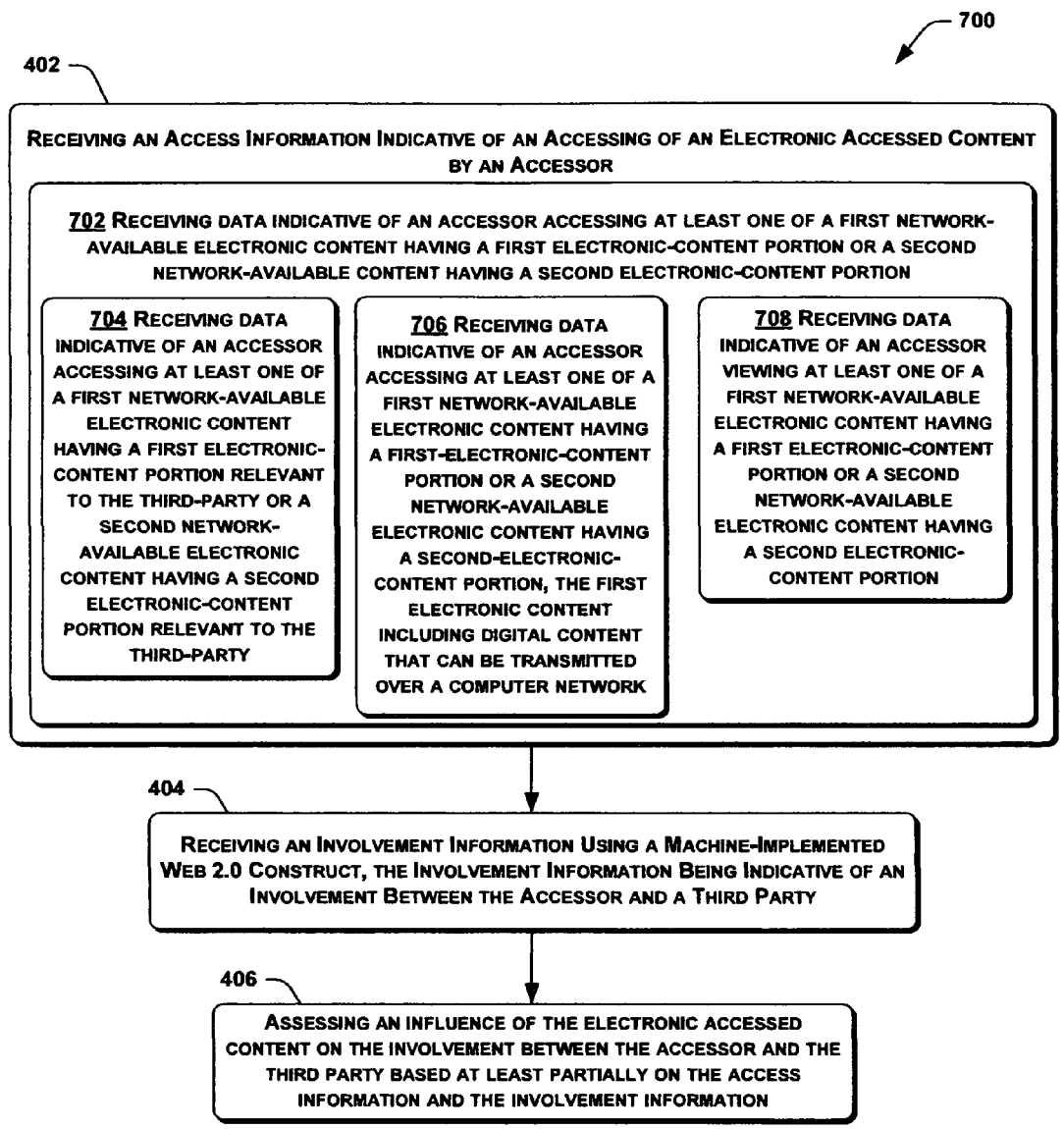

It will be appreciated that receiving the access information at 402 may occur in a variety of ways. For example, in a method 700 as shown in FIG. 6, access information indicative of an accessing of an electronic accessed content by an accessor may include data indicative of an accessor accessing at least one of a first network-available electronic content having a first electronic-content portion or a second network-available electronic content having a second electronic-content portion at 702 (e.g. receiving data indicative of an accessing of a mashup of a web service-related content and a blog-related content).

More specifically, data indicative of an accessor accessing at least one of a first network-available electronic content having a first electronic-content portion or a second network-available electronic content having a second electronic-content portion (at 702) may include data indicative of an accessor accessing at least one of a first network-available electronic content having a first electronic-content portion relevant to the third-party or a second network-available electronic content having a second electronic-content portion relevant to the third-party at 704. For example, data may be received indicative of a consumer accessing a first product-related content comparing a first brand of cameras (Brand A) to a second brand of cameras (Brand B), and also indicative of the consumer assessing a second product-related content comparing the first and second brands of cameras (Brand A and B), the third party being a provider (e.g. manufacturer, wholesaler, retailer, advertiser, etc.) of either the Brand A camera or the Brand B camera.

Similarly, data indicative of an accessor accessing at least one of a first network-available electronic content having a first electronic-content portion or a second network-available electronic content having a second electronic-content portion (at 702) may include data indicative of an accessor accessing at least one of a first network-available electronic content having a first-electronic-content portion or a second network-available electronic content having a second-electronic-content portion, the first electronic content including digital content that can be transmitted over a computer network at 706 (e.g. receiving data indicative of a searchbot accessing a first webpage or a second webpage, the first webpage including digitized audio signals that are transmitted over the Internet). In some implementations, data indicative of an accessor accessing at least one of a first network-available electronic content having a first electronic-content portion or a second network-available electronic content having a second electronic-content portion (at 702) may include data indicative of an accessor viewing at least one of a first network-available electronic content having a first electronic-content portion or a second network-available electronic content having a second electronic-content portion at 708 (e.g. receiving data indicative of a media player viewing a mashup that provides a first viewable podcast and a second viewable podcast).

Figure 7:
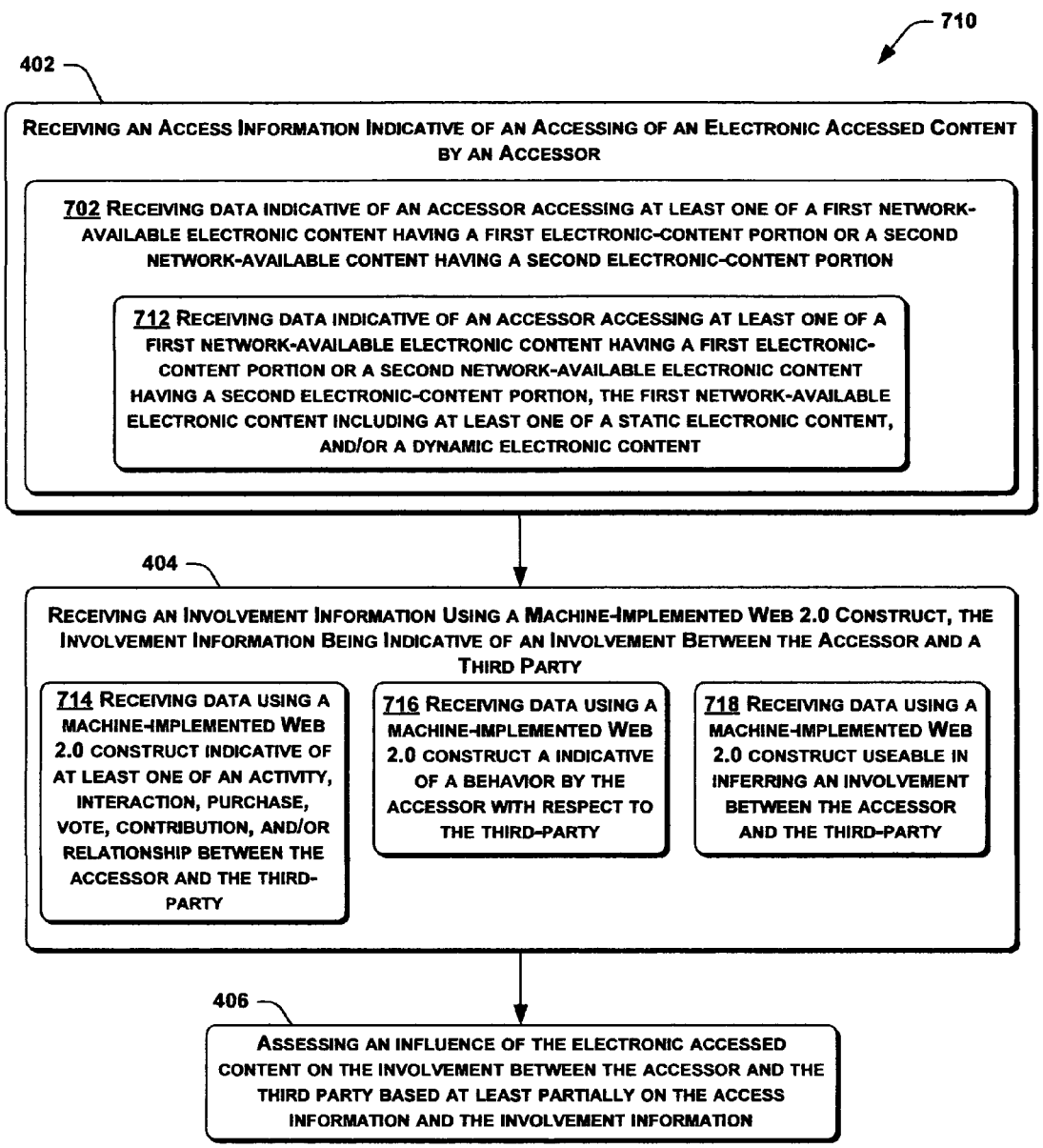

In addition, as depicted by process 710 shown in FIG. 7, in some implementations, data indicative of an accessor accessing at least one of a first network-available electronic content having a first electronic-content portion or a second network-available electronic content having a second electronic-content portion (at 702) may include data indicative of an accessor accessing at least one of a first network-available electronic content having a first electronic-content portion or a second network-available electronic content having a second electronic-content portion, the first network-available electronic content including at least one of a static electronic content, and/or a dynamic electronic content at 712 (e.g. receiving data indicative of a browser accessing a webpage that provides a mashup of a sports team's schedule (static content) and an RSS feed of statistics and scores from the games that are or have been occurring throughout the country (dynamic content)).

It will be appreciated that receiving the involvement information at 404 may be accomplished in a variety of ways. For example, as further shown in FIG. 7, involvement information using a machine-implemented Web 2.0 construct, the involvement information being indicative of an involvement between the accessor and a third party (at 404) may include data using a machine-implemented Web 2.0 construct indicative of at least one of an activity, interaction, purchase, vote, contribution, and/or relationship between the accessor and the third-party at 714 (e.g. receiving involvement data using an asynchronous application indicative of a purchase-and-sale transaction between a consumer and a vendor). Similarly, involvement information using a machine-implemented Web 2.0 construct, the involvement information being indicative of an involvement between the accessor and a third party (at 404) may include data using a machine-implemented Web 2.0 construct indicative of a behavior by the accessor with respect to the third-party at 716 (e.g. receiving involvement data using a mashup that indicates that a person recommended the services of an insurance provider to a friend).

In further implementations, involvement information using a machine-implemented Web 2.0 construct, the involvement information being indicative of an involvement between the accessor and a third party (at 404) may include data using a machine-implemented Web 2.0 construct useable in inferring an involvement between the accessor and the third-party at 718 (e.g. receiving data using an Ajax application that shows a cookie indicative of a consumer transaction was placed by the third-party's website on the accessor's device).

Figure 8:
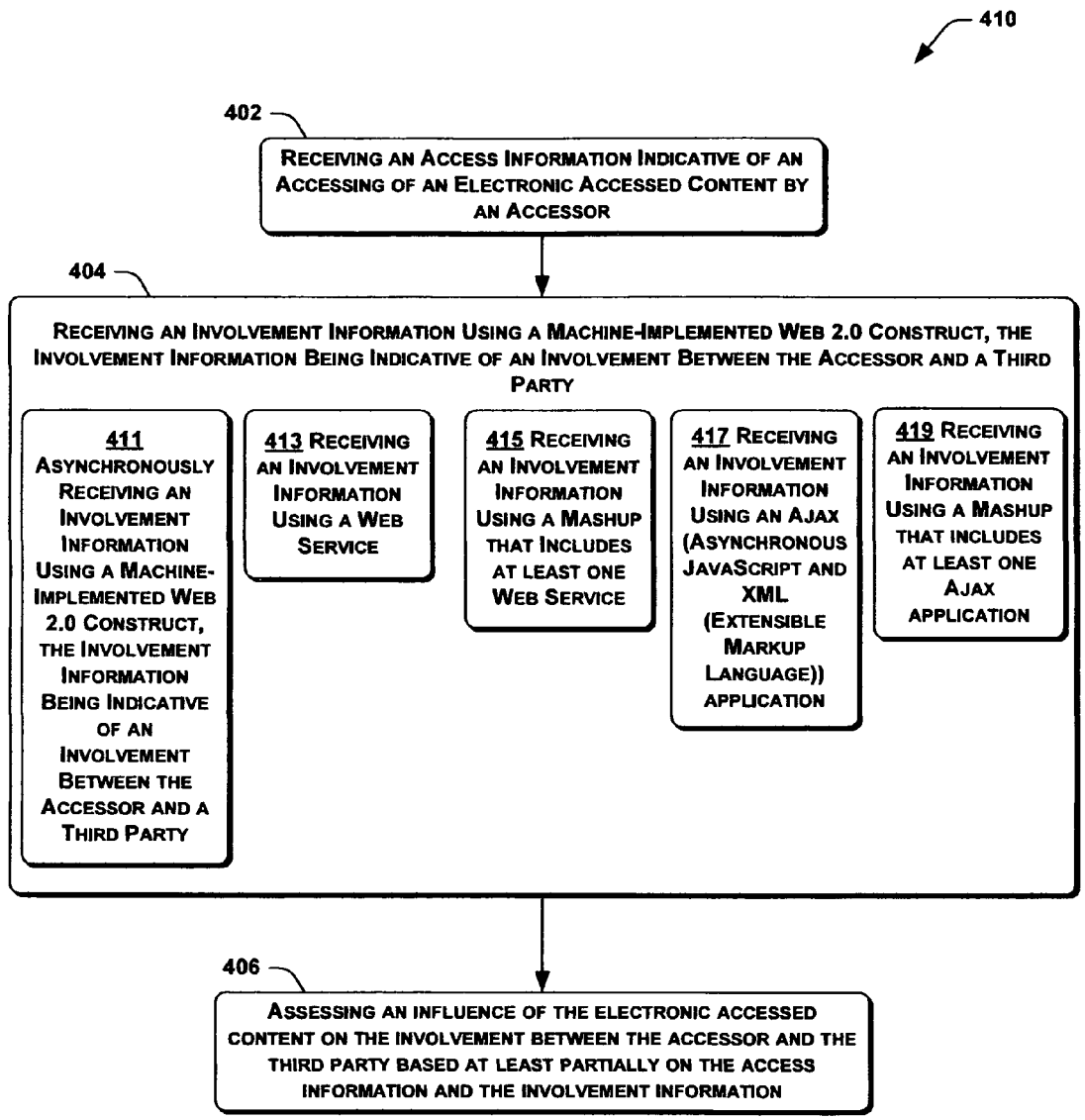

Furthermore, in a method 410 as shown in FIG. 8, involvement information using a machine-implemented Web 2.0 construct, the involvement information being indicative of an involvement between the accessor and a third party (at 404) may include asynchronously involvement information using a machine-implemented Web 2.0 construct, the involvement information being indicative of an involvement between the accessor and a third party at 411 (e.g. using an Ajax application or other asynchronous engine). In some implementations, involvement information using a machine-implemented Web 2.0 construct, the involvement information being indicative of an involvement between the accessor and a third party (at 404) may include receiving an involvement information using a web service at 413 (e.g. a web service that performs tracking and reporting of durations of time spent by web browsers accessing websites). Similarly, in some implementations, involvement information using a machine-implemented Web 2.0 construct, the involvement information being indicative of an involvement between the accessor and a third party (at 404) may include receiving an involvement information using a mashup that includes at least one web service at 415 (e.g. a mashup that provides both an Internet search service and a web service that performs tracking and reporting of durations of time spent by web browsers accessing websites).

In further implementations, involvement information using a machine-implemented Web 2.0 construct, the involvement information being indicative of an involvement between the accessor and a third party (at 404) may include receiving an involvement information using an Ajax (Asynchronous JavaScript and XML (Extensible Markup Language)) application at 417 (e.g. an Ajax application that documents and reports podcasts downloaded to a platform or device). Similarly, in some implementations, involvement information using a machine-implemented Web 2.0 construct, the involvement information being indicative of an involvement between the accessor and a third party (at 404) may include receiving an involvement information using a mashup that includes at least one Ajax application at 419 (e.g. a mashup that includes both an offer to sell printed materials and an Ajax application that documents and reports podcasts downloaded to a platform or device).

Figure 9:
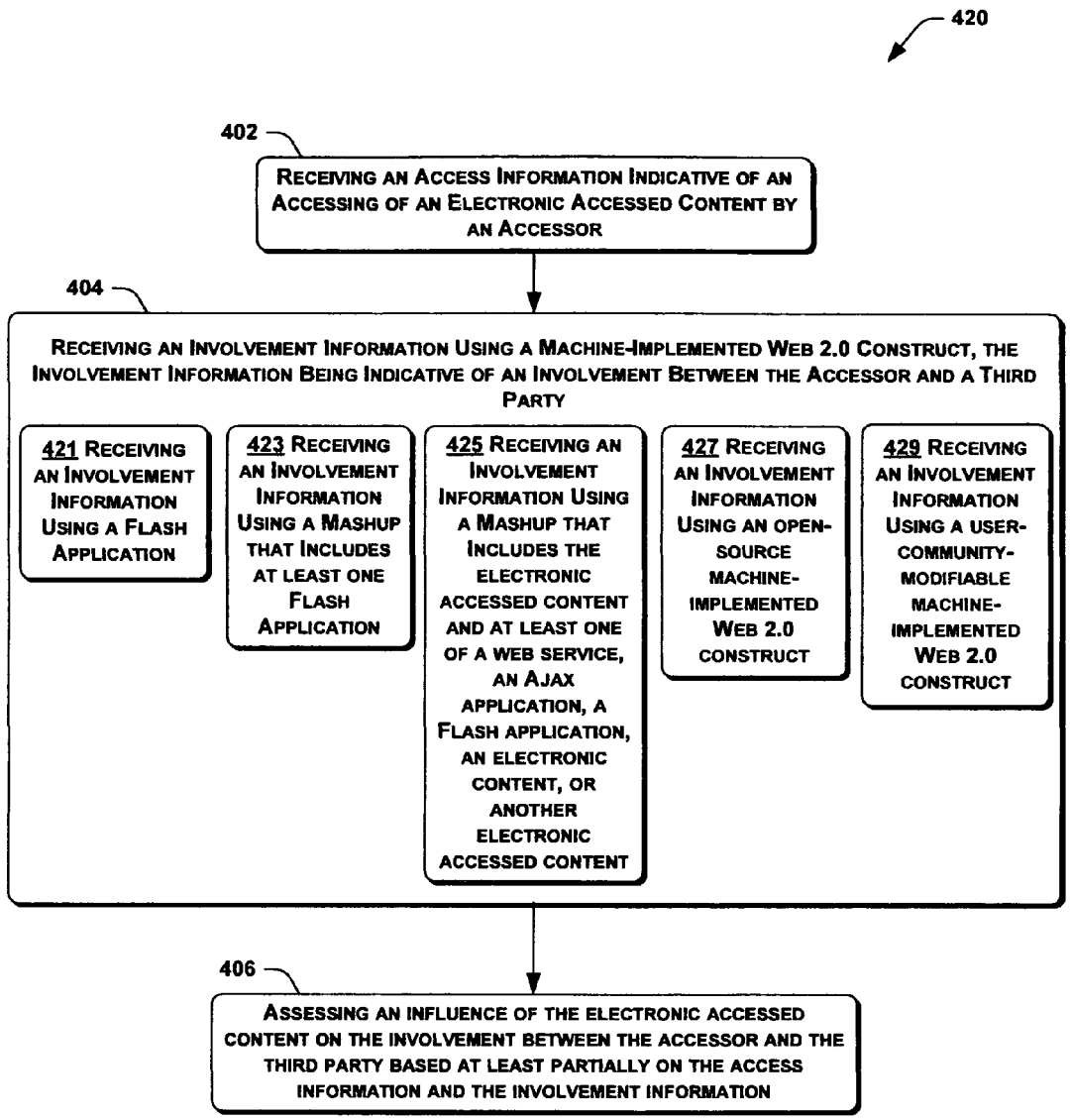

As depicted in the process 420 shown in FIG. 9, in some implementations, involvement information using a machine-implemented Web 2.0 construct, the involvement information being indicative of an involvement between the accessor and a third party (at 404) may include receiving an involvement information using a Flash application at 421 (e.g. a Flash application that provides animation or other enhanced interactive capabilities and that monitors or reports web browser activities). Similarly, in some implementations, involvement information using a machine-implemented Web 2.0 construct, the involvement information being indicative of an involvement between the accessor and a third party (at 404) may include receiving an involvement information using a mashup that includes at least one Flash application at 423 (e.g. a mashup that provides audio or visual content to a viewer and a Flash application that provides animation or other enhanced interactive capabilities and that monitors or reports web browser activities).

In further implementations, involvement information using a machine-implemented Web 2.0 construct, the involvement information being indicative of an involvement between the accessor and a third party (at 404) may include receiving an involvement information using a mashup that include the electronic accessed content and at least one of a web service, an Ajax application, a Flash application, an electronic content, or another electronic accessed content at 425 (e.g. a mashup that includes a product review and an engine that monitors or reports web browser activities). Similarly, in some implementations, involvement information using a machine-implemented Web 2.0 construct, the involvement information being indicative of an involvement between the accessor and a third party (at 404) may include receiving an involvement information using an open source machine-implemented Web 2.0 construct at 427 (e.g. an open-source engine that monitors or reports web browser activities, or an open-source application that documents access time durations). In further implementations, involvement information using a machine-implemented Web 2.0 construct, the involvement information being indicative of an involvement between the accessor and a third party (at 404) may include receiving an involvement information using a user-community modifiable machine-implemented Web 2.0 construct at 429 (e.g. a user-community modifiable construct that monitors or reports downloading or browsing activities and time durations).

Figure 10:
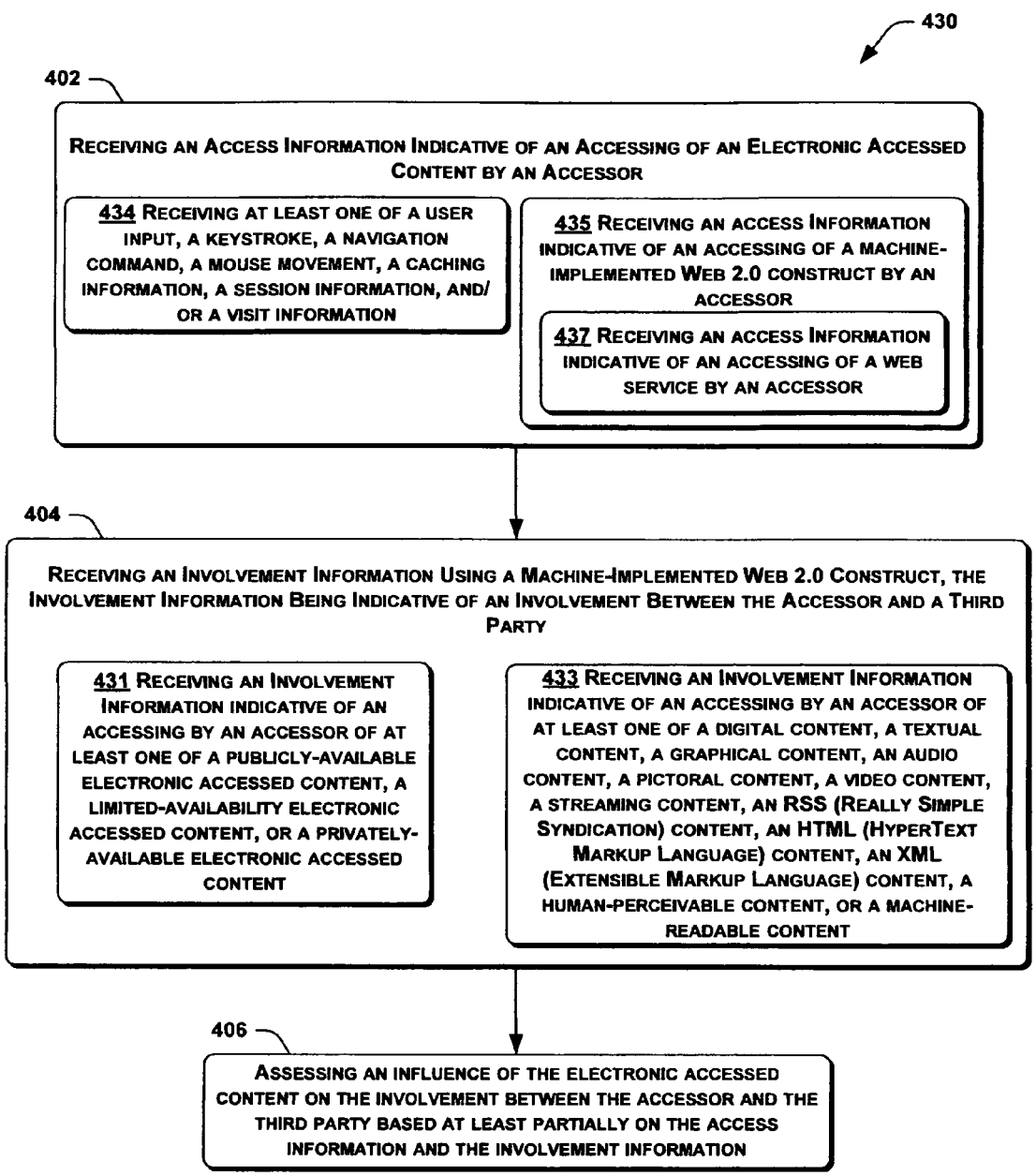

In some implementations, such as a process 430 shown in FIG. 10, involvement information using a machine-implemented Web 2.0 construct, the involvement information being indicative of an involvement between the accessor and a third party (at 404) may include access information indicative of an accessing by an accessor of at least one of a publicly-available electronic accessed content, a limited-availability electronic accessed content, or a privately-available electronic accessed content at 431. For example, the receiving of the access information (at 404) may include receiving an email message documenting a patron's accessing history of a publicly-available electronic library, a limited-availability electronic library (e.g. available only to registered patrons or pay-per-view patrons), or a privately-available electronic library (e.g. a library owned by a club or corporation).

Similarly, in some implementations, involvement information using a machine-implemented Web 2.0 construct, the involvement information being indicative of an involvement between the accessor and a third party (at 404) may include access information indicative of an accessing by an accessor of at least one of a digital content, a textual content, a graphical content, an audio content, a pictorial content, a video content, a streaming content, an RSS (Really Simple Syndication) content, an HTML (HyperText Markup Language) content, an XML (Extensible Markup Language) content, a human-perceivable content, or a machine-readable content at 433 (e.g. receiving electronic signals indicating a user's accessing of graphical content from a news-related service).

As further shown in FIG. 10, in some implementations, access information indicative of an accessing of an electronic accessed content by an accessor (at 402) may include at least one of a user input, a keystroke, a navigation command, a mouse movement, a caching information, a session information, and/or a visit information at 434. For example, the at least one of a user input, a keystroke, a navigation command, a mouse movement, a caching information, a session information, and/or a visit information may include information associated with, incidental to, and/or responsive to one or more of user mouse movements, scrolling movements, purchases, operations, visited Websites, visited blogs, page views, page visits, viewing time, repeat visits, page tags, printing a content, click stream, search strings, local search strings, interactions, scrolling, menu activity, corresponding/related to browsing the Internet, cut and past, print history, browsing history, email, cookies, user keystrokes, logged keystrokes along with the window name they are typed, email sent, email received, logged events, logged timeline, Website activity, logged Websites visited, application usage; log of applications run, documents opened, saved documents, files opened, files viewed, cut, cut and paste, scrolling, navigating, and setting a bookmark. In further implementations, the access information may include data indicative of a computing system environment, a local computing system interaction associated with the client-side computing device, a network interaction including bulk content downloaded to form a page, a turning of visibility tags on and off, and/or an interactive environment.

In further implementations, access information indicative of an accessing of an electronic accessed content by an accessor (at 402) may include access information indicative of an accessing of a machine-implemented Web 2.0 construct by an accessor at 435 (e.g. receiving information indicating a user's viewing of visual content from a mashup that includes a Web-based information service). More specifically, in some implementations, access information indicative of an accessing of a machine-implemented Web 2.0 construct by an accessor (at 435) may include access information indicative of an accessing of a web service by an accessor at 437 (e.g. receiving information indicating a user's viewing of visual content from a Web-based information service).

Figure 11:
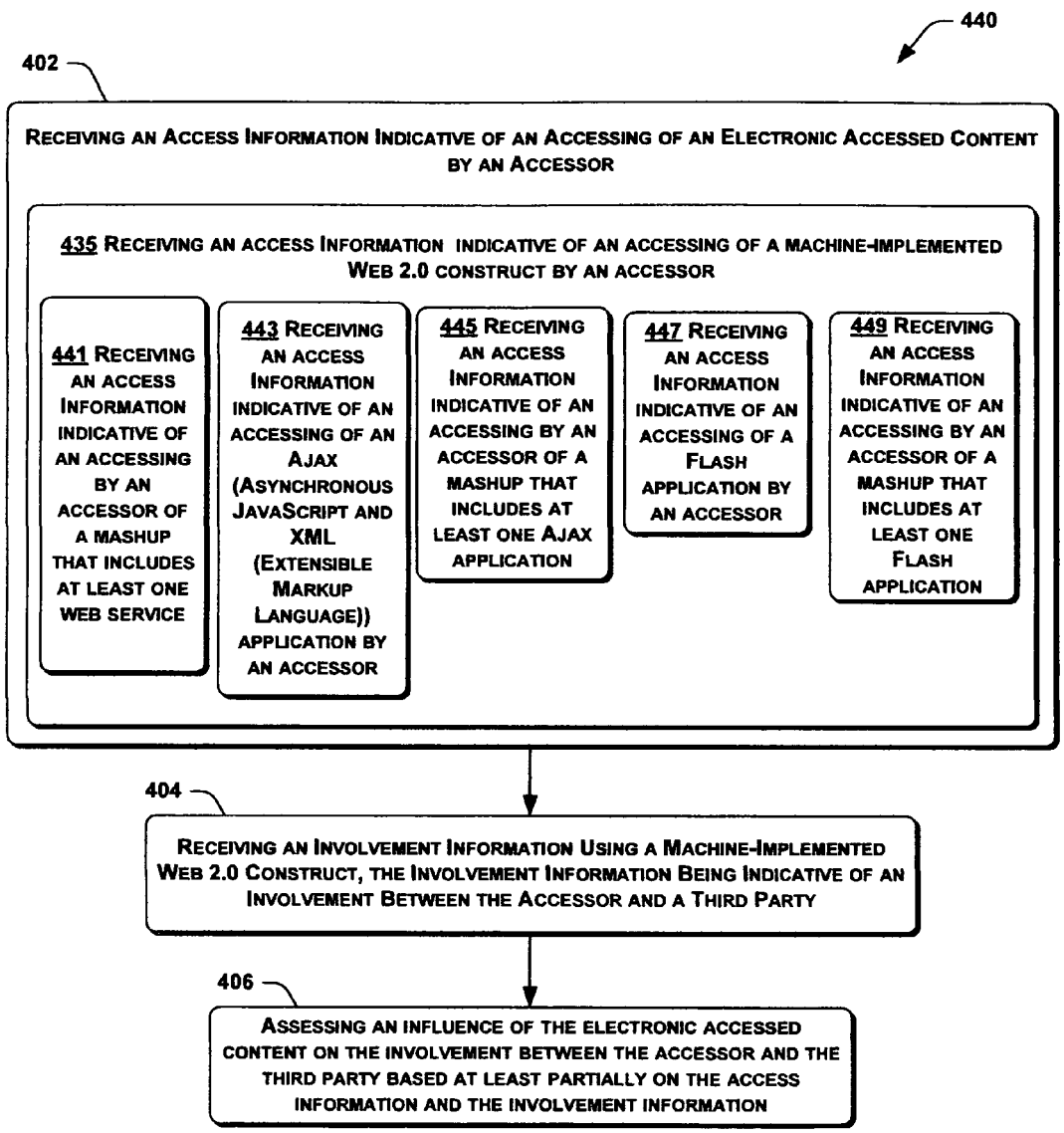

As depicted in a process 440 shown in FIG. 11, in some implementations, access information indicative of an accessing of a machine-implemented Web 2.0 construct by an accessor (at 435) may include access information indicative of an accessing by an accessor of a mashup that includes at least one web service at 441 (e.g. receiving information indicating a mobile device's downloading of audio content from a mashup that includes an RSS service). In further implementations, access information indicative of an accessing of a machine-implemented Web 2.0 construct by an accessor (at 435) may include access information indicative of an accessing of an Ajax (Asynchronous JavaScript and XML (Extensible Markup Language)) application by an accessor at 443 (e.g. receiving information indicating a PDA (Personal Data Assistant) access of an Ajax application from a website that provides Internet search services). Similarly, access information indicative of an accessing of a machine-implemented Web 2.0 construct by an accessor (at 435) may include access information indicative of an accessing by an accessor of a mashup that includes at least one Ajax application at 445 (e.g. receiving information indicating a PDA (Personal Data Assistant) access of a mashup that includes an Ajax application from a website that provides Internet search services).

As further shown in FIG. 11, in some implementations, access information indicative of an accessing of a machine-implemented Web 2.0 construct by an accessor (at 435) may include access information indicative of an accessing of a Flash application by an accessor at 447 (e.g. receiving information indicating a computer access of an animation-related Flash application from a website that offers books or other printed materials for sale). In further implementations, access information indicative of an accessing of a machine-implemented Web 2.0 construct by an accessor (at 435) may include access information indicative of an accessing by an accessor of a mashup that includes at least one Flash application at 449 (e.g. receiving information indicating a computer access of a mashup that includes an animation-related Flash application from a website that offers services for sale).

Figure 12:
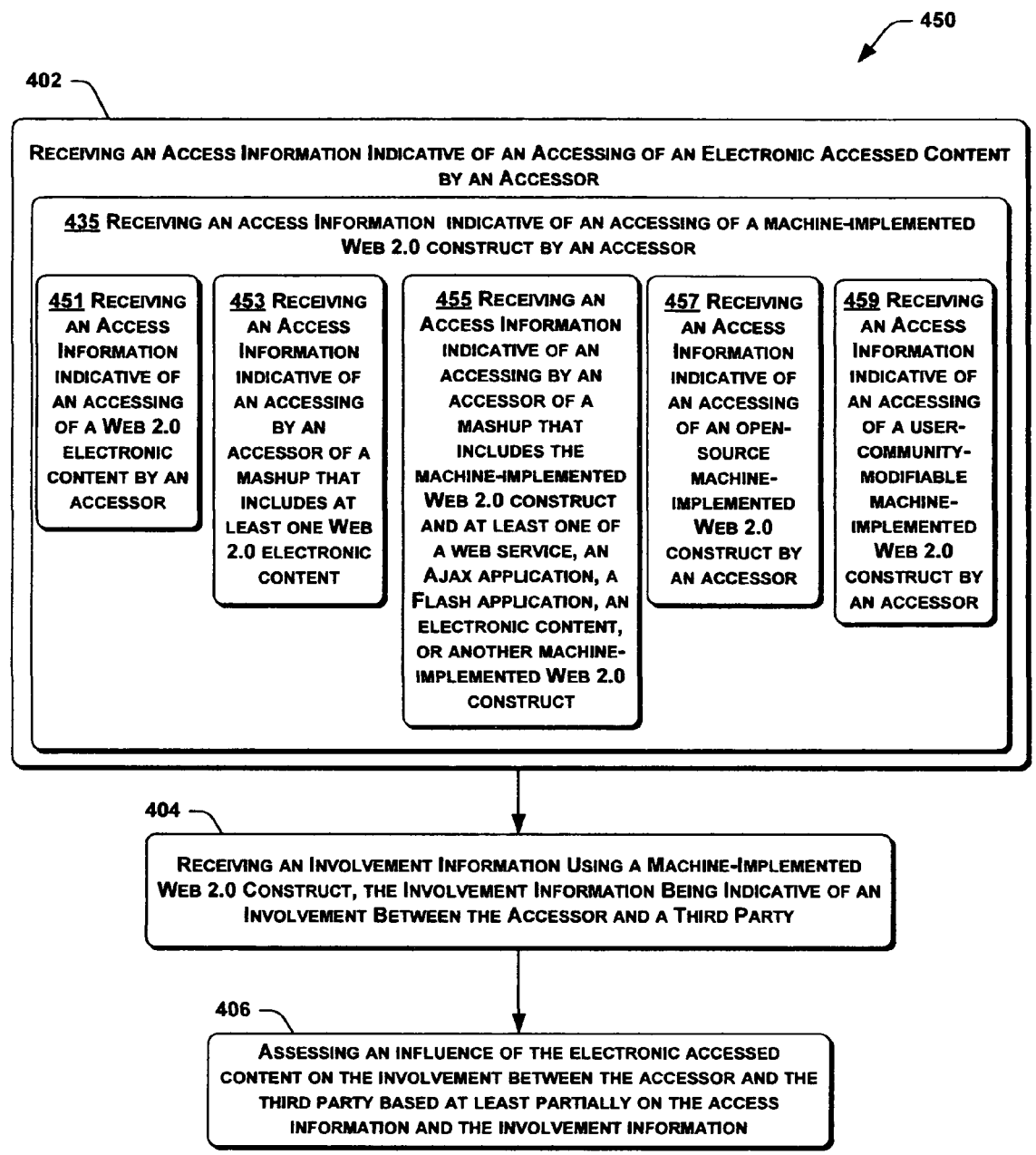

In some implementations, such as a process 450 shown in FIG. 12, access information indicative of an accessing of a machine-implemented Web 2.0 construct by an accessor (at 435) may include access information indicative of an accessing of a Web 2.0 electronic content by an accessor at 451 (e.g. receiving a report indicating an accessing of an electronic article by a potential consumer). In further implementations, access information indicative of an accessing of a machine-implemented Web 2.0 construct by an accessor (at 435) may include access information indicative of an accessing by an accessor of a mashup that includes at least one Web 2.0 electronic content at 453 (e.g. receiving a report indicating an accessing by a potential consumer of a mashup from a provider of advertising that includes an electronic article). Similarly, access information indicative of an accessing of a machine-implemented Web 2.0 construct by an accessor (at 435) may include access information indicative of an accessing by an accessor of a mashup that includes the machine-implemented Web 2.0 construct and at least one of a web service, an Ajax application, a Flash application, an electronic content, or another machine-implemented Web 2.0 construct at 455 (e.g. receiving documentation indicating an accessing by a potential consumer of a mashup from a provider of advertising that includes an Ajax application and a web service that facilitates an RIA (Rich Internet Application)).

As further shown in FIG. 12, access information indicative of an accessing of a machine-implemented Web 2.0 construct by an accessor (at 435) may include access information indicative of an accessing of an open-source machine-implemented Web 2.0 construct by an accessor at 457 (e.g. receiving information indicating an accessing by a browser of an open-source Ajax application). In still other implementations, access information indicative of an accessing of a machine-implemented Web 2.0 construct by an accessor (at 435) may include access information indicative of an accessing of a user-community-modifiable machine-implemented Web 2.0 construct by an accessor at 459 (e.g. receiving information indicating an accessing by a device of a user-community-modifiable asynchronous interface engine).

Figure 13:
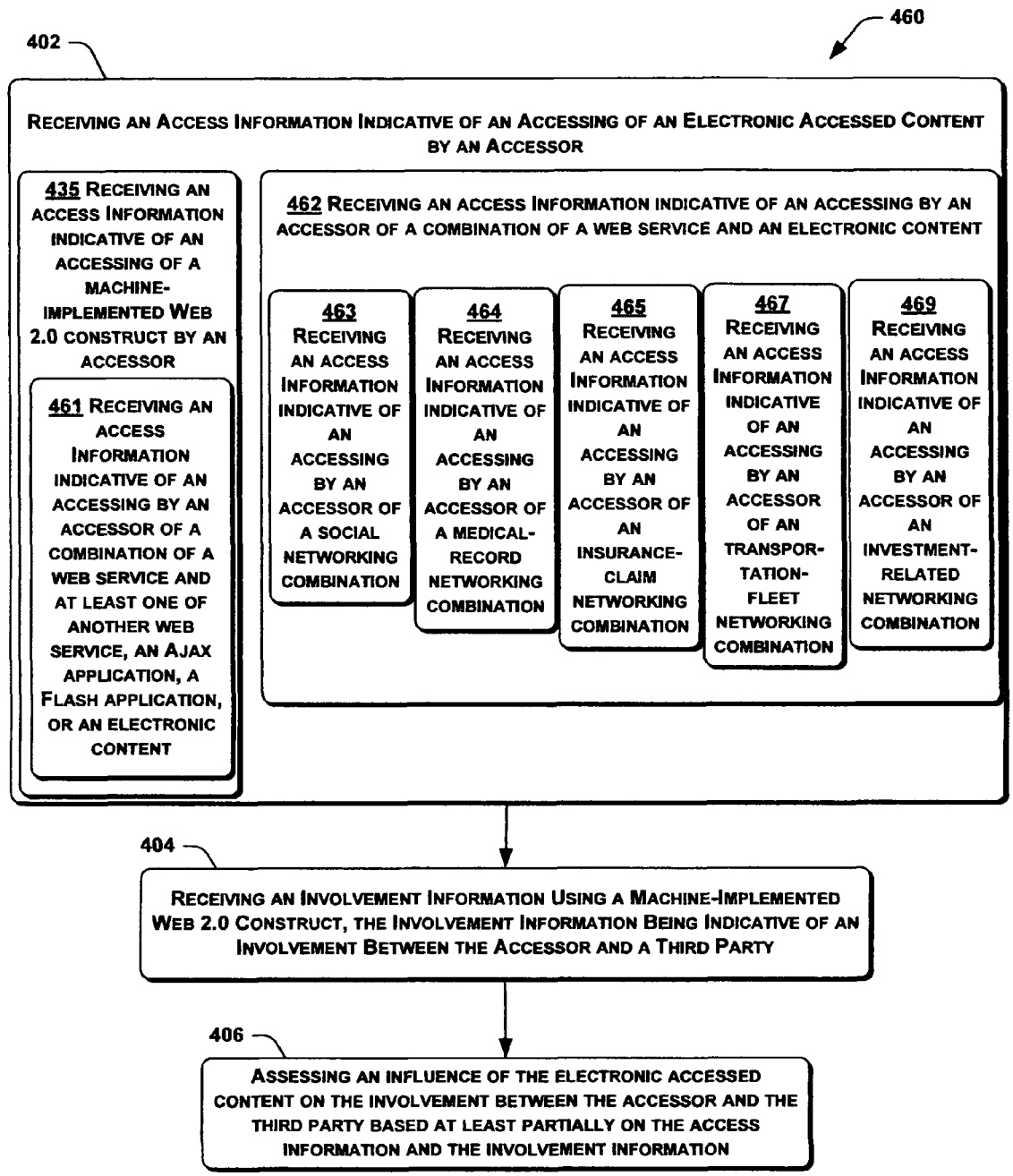

With reference now to FIG. 13, in a process 460, access information indicative of an accessing of a machine-implemented Web 2.0 construct by an accessor (at 435) may include access information indicative of an accessing by an accessor of a combination of a web service and at least one of another web service, an Ajax application, a Flash application, or an electronic content at 461 (e.g. receiving information indicating an accessing by a potential consumer of a combination of a Flash application that shows animation of a product in operation). Similarly, in some implementations, access information indicative of an accessing of a machine-implemented Web 2.0 construct by an accessor (at 435) may include access information indicative of an accessing by an accessor of a combination of a web service and an electronic content at 462 (e.g. receiving information indicating an accessing by a potential consumer of a combination of a consumer-advocacy service and an article regarding particular products or services).

It will be appreciated that access information indicative of an accessing by an accessor of a combination of a web service and an electronic content (at 462) may include numerous particular implementations. For example, as further shown in FIG. 13, in some implementations, access information indicative of an accessing by an accessor of a combination of a web service and an electronic content (at 462) may include access information indicative of an accessing by an accessor of a social networking combination at 463 (e.g. receiving information indicating an accessing by an individual of an Ajax application in combination with content related to potential dating partners). Similarly, in some implementations, access information indicative of an accessing by an accessor of a combination of a web service and an electronic content (at 462) may include access information indicative of an accessing by an accessor of a medical-record networking combination at 464 (e.g. receiving information indicating an accessing by an nurse of an asynchronous engine in combination with electronic information relating to patient medical history).

In further implementations, access information indicative of an accessing by an accessor of a combination of a web service and an electronic content (at 462) may include access information indicative of an accessing by an accessor of an insurance-claim networking combination at 465 (e.g. receiving information indicating an accessing by a claims adjustor of an application in combination with electronic information relating to vehicle repairs). Similarly, access information indicative of an accessing by an accessor of a combination of a web service and an electronic content (at 462) may include access information indicative of an accessing by an accessor of a transportation-fleet networking combination at 467 (e.g. receiving information indicating an accessing by a planner of an application in combination with electronic information relating to aircraft availability). In further implementations, access information indicative of an accessing by an accessor of a combination of a web service and an electronic content (at 462) may include access information indicative of an accessing by an accessor of an investment-related networking combination at 469 (e.g. receiving information indicating an accessing by a broker of a web service in combination with electronic information relating to stock prices).

Figure 14:
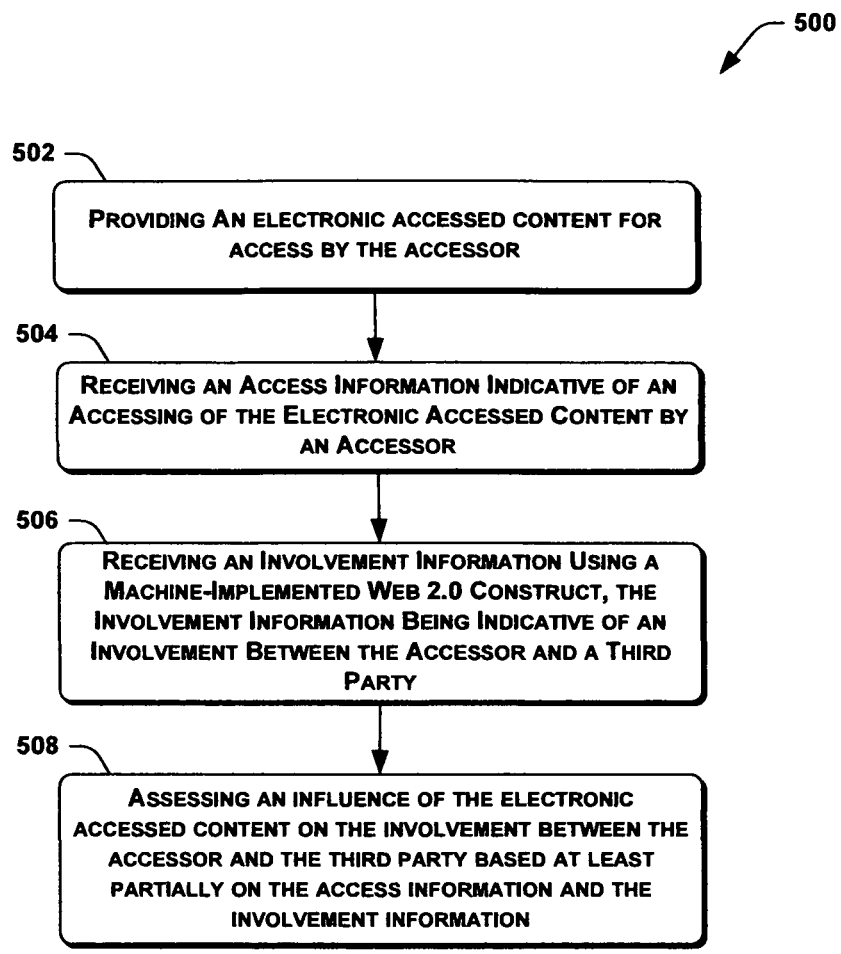

FIG. 14 is a flowchart of method 500 in accordance with another implementation of the present disclosure. In this implementation, the method 500 includes electronic accessed content for access by the accessor at 502 (e.g. operating a server that hosts the electronic accessed content, or offering a web service, or providing access to an electronic library), access information indicative of an accessing of an electronic accessed content by an accessor at 504 (e.g. receiving data packets indicating an accessing of the electronic accessed content), involvement information using a machine-implemented Web 2.0 construct, the involvement information being indicative of an involvement between the accessor and a third party at 506 (e.g. receiving information signals via a mashup that includes an Ajax application), and assess an influence of the electronic accessed content on the involvement between the accessor and the third party based at least partially on the access information and the involvement information at 508 (e.g. assessing an influence of the electronic accessed content on a purchase-and-sale transaction between and consumer and a vendor).

In some implementations, the electronic accessed content for access by the accessor at 502 may be performed by the same entity that performs the involvement information using a machine-implemented Web 2.0 construct, the involvement information being indicative of an involvement between the accessor and a third party at 506. For example, in some implementations, an entity that provides the electronic accessed content for access by the accessor and that receives involvement information using a machine-implemented Web 2.0 construct may include an online retailer, an online search provider, an information broker, an advertiser, a web service provider, or any other suitable entity.

Figure 15:
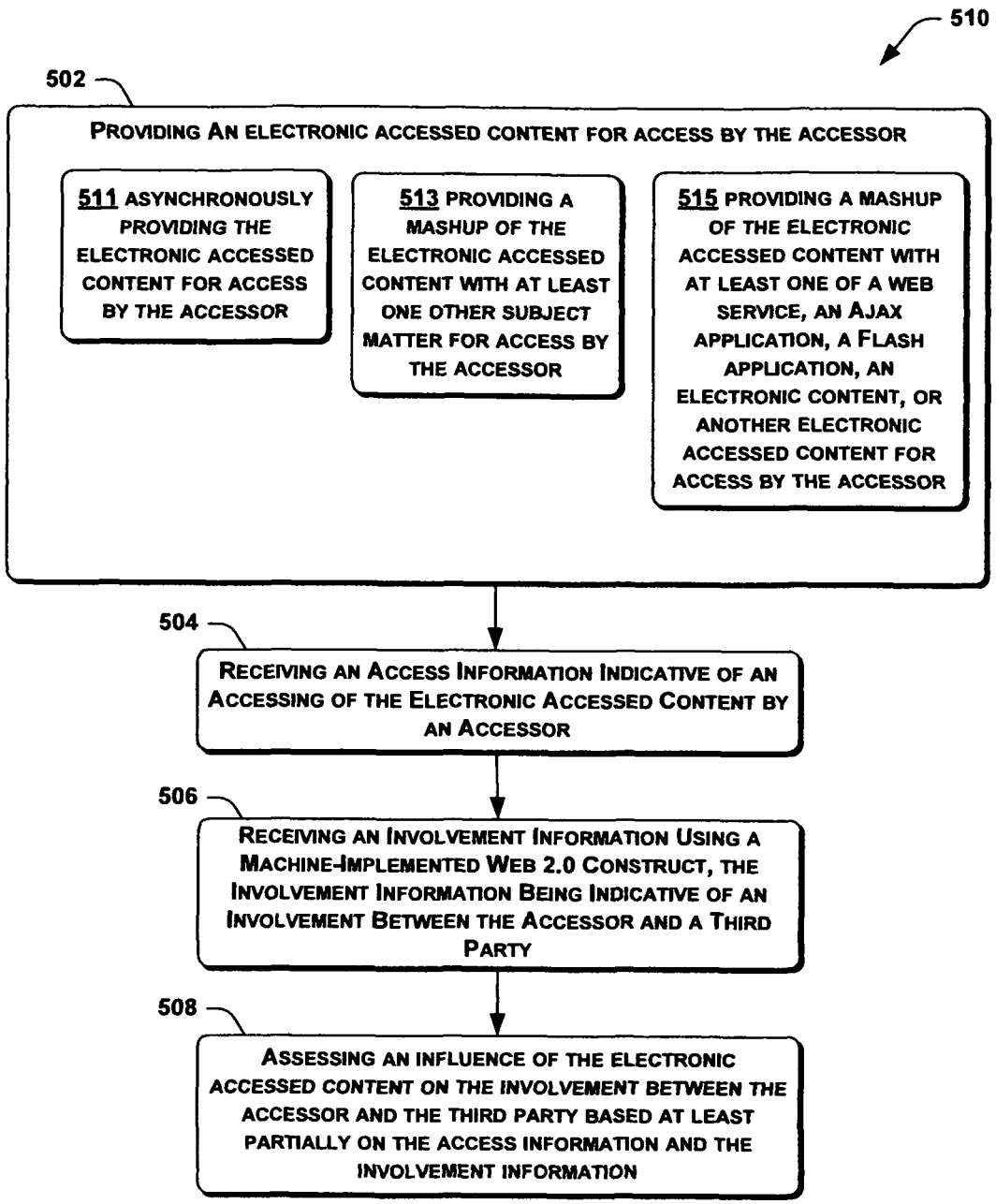

It will be appreciated that electronic accessed content for access by the accessor at 502 may be accomplished in a variety of ways. For example, in a method 510 as shown in FIG. 15, electronic accessed content for access by the accessor (at 502) includes asynchronously electronic accessed content for access by the accessor at 511 (e.g. providing the electronic accessed content using an asynchronous engine). Similarly, in some implementations, electronic accessed content for access by the accessor (at 502) may include a mashup of the electronic accessed content with at least one other subject matter for access by the accessor at 513 (e.g. providing a technical brochure mashed up with an HTML article). In further implementations, electronic accessed content for access by the accessor (at 502) may include a mashup of the electronic accessed content with at least one of a web service, an Ajax application, a Flash application, an electronic content, or another electronic accessed content for access by the accessor at 515 (e.g. providing a technical brochure mashed up with an RSS service).

Figure 16:
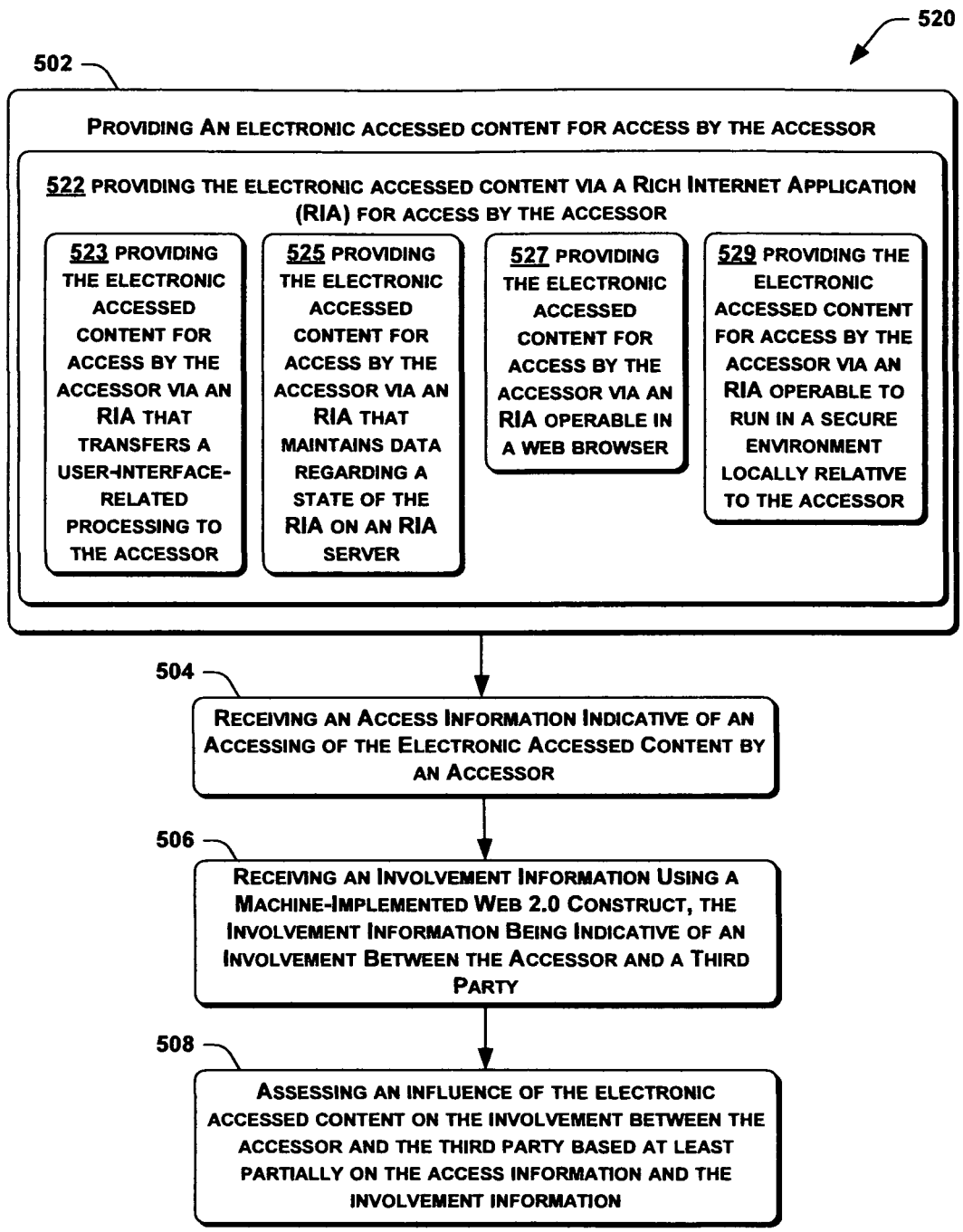

In further implementations, such as a process 520 shown in FIG. 16, electronic accessed content for access by the accessor (at 502) may include electronic accessed content via a Rich Internet Application (RIA) for access by the accessor at 522 (e.g. providing an editorial content using an interactive Flash application). More specifically, in some implementations, electronic accessed content via a Rich Internet Application (RIA) for access by the accessor (at 522) may include electronic accessed content for access by the accessor via an RIA that transfers a user-interface-related processing to the accessor at 523 (e.g. providing an editorial content using an interactive Flash application loaded onto a viewer's device that handles interface-related processing). Similarly, in some implementations, electronic accessed content via a Rich Internet Application (RIA) for access by the accessor (at 522) may include electronic accessed content for access by the accessor via an RIA that maintains data regarding a state of the RIA on an RIA server at 525 (e.g. providing an editorial content using an interactive Flash application on a server that hosts the Flash application and maintains state data thereon).

In further implementations, electronic accessed content via a Rich Internet Application (RIA) for access by the accessor (at 522) may include electronic accessed content for access by the accessor via an RIA operable in a web browser at 527 (e.g. providing an editorial content using an interactive Flash application operable in Microsoft's Internet Explorer®). Similarly, in some implementations, electronic accessed content via a Rich Internet Application (RIA) for access by the accessor (at 522) may include electronic accessed content for access by the accessor via an RIA operable to run in a secure environment locally relative to the accessor at 529 (e.g. providing an editorial content using a Mocha application operable in to run in a "sandbox" environment on a mobile device).

Figure 17:
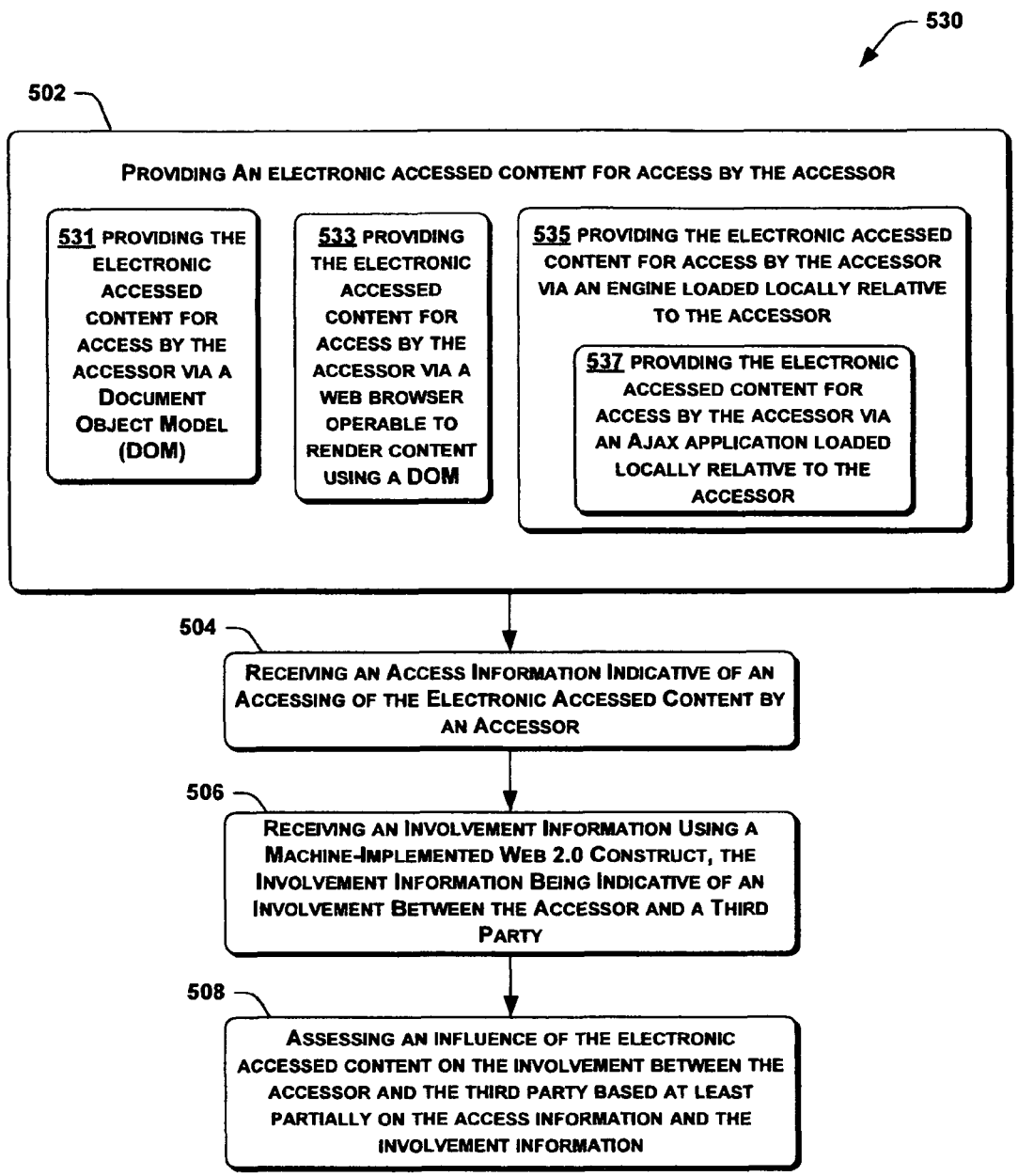

As shown in FIG. 17, in further implementations (e.g. process 530), electronic accessed content for access by the accessor (at 502) may include may include electronic accessed content for access by the accessor via a Document Object Model (DOM) at 531 (e.g. providing an audio packet using a DOM-based Ajax application). In other implementations, electronic accessed content for access by the accessor (at 502) may include electronic accessed content for access by the accessor via a web browser operable to render content using a DOM at 533 (e.g. providing a video stream using a DOM-renderable version of Google's Chrome® browser).

Similarly, in some implementations, electronic accessed content for access by the accessor (at 502) may include electronic accessed content for access by an accessor via an engine loaded locally relative to the accessor at 535 (e.g. providing an mpeg file using an asynchronous engine loaded on a viewer's mobile device). More specifically, in particular implementations, electronic accessed content for access by an accessor via an engine loaded locally relative to the accessor (at 535) may include via an Ajax application loaded locally relative to the accessor at 537 (e.g. providing an mpeg file using an Ajax-based engine loaded on a viewer's mobile device).

Figure 18:
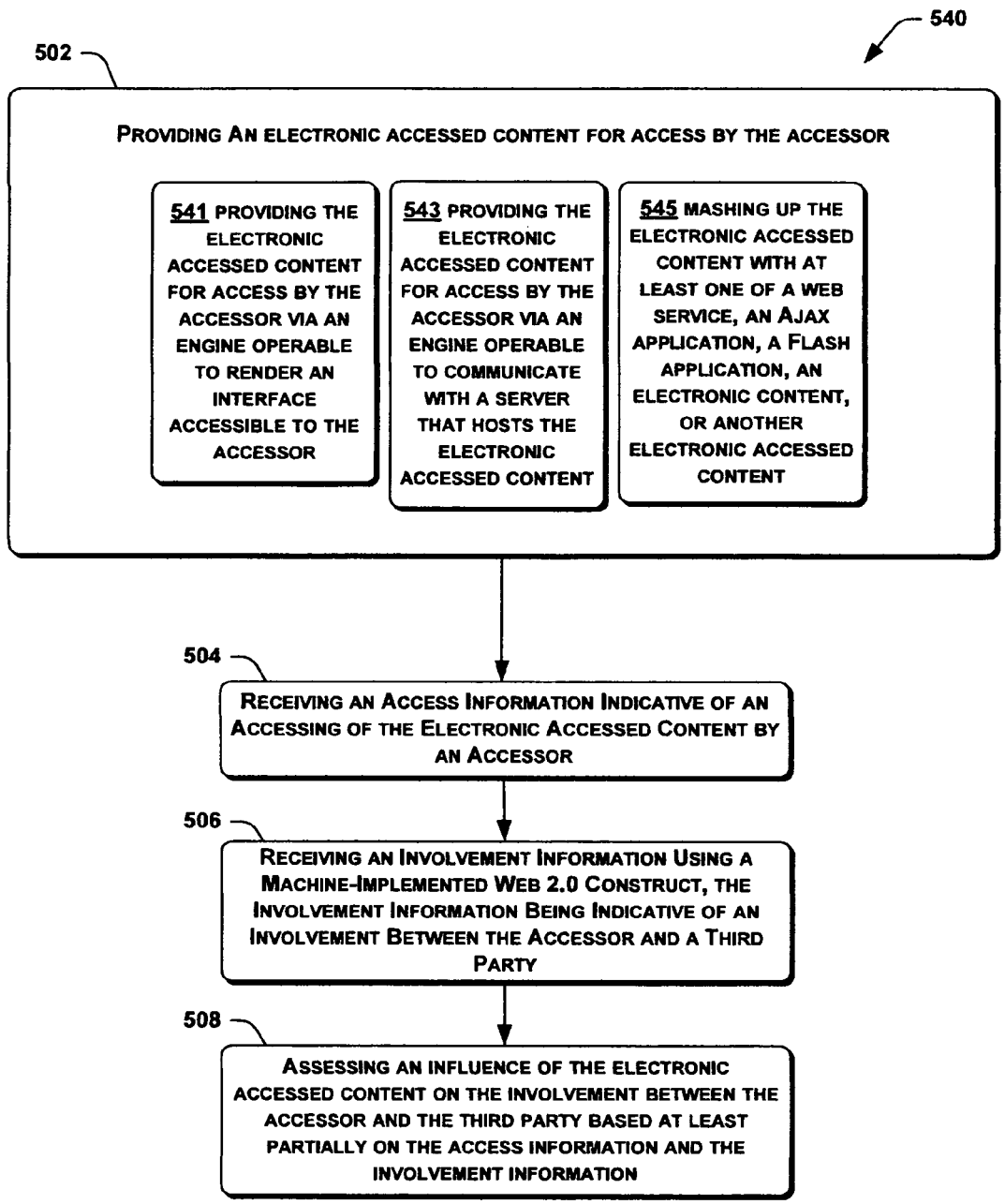

As shown in FIG. 18, in further implementations (e.g. a process 540), electronic accessed content for access by the accessor (at 502) may include via an engine operable to render an interface accessible to the accessor at 541 (e.g. providing an electronic communication using an application that performs menu-related functions). Similarly, electronic accessed content for access by the accessor (at 502) may include via an engine operable to communicate with a server that hosts the electronic accessed content at 543 (e.g. providing an electronic communication using an application that performs content-fetching functions). In other implementations, electronic accessed content for access by the accessor (at 502) may include up the electronic accessed content with at least one of a web service, an Ajax application, a Flash application, an electronic content, or another electronic accessed content at 545 (e.g. mashing up an electronic communication with an advertising service).

Figure 19:
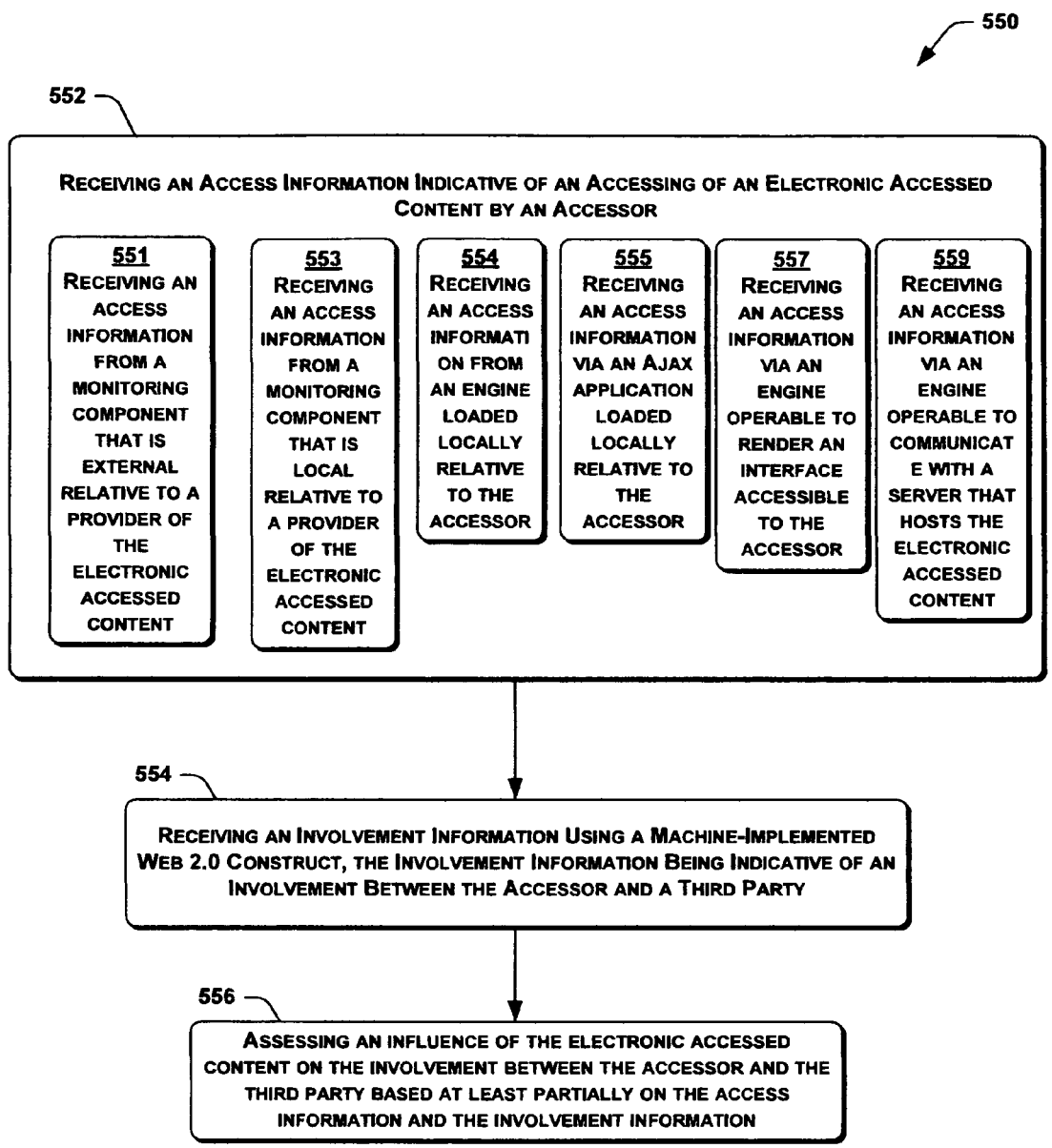

In still other implementations, such as process 550 shown in FIG. 19, access information indicative of an accessing of an electronic accessed content by an accessor (at 502) may include access information from a monitoring component that is external relative to a provider of the electronic accessed content at 551 (e.g. receiving a signal from a tracking cookie installed on the accessor's device). Similarly, access information indicative of an accessing of an electronic accessed content by an accessor (at 502) access information from a monitoring component that is local relative to a provider of the electronic accessed content at 553 (e.g. receiving a signal from an inwardly-looking application installed on a server that hosts the electronic accessed content).

In further implementations, electronic accessed content for access by the accessor (at 502) may include access information from an engine loaded locally relative to the accessor at 554 (e.g. receiving data from an Applet installed on a laptop of the accessor). In addition, electronic accessed content for access by the accessor (at 502) may include access information via an Ajax application loaded locally relative to the accessor at 555 (e.g. receiving data from an Ajax application installed on a computing device of the accessor). Similarly, electronic accessed content for access by the accessor (at 502) may include access information via an engine operable to render an interface accessible to the accessor at 557 (e.g. receiving information from an interface-rendering Ajax application installed on a computing device of the accessor). In still other implementations, electronic accessed content for access by the accessor (at 502) may include access information via an engine operable to communicate with a server that hosts the electronic accessed content at 559 (e.g. receiving information from a content-rendering Applet installed on a computing device of the accessor).

Figure 20:
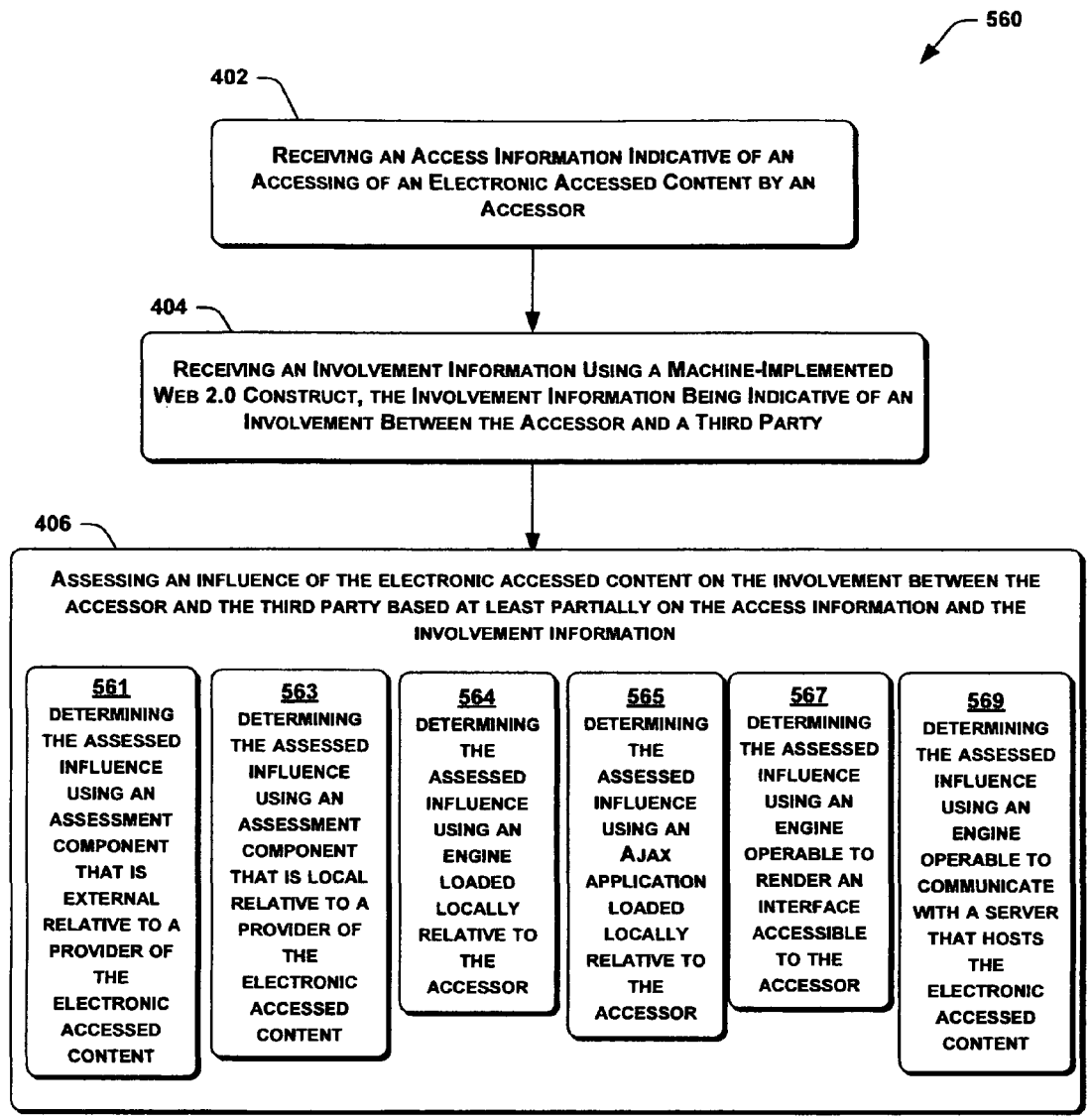

Referring now to FIG. 20, it may be noted that assess an influence of the electronic accessed content on the involvement between the accessor and the third party based at least partially on the access information and the involvement information (at 406) may be performed in a variety of suitable ways. For example, in some implementations, such as a process 560, assess an influence of the electronic accessed content on the involvement between the accessor and the third party based at least partially on the access information and the involvement information (at 406) may include determine the assessed influence using an assessment component that is external relative to a provider of the electronic accessed content at 561 (e.g. determining the assessed influence using software operated by a third party on a third-party computing device). Similarly, in some implementations, assess an influence of the electronic accessed content on the involvement between the accessor and the third party based at least partially on the access information and the involvement information (at 406) may include determine the assessed influence using an assessment component that is local relative to a provider of the electronic accessed content at 563 (e.g. determining the assessed influence using software operating on the computing device of the accessor).

In still other implementations, assess an influence of the electronic accessed content on the involvement between the accessor and the third party based at least partially on the access information and the involvement information (at 406) may include determine the assessed influence using an engine loaded locally relative to the accessor at 564 (e.g. determining the assessed influence using an asynchronously-operating application operating on a mobile device of the accessor). Similarly, assess an influence of the electronic accessed content on the involvement between the accessor and the third party based at least partially on the access information and the involvement information (at 406) may include determine the assessed influence using an Ajax application loaded locally relative to the accessor at 565 (e.g. determining the assessed influence using an Ajax application operating on a mobile device of the accessor). In further implementations, assess an influence of the electronic accessed content on the involvement between the accessor and the third party based at least partially on the access information and the involvement information (at 406) may include determine the assessed influence using an engine operable to render an interface accessible to the accessor at 567 (e.g. determining the assessed influence using an interface-rendering Applet). And in still other implementations, assess an influence of the electronic accessed content on the involvement between the accessor and the third party based at least partially on the access information and the involvement information (at 406) may include determine the assessed influence using an engine operable to communicate with a server that hosts the electronic accessed content at 569 (e.g. determining the assessed influence using a content-fetching Applet).

Figure 21:
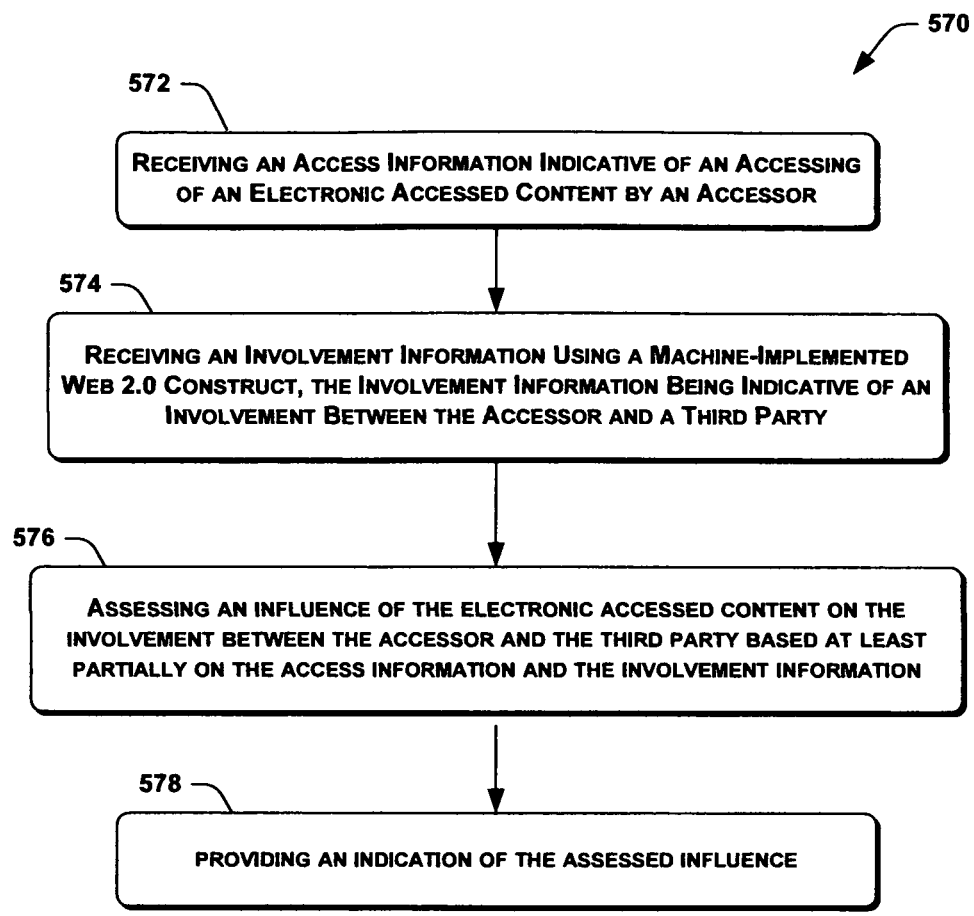

FIG. 21 is a flowchart of method 570 in accordance with another implementation of the present disclosure. In this implementation, the method 570 includes access information indicative of an accessing of an electronic accessed content by an accessor at 572 (e.g. receiving data indicating a period of access of a movie-review article by a potential movie-goer), involvement information using a machine-implemented Web 2.0 construct, the involvement information being indicative of an involvement between the accessor and a third party at 574 (e.g. receiving ticket-purchase information via a web service regarding the movie-goer's purchase of a ticket from a theater), assess an influence of the electronic accessed content on the involvement between the accessor and the third party based at least partially on the access information and the involvement information at 576 (e.g. assigning an influence level of the movie-review article to the movie-goer's ticket purchase), and provide an indication of the assessed influence at 578 (e.g. notifying the theater of the influence level of the movie-review article).

Figure 22:
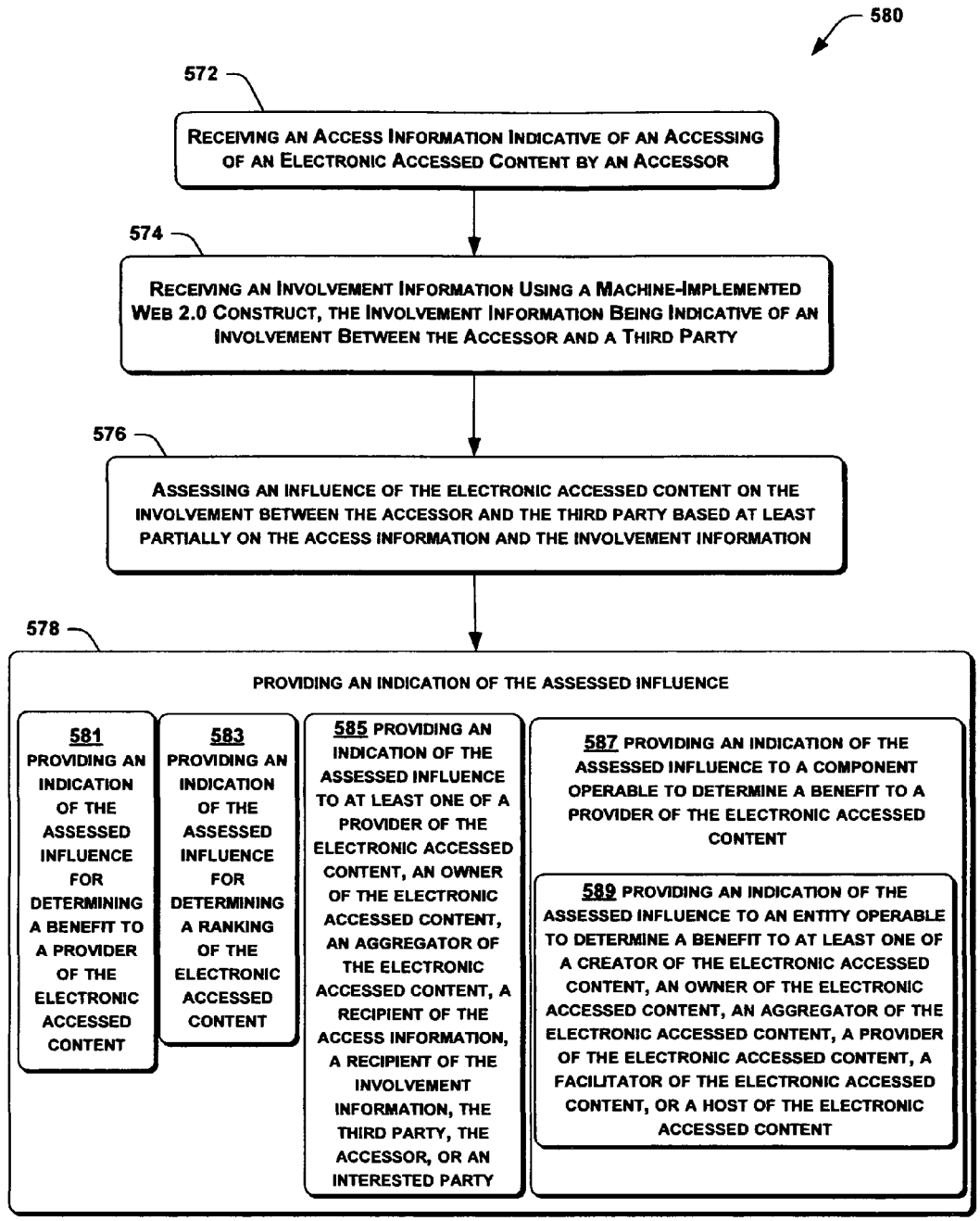

It will be appreciated that provide an indication of the assessed influence at 578 may be accomplished in a variety of ways. For example, in a process 580 shown in FIG. 22, provide an indication of the assessed influence (at 578) may include influence assessment component configured to provide an indication of the assessed influence for determining a benefit to a provider of the electronic accessed content at 581 (e.g. notifying the theater of the influence level from which the theater may decide to provide free passes to an author of the movie-review article). In some implementations, provide an indication of the assessed influence (at 578) may include for determining a ranking of the electronic accessed content at 583 (e.g. notifying the theater of the influence level from which the theater may decide whether to cite the movie-review article in a future press release). Similarly, provide an indication of the assessed influence (at 578) may include to at least one of a provider of the electronic accessed content, an owner of the electronic accessed content, an aggregator of the electronic accessed content, a recipient of the access information, a recipient of the involvement information, the third party, the accessor, or an interested party at 585 (e.g. notifying an electronic news-provider of the influence level of the movie-review article).

As further shown in FIG. 22, in some implementations, provide an indication of the assessed influence (at 578) includes to a component operable to determine a benefit to a provider of the electronic accessed content at 587 (e.g. notifying a software application of the influence level from which the software application may decide to provide free passes to an author of the movie-review article). It will be appreciated that to a component operable to determine a benefit to a provider of the electronic accessed content at 587 may be accomplished in a variety of suitable ways. For example, in some implementations, to a component operable to determine a benefit to a provider of the electronic accessed content (at 587) may include to an entity operable to determine a benefit to at least one of a creator of the electronic accessed content, an owner of the electronic accessed content, an aggregator of the electronic accessed content, a provider of the electronic accessed content, a facilitator of the electronic accessed content, or a host of the electronic accessed content at 589 (e.g. notifying a software application of the influence level from which the software application may decide to provide free passes to an electronic-news service that provided the movie-review article).

Figure 23:
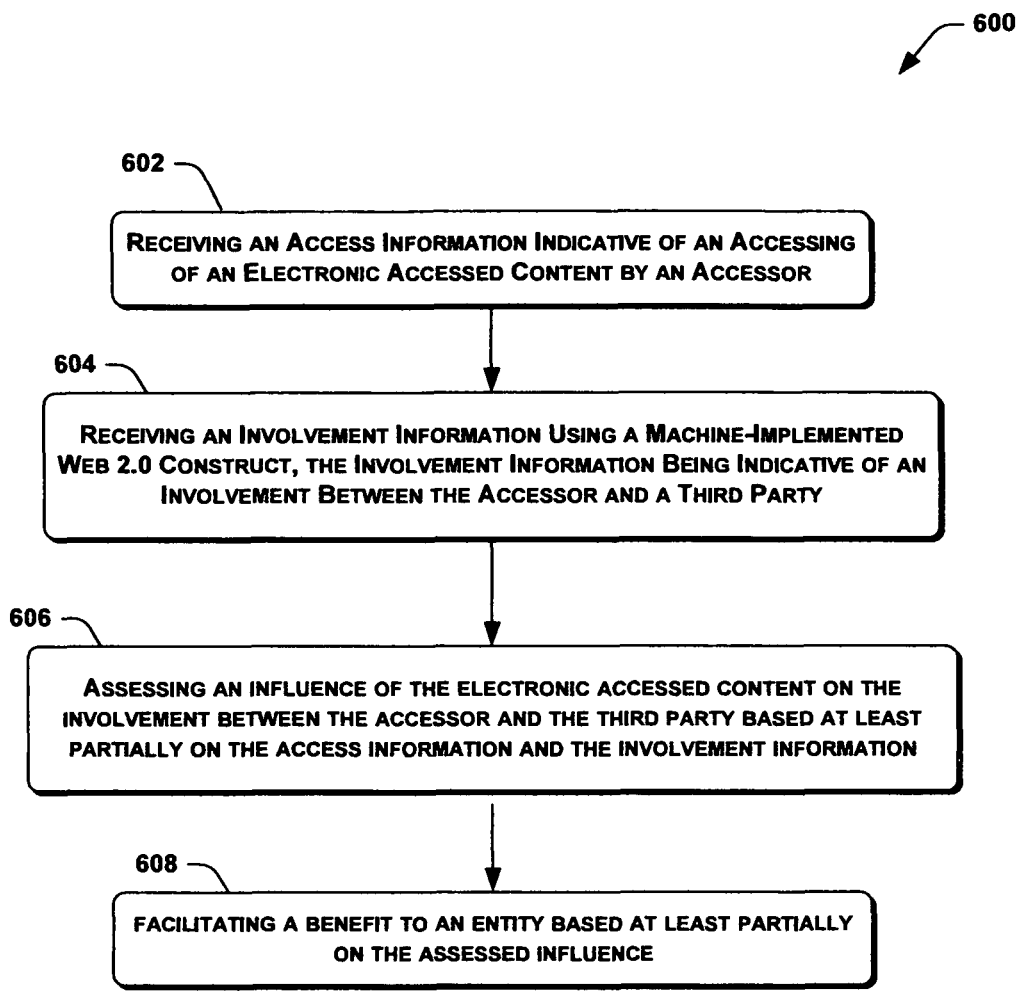
Figure 24:
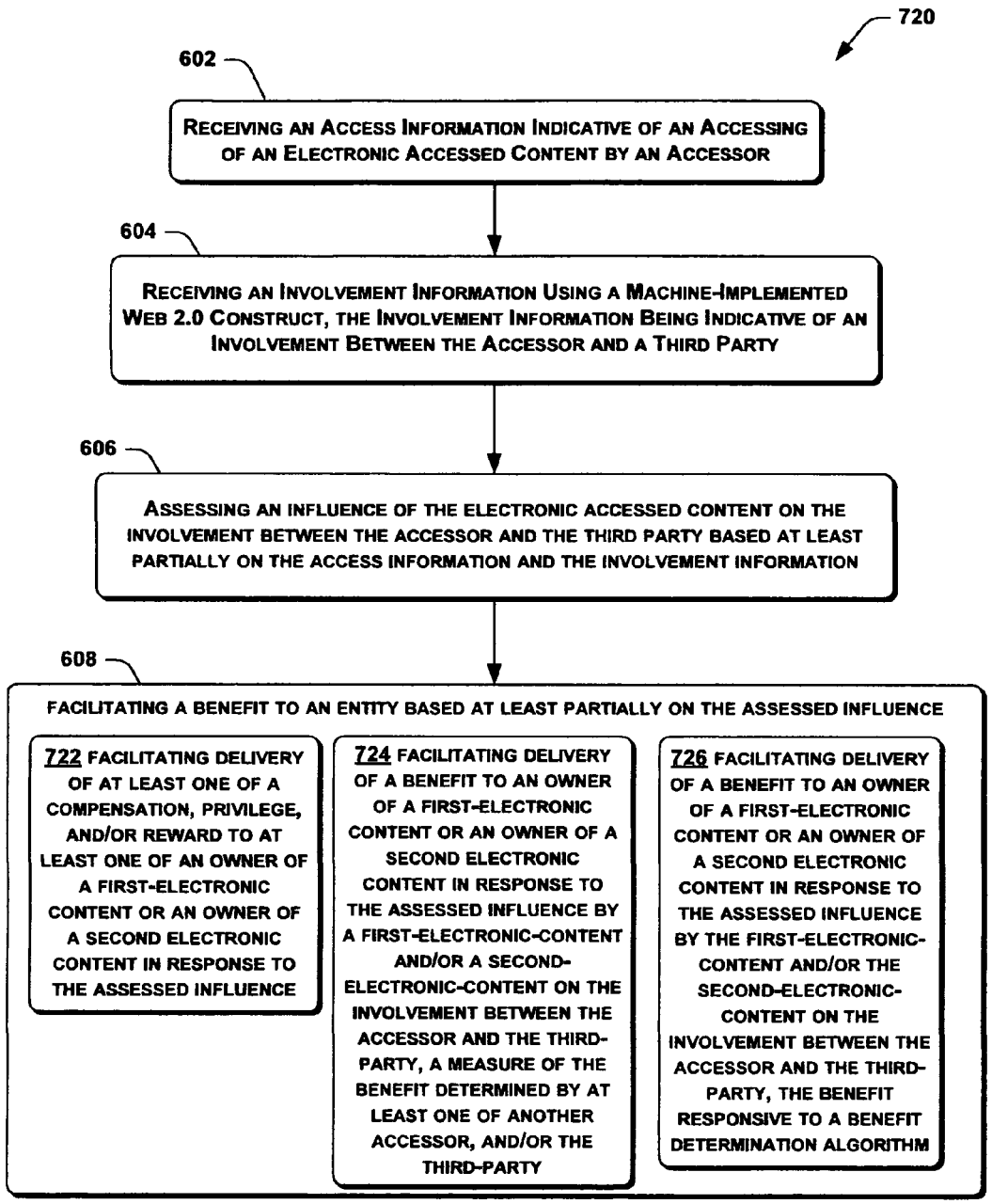

FIG. 23 is a flowchart of method 600 in accordance with another implementation of the present disclosure. In this implementation, the method 600 includes access information indicative of an accessing of an electronic accessed content by an accessor at 602 (e.g. receiving information indicating that an electronic news article was scanned by a webcrawler program), involvement information using a machine-implemented Web 2.0 construct, the involvement information being indicative of an involvement between the accessor and a third party at 604 (e.g. receiving involvement data indicative that the webcrawler program provided information regarding the news article, such as a copy of the news article, a ranking of the news article, etc., to an information broker), assess an influence of the electronic accessed content on the involvement between the accessor and the third party based at least partially on the access information and the involvement information at 606 (e.g. assessing an influence of the news article on the involvement between the webcrawler and the information broker, based on, for example, the webcrawler's ranking of the news article, or the information broker's subsequent usage of the news article, etc.), and facilitate a benefit to an entity based at least partially on the assessed influence at 608 (e.g. providing compensation to a provider of the news article based on the assessed influence).

It will be appreciated that facilitate a benefit to an entity based at least partially on the assessed influence at 608 may be accomplished in a variety of ways. For example, in a process 720 shown in FIG. 24, facilitate a benefit to an entity based at least partially on the assessed influence (at 608) may include delivery of at least one of a compensation, privilege, and/or reward to at least one of an owner of a first electronic content or an owner of a second electronic content in response to the assessed influence at 722 (e.g. recommending a credit for future goods or services be provided to an owner of the first electronic content based on an assessed influence that exceeds a predetermined threshold). Similarly, facilitate a benefit to an entity based at least partially on the assessed influence (at 608) may include delivery of a benefit to an owner of a first electronic content or an owner of a second electronic content in response to the assessed influence by a first electronic-content and/or a second electronic-content on the involvement between the accessor and the third-party, a measure of the benefit determined by at least one of another accessor, and/or the third-party at 724 (e.g. offering a service provided by an information broker at a reduced rate to an owner of a news article based on an assessed influence of the news article, the information broker determining that the reduced rate is 75% of a normal rate for the service). In further implementations, facilitate a benefit to an entity based at least partially on the assessed influence (at 608) may include delivery of a benefit to an owner of a first electronic content or an owner of a second electronic content in response to the assessed influence by the first electronic content and/or the second electronic content on the involvement between the accessor and the third-party, the benefit responsive to a benefit determination algorithm at 726 (e.g. providing a discount on flights of a particular airline to an owner of a travel agency based on a weighting formula that determines the amount of flights booked by the travel agency on the particular airline in comparison with the total amount of flights booked by all travel agencies).

Figure 25:
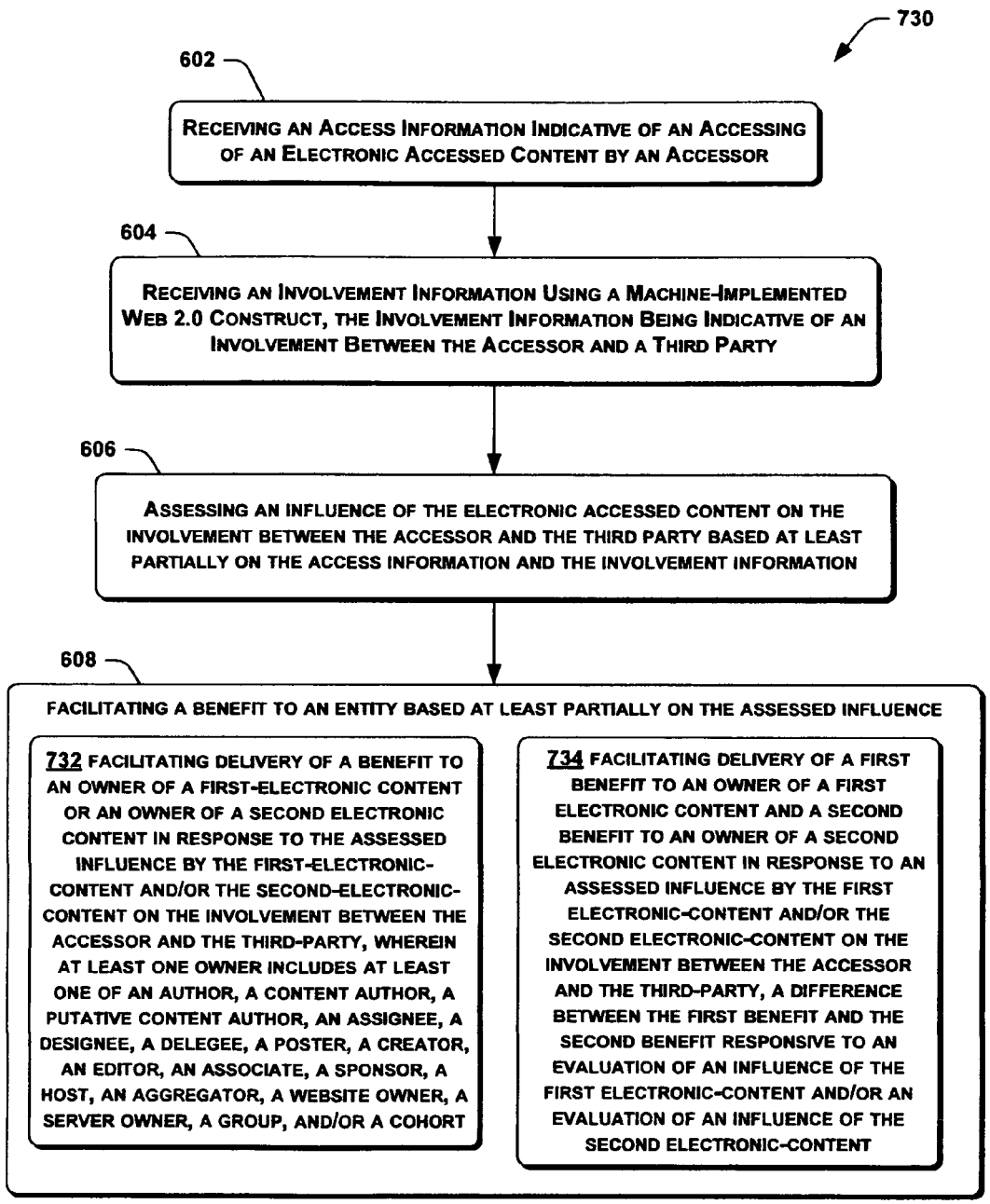

In addition, as depicted by a process 730 shown in FIG. 25, facilitate a benefit to an entity based at least partially on the assessed influence (at 608) may include delivery of a benefit to an owner of a first electronic content or an owner of a second electronic content in response to the assessed influence by the first electronic content and/or the second electronic content on the involvement between the accessor and the third-party, wherein at least one owner includes at least one of an author, a content author, a putative content author, an assignee, a designee, a delegee, a poster, a creator, an editor, an associate, a sponsor, a host, an aggregator, a website owner, a server owner, a group, and/or a cohort at 732 (e.g. transferring funds into a bank account of an organizer of a webcast event by an advertiser based on a determination that a viewer of a mashup of the webcast event and an advertisement influenced a purchase by the viewer of the advertiser's goods). In some implementations, facilitate a benefit to an entity based at least partially on the assessed influence (at 608) may include delivery of a first benefit to an owner of a first electronic content and a second benefit to an owner of a second electronic content in response to an assessed influence by the first electronic content and/or the second electronic content on the involvement between the accessor and the third-party, a difference between the first benefit and the second benefit responsive to an evaluation of an influence of the first electronic content and/or an evaluation of an influence of the second electronic content at 734 (e.g. providing a relatively smaller rate reduction on goods to a first author of a consumer report providing a moderately-positive endorsement of a product, and a relatively larger rate reduction on goods to a second author of a consumer report providing a highly-positive endorsement of the product, the difference between the larger and smaller rate reductions being based on an evaluation of the relative influence of the consumer reports by the first and second authors).

Figure 26:
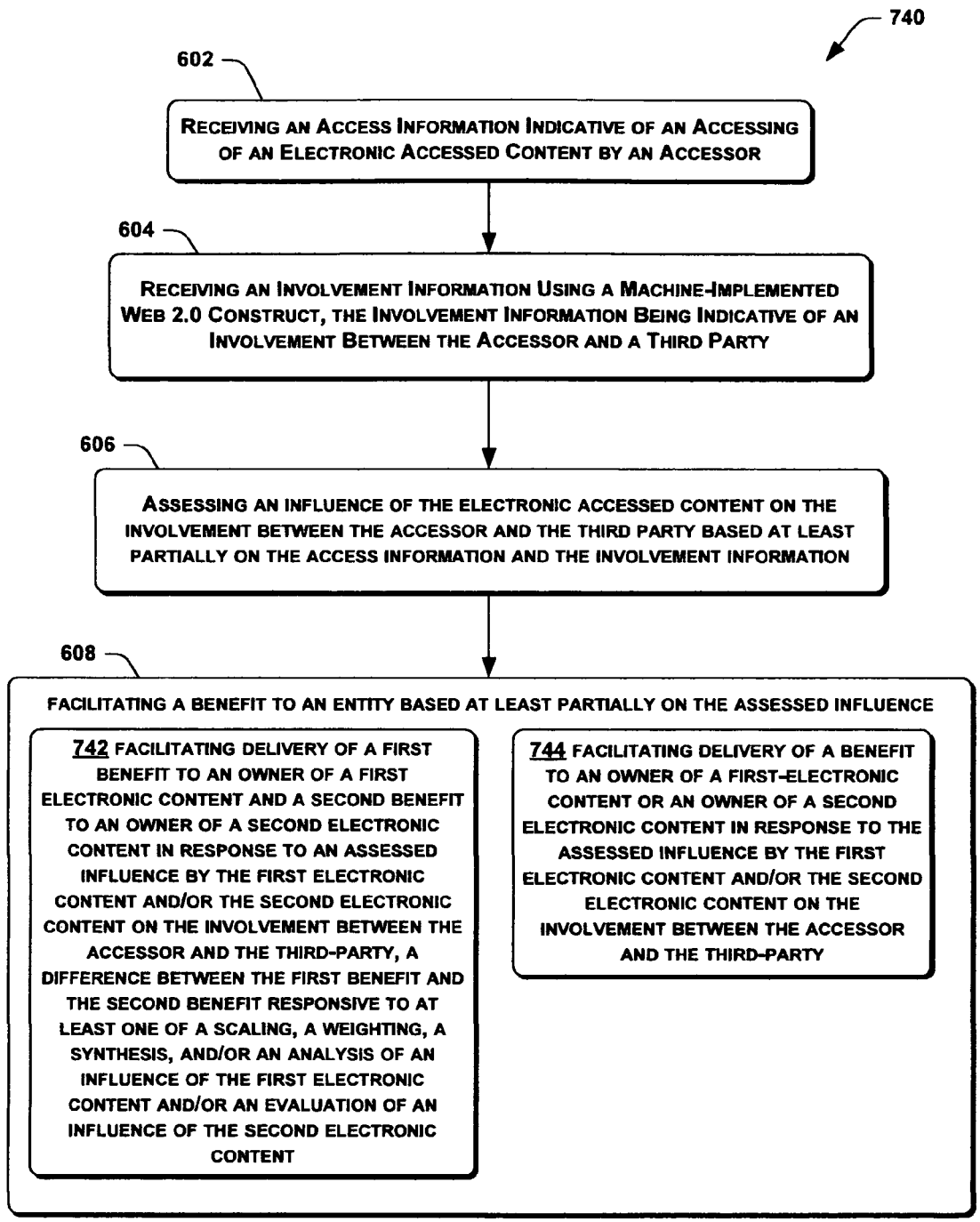

As shown in a process 740 illustrated in FIG. 26, in some implementations, facilitate a benefit to an entity based at least partially on the assessed influence (at 608) may include delivery of a first benefit to an owner of a first electronic content and a second benefit to an owner of a second electronic content in response to an assessed influence by the first electronic content and/or the second electronic content on the involvement between the accessor and the third-party, a difference between the first benefit and the second benefit responsive to at least one of a scaling, a weighting, a synthesis, and/or an analysis of an influence of the first electronic content and/or an evaluation of an influence of the second electronic content at 742 (e.g. sending first and second compensations to first and second content providers, respectively, a difference between the first and second compensations being based on relative percentages of gross sales attributable to influences by the first and second contents). Similarly, in some implementations, facilitate a benefit to an entity based at least partially on the assessed influence (at 608) may include delivery of a benefit to an owner of a first electronic content or an owner of a second electronic content in response to the assessed influence by the first electronic content and/or the second electronic content on the involvement between the accessor and the third-party at 744 (e.g. sending a percentage of profit to a provider of a map-generating service by a real estate agency that provides a mashup of real estate listings combined with the map-generating service to potential buyers based on an assessed influence of the map-generating service on actual sales of real estate to actual buyers).

Figure 27:
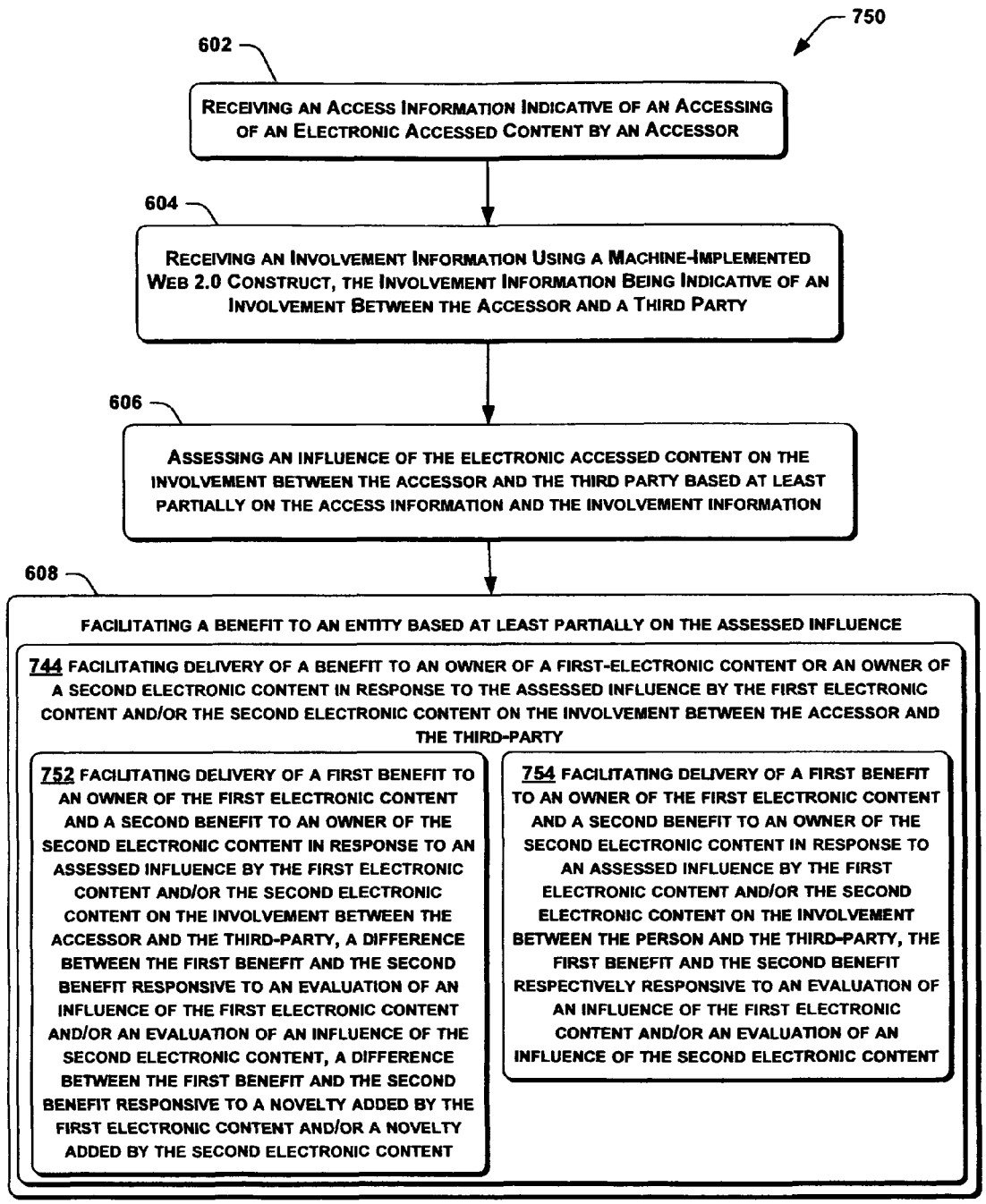

More specifically, as illustrated by a process 750 shown in FIG. 27, in some implementations, delivery of a benefit to an owner of a first electronic content or an owner of a second electronic content in response to the assessed influence by the first electronic content and/or the second electronic content on the involvement between the accessor and the third-party (at 744) may include delivery of a first benefit to an owner of the first electronic content and a second benefit to an owner of the second electronic content in response to an assessed influence by the first electronic content and/or the second electronic content on the involvement between the accessor and the third party, a difference between the first benefit and the second benefit responsive to an evaluation of an influence of the first electronic content and/or an evaluation of an influence of the second electronic content, a difference between the first benefit and the second benefit responsive to a novelty added by the first electronic content and/or a novelty added by the second electronic content at 752 (e.g. providing first and second compensations to first and second authors of scientific content based on evaluations of the respective influences of the scientific contents provided by the first and second authors on sales of scientific equipment, the influence evaluations being responsive to relative amounts of novel contributions to a particular scientific field provided by the first and second authors, respectively). Similarly, delivery of a benefit to an owner of a first electronic content or an owner of a second electronic content in response to the assessed influence by the first electronic content and/or the second electronic content on the involvement between the accessor and the third-party (at 744) may include delivery of a first benefit to an owner of the first electronic content and a second benefit to an owner of the second electronic content in response to an assessed influence by the first electronic content and/or the second electronic content on the involvement between the person and the third-party, the first benefit and the second benefit respectively responsive to an evaluation of an influence of the first electronic content and/or an evaluation of an influence of the second electronic content at 754 (e.g. providing first and second compensations to first and second authors of astronomy-related content based on first and second evaluations of the respective influences of the astronomy-related contents provided by the first and second authors on sales of astronomy-related literature).

Figure 28:
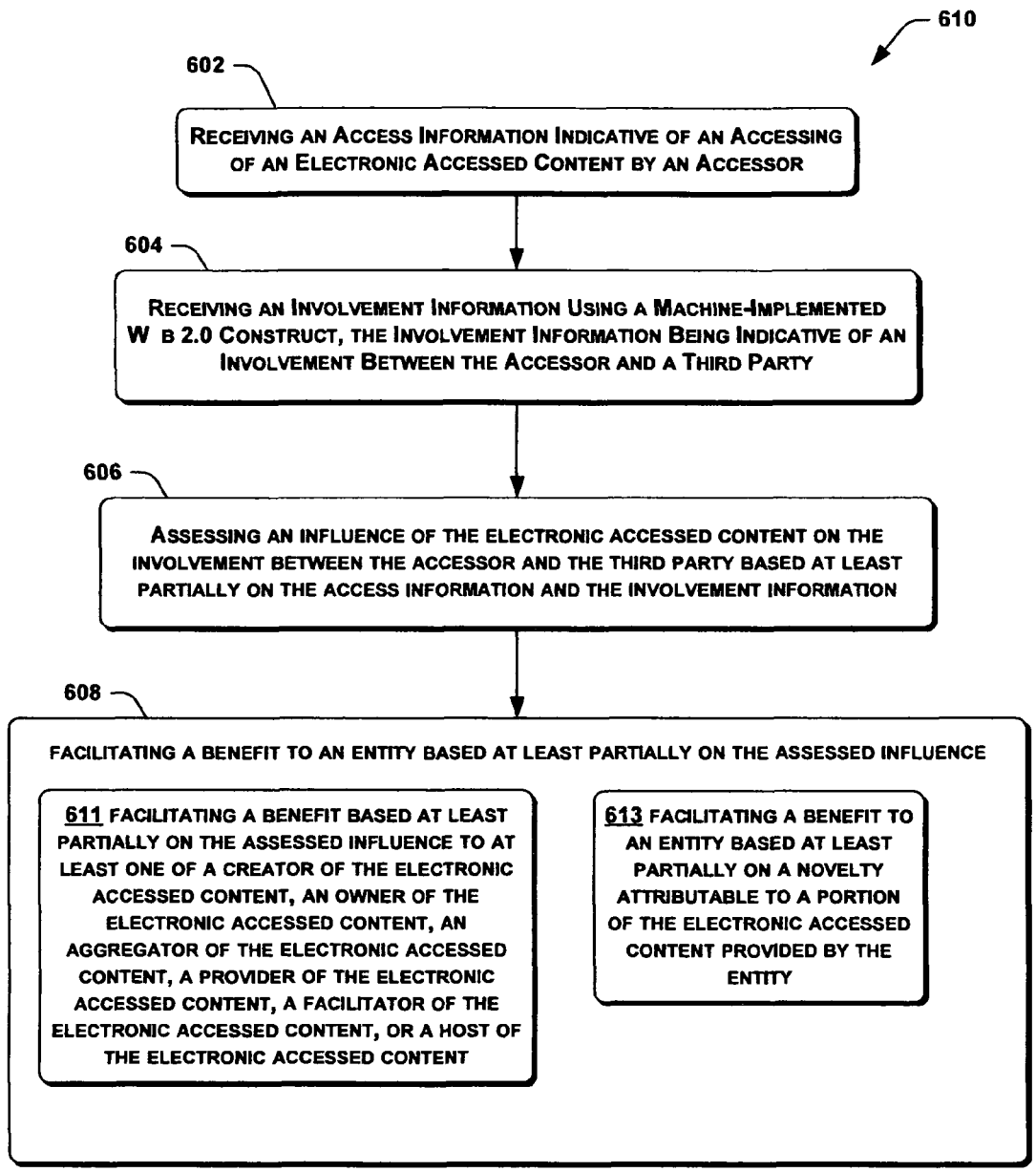

Similarly, in a process 610 shown in FIG. 28, facilitate a benefit to an entity based at least partially on the assessed influence (at 608) may include a benefit based at least partially on the assessed influence to at least one of a creator of the electronic accessed content, an owner of the electronic accessed content, an aggregator of the electronic accessed content, a provider of the electronic accessed content, a facilitator of the electronic accessed content, or a host of the electronic accessed content at 611 (e.g. providing a quantity of free web services to an online search provider that facilitates access to electronic accessed content based on an assessment of the influence of the electronic accessed content on an accessor's usage of the web service). Similarly, in some implementations, facilitate a benefit to an entity based at least partially on the assessed influence (at 608) may include a benefit to an entity based at least partially on a novelty attributable to a portion of the electronic accessed content provided by the entity at 613 (e.g. facilitating a compensation to an aggregator of movie reviews based on a novelty of the content provided by the aggregator).

Figure 29:
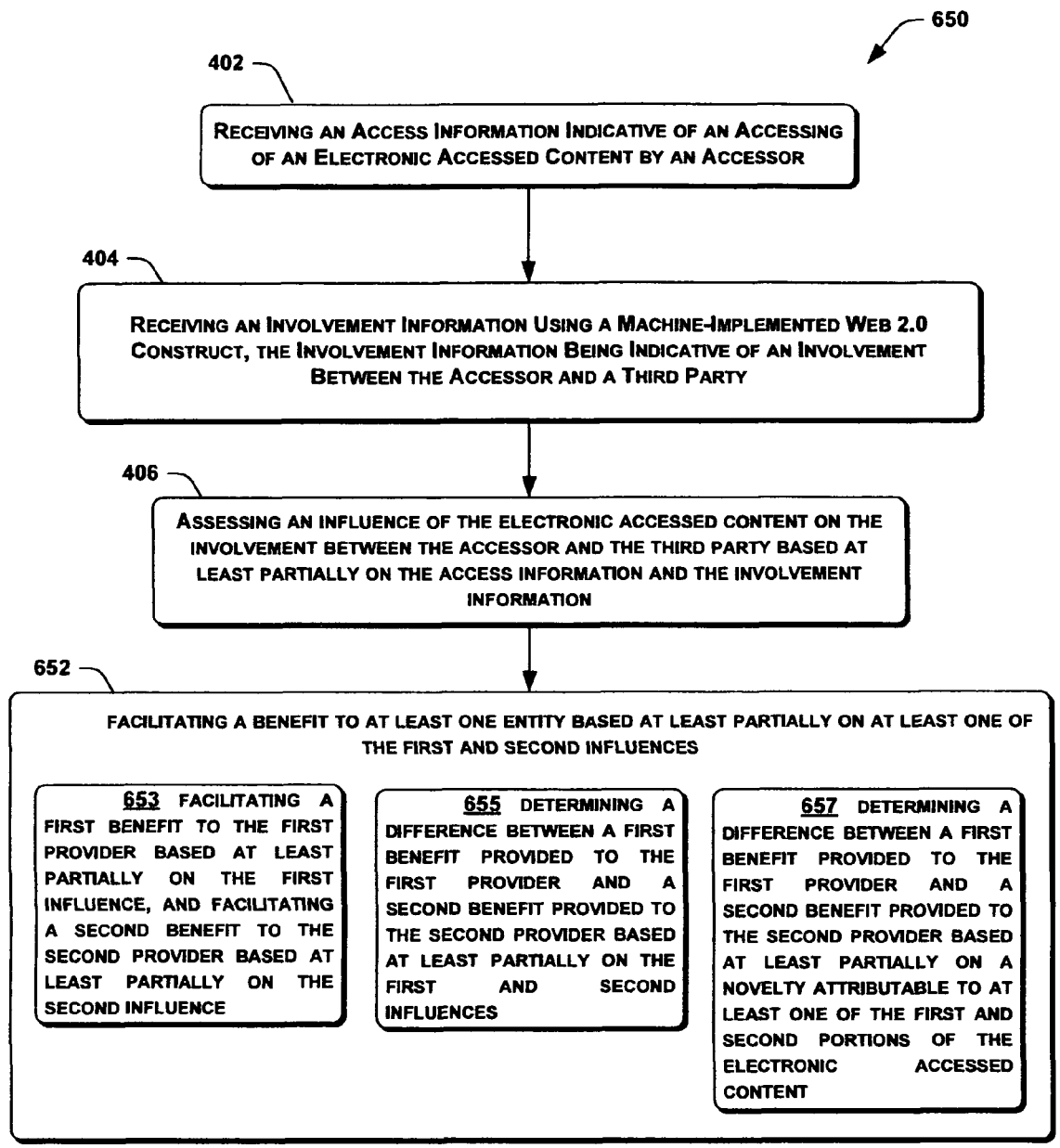

FIG. 29 is a flowchart of process 650 in accordance with another implementation of the present disclosure. In this implementation, the process 650 includes access information indicative of an accessing of an electronic accessed content by an accessor at 402 (e.g. receiving a browsing history showing a "hit" on a home improvement website by a browser), involvement information using a machine-implemented Web 2.0 construct, the involvement information being indicative of an involvement between the accessor and a third party at 404 (e.g. receiving order information indicative of an order of home improvement supplies by the browser from a supply seller), assess an influence of the electronic accessed content on the involvement between the accessor and the third party based at least partially on the access information and the involvement information at 406 (e.g. assessing an influence of the website on the order of home improvement supplies based at least partially on the browsing history and the order information), and a benefit to at least one entity based at least partially on at least one of a first influence attributable to a first portion of the electronic accessed content and a second influence attributable to a second portion of the electronic accessed content at 652 (e.g. calculating a quantum of compensation to an owner of the website based on a first influence attributable to an advertisement portion of the website and a second influence attributable to an instructional "how-to" portion of the website).

As shown in FIG. 29, in some implementations, a benefit to at least one entity based at least partially on at least one of a first influence attributable to a first portion of the electronic accessed content and a second influence attributable to a second portion of the electronic accessed content (at 652) may include a first benefit to a first provider of a first portion of the electronic accessed content based at least partially on a first influence and a second benefit to a second provider of a second portion of the electronic accessed content based at least partially on a second influence at 653 (e.g. calculating a first quantum of compensation to an advertiser based on a first influence attributable to an advertisement portion of a website and calculating a second quantum of compensation to an author based on a second influence attributable to an instructional "how-to" portion of the website). In further implementations, a benefit to at least one entity based at least partially on at least one of a first influence attributable to a first portion of the electronic accessed content and a second influence attributable to a second portion of the electronic accessed content (at 652) may include a difference between a first benefit provided to a first provider of a first portion of the electronic accessed content and a second benefit provided to a second provider of a second portion of the electronic accessed content based at least partially on the first and second influences at 655 (e.g. calculating a difference between a first quantum of compensation provided to an advertiser and a second quantum of compensation to an author of an instructional "how-to" portion of the website based at least partially on the first and second influences). In still other implementations, a benefit to at least one entity based at least partially on at least one of a first influence attributable to a first portion of the electronic accessed content and a second influence attributable to a second portion of the electronic accessed content (at 652) may include a difference between a first benefit provided to a first provider of a first portion of the electronic accessed content and a second benefit provided to a second provider of a second portion of the electronic accessed content based at least partially on a novelty attributable to at least one of the first and second portions of the electronic accessed content at 657 (e.g. calculating a difference between a first quantum of compensation provided to an advertiser and a second quantum of compensation to an author of an instructional "how-to" portion of the website based at least partially on a novelty attributable to the advertisement portion and the "how-to" portion of the website).

Figure 30:
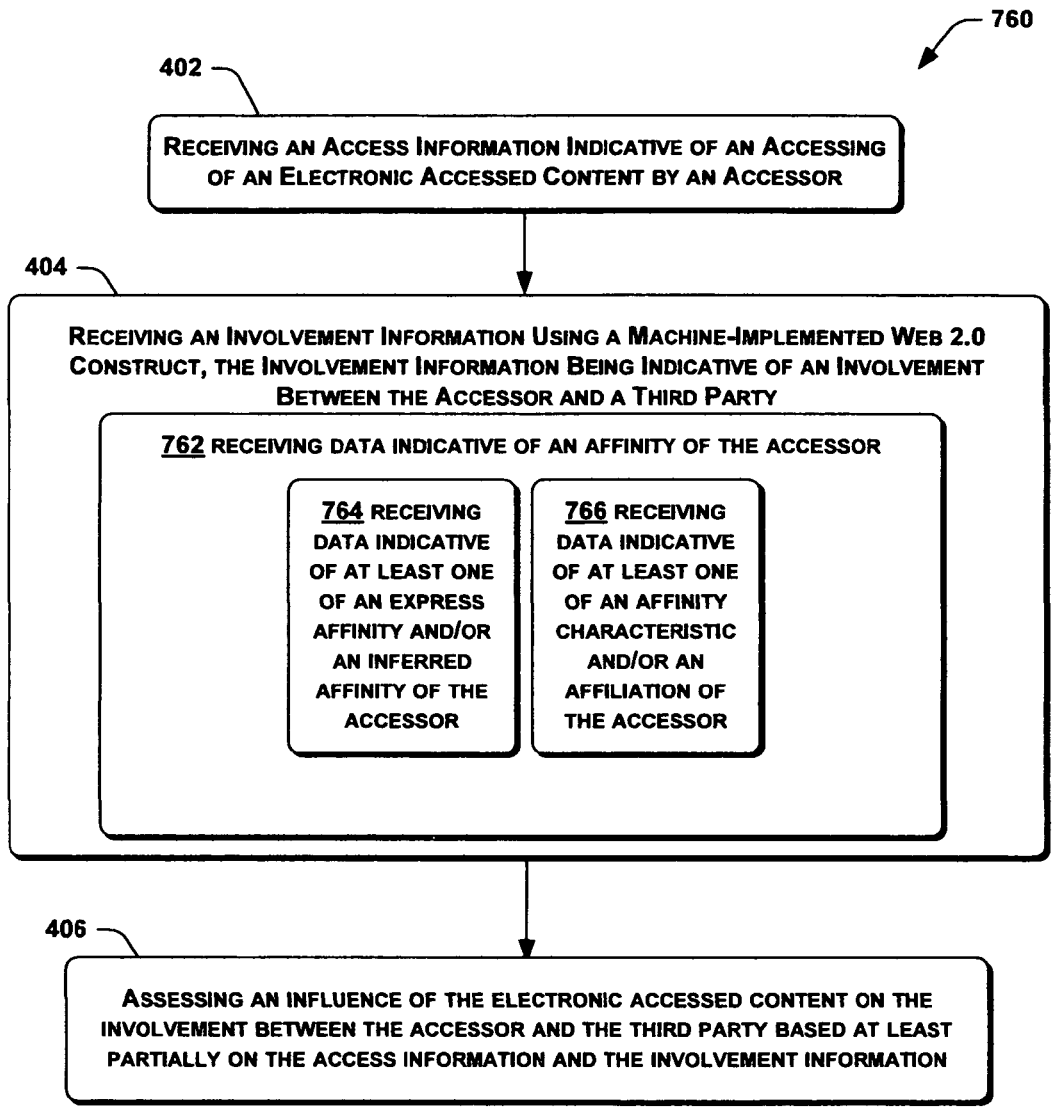

With reference to FIG. 30, in some implementations, such as a process 760, involvement information using a machine-implemented Web 2.0 construct, the involvement information being indicative of an involvement between the accessor and a third party (at 404) may include data indicative of an affinity of the accessor at 762 (e.g. receiving data indicating that the accessor prefers to purchase products manufactured in the United States). More specifically, data indicative of an affinity of the accessor (at 762) may include data indicative of at least one of an express affinity and/or an inferred affinity of the accessor at 764 (e.g. receiving data indicative of a consumer's track record of purchasing products promoted by females over competing products promoted by males). In further implementations, data indicative of an affinity of the accessor (at 762) may include data indicative of at least one of an affinity characteristic and/or an affiliation of the accessor at 766 (e.g. receiving data indicative of a listener's membership on an organizing committee of the Earshot Jazz Festival in Seattle).

Figure 31:
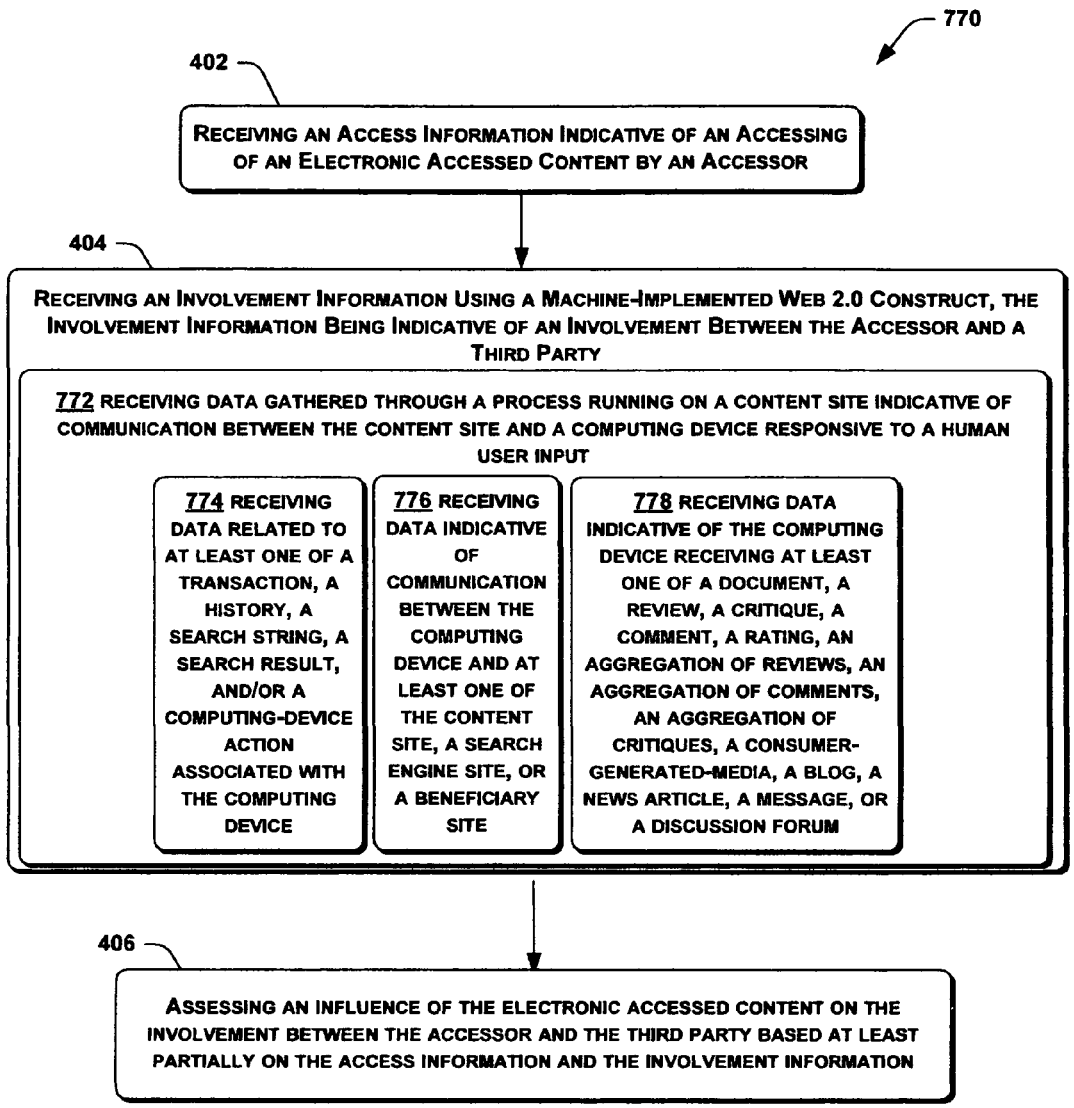

As illustrated by a process 770 shown in FIG. 31, in some implementations, involvement information using a machine-implemented Web 2.0 construct, the involvement information being indicative of an involvement between the accessor and a third party (at 404) may include data gathered through a process running on a content site indicative of communication between the content site and a computing device responsive to a human user input at 772 (e.g. receiving download records from a monitoring component operating on a site that provides ringtones regarding ringtones downloaded from the site to a person's mobile communication device). More specifically, data gathered through a process running on a content site indicative of communication between the content site and a computing device responsive to a human user input (at 772) may include data related to at least one of a transaction, a history, a search string, a search result, and/or a computing-device action associated with the computing device at 774 (e.g. receiving records from a monitoring component operating on an online driving-directions site showing that directions were downloaded from the site to a person's mobile communication device). In some implementations, data gathered through a process running on a content site indicative of communication between the content site and a computing device responsive to a human user input (at 772) may include data indicative of communication between the computing device and at least one of the content site, a search engine site, or a beneficiary site at 776 (e.g. receiving records from a monitoring component operating on an online search engine site showing search strings entered on the search engine site by a person's computing device). Similarly, data gathered through a process running on a content site indicative of communication between the content site and a computing device responsive to a human user input (at 772) may include data indicative of the computing device receiving at least one of a document, a review, a critique, a comment, a rating, an aggregation of reviews, an aggregation of comments, an aggregation of critiques, a consumer-generated-media, a blog, a news article, a message, or a discussion forum at 778 (e.g. receiving records from a monitoring component operating on an online news site showing download histories of reviews and articles downloaded from the site to a person's personal data assistant).

Figure 32:
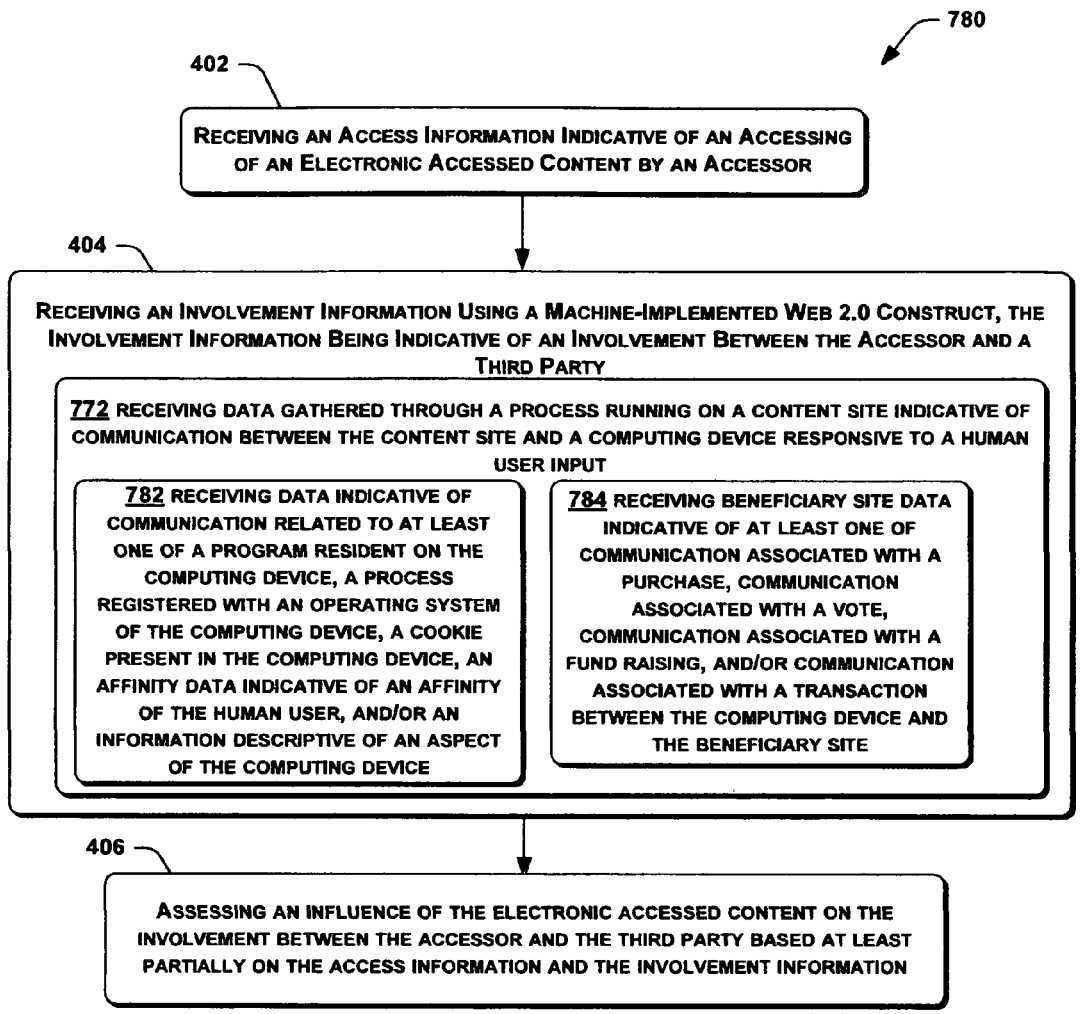

In further implementations, such as a process 780 shown in FIG. 32, data gathered through a process running on a content site indicative of communication between the content site and a computing device responsive to a human user input (at 772) may include data indicative of communication related to at least one of a program resident on the computing device, a process registered with an operating system of the computing device, a cookie present in the computing device, an affinity data indicative of an affinity of the human user, and/or an information descriptive of an aspect of the computing device at 782 (e.g. receiving records from a monitoring component operating on an online driving-directions site showing that directions were downloaded from the site to a navigational program residing on a person's mobile communication device). In some implementations, data gathered through a process running on a content site indicative of communication between the content site and a computing device responsive to a human user input (at 772) may include beneficiary site data indicative of at least one of communication associated with a purchase, communication associated with a vote, communication associated with a find raising, and/or communication associated with a transaction between the computing device and the beneficiary site at 784 (e.g. receiving contribution records from a radio station, such as a publicly-funded radio station, indicative of a donation associated provided from the computing device to the radio station).

Figure 33:
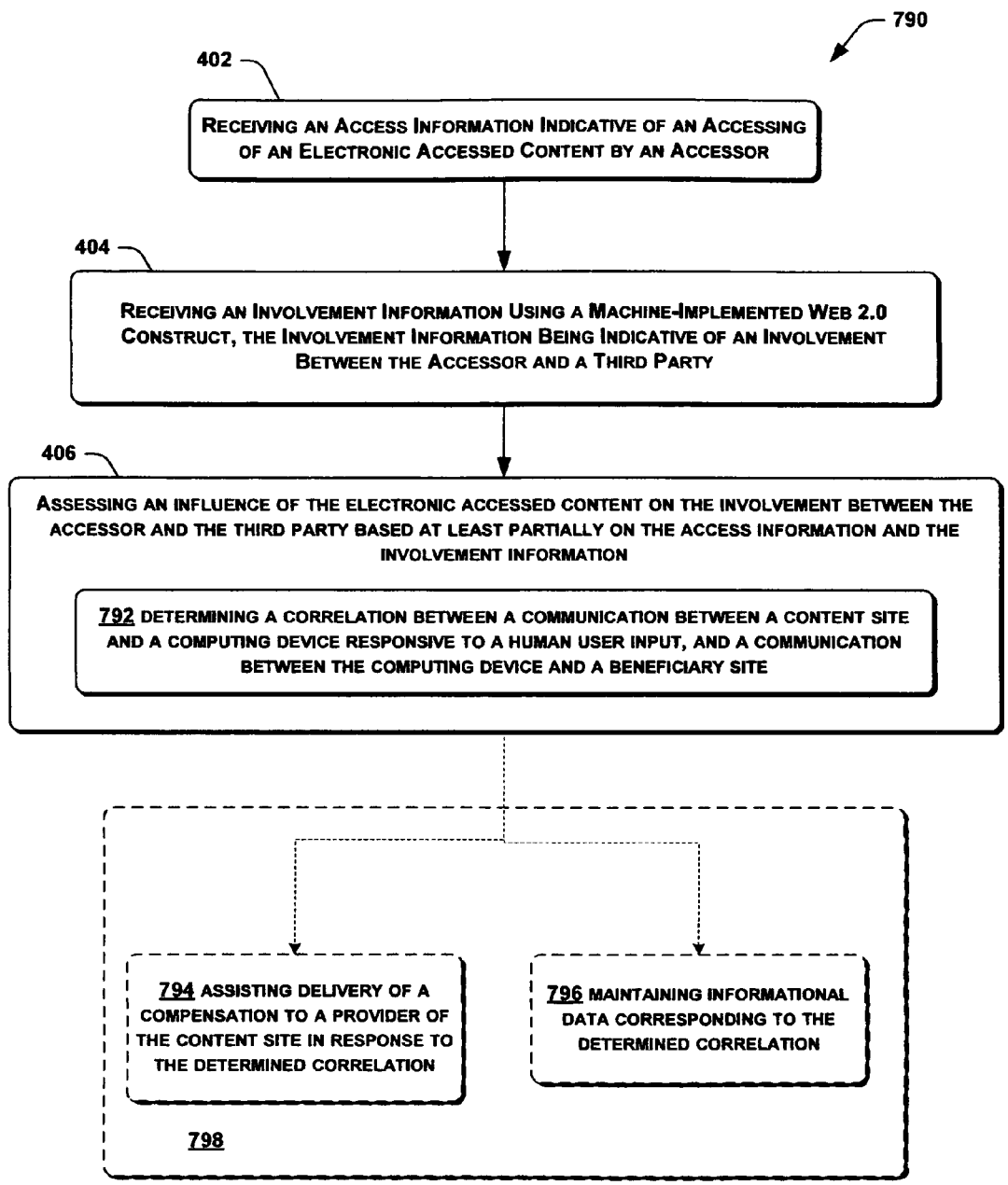
Figure 34:
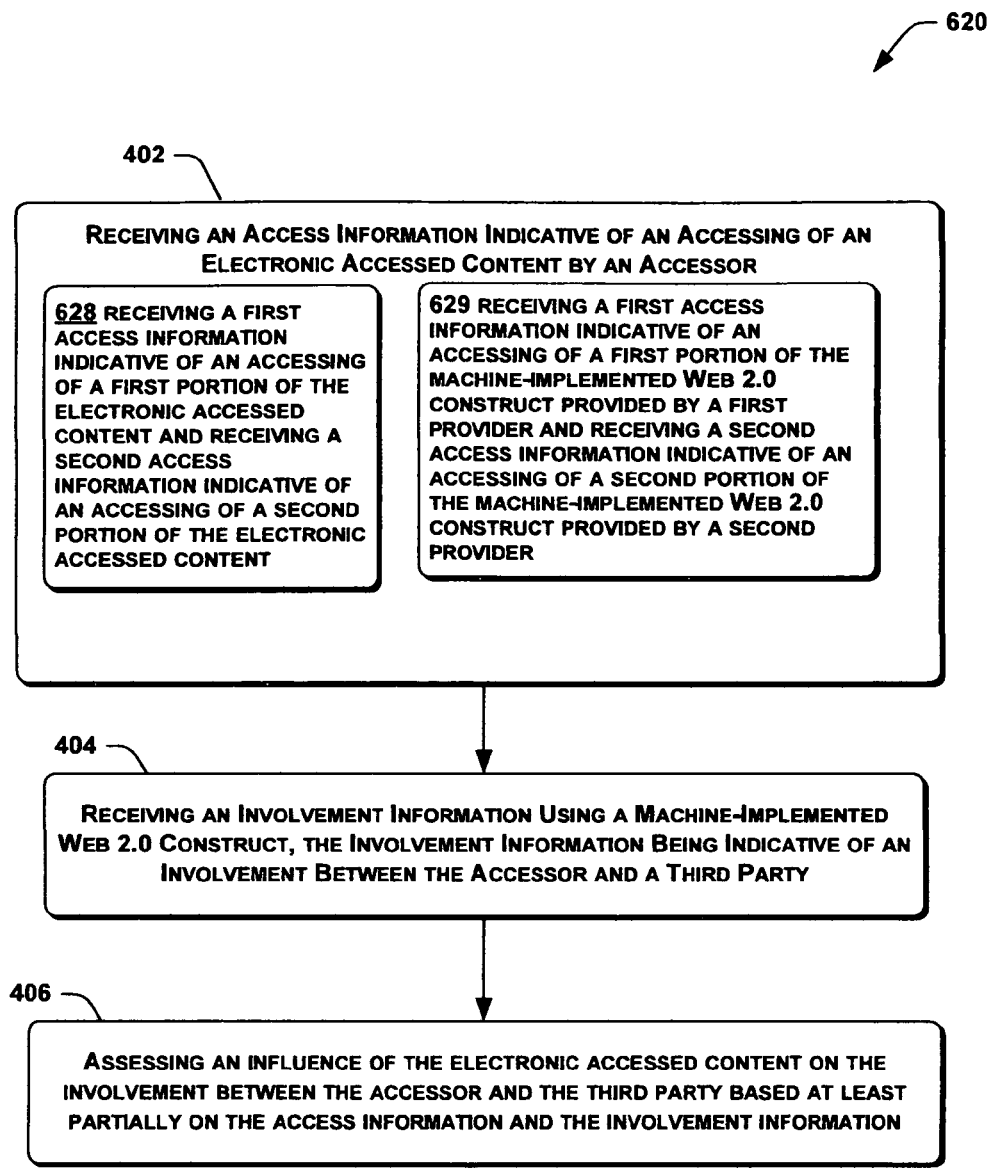
Figure 35:
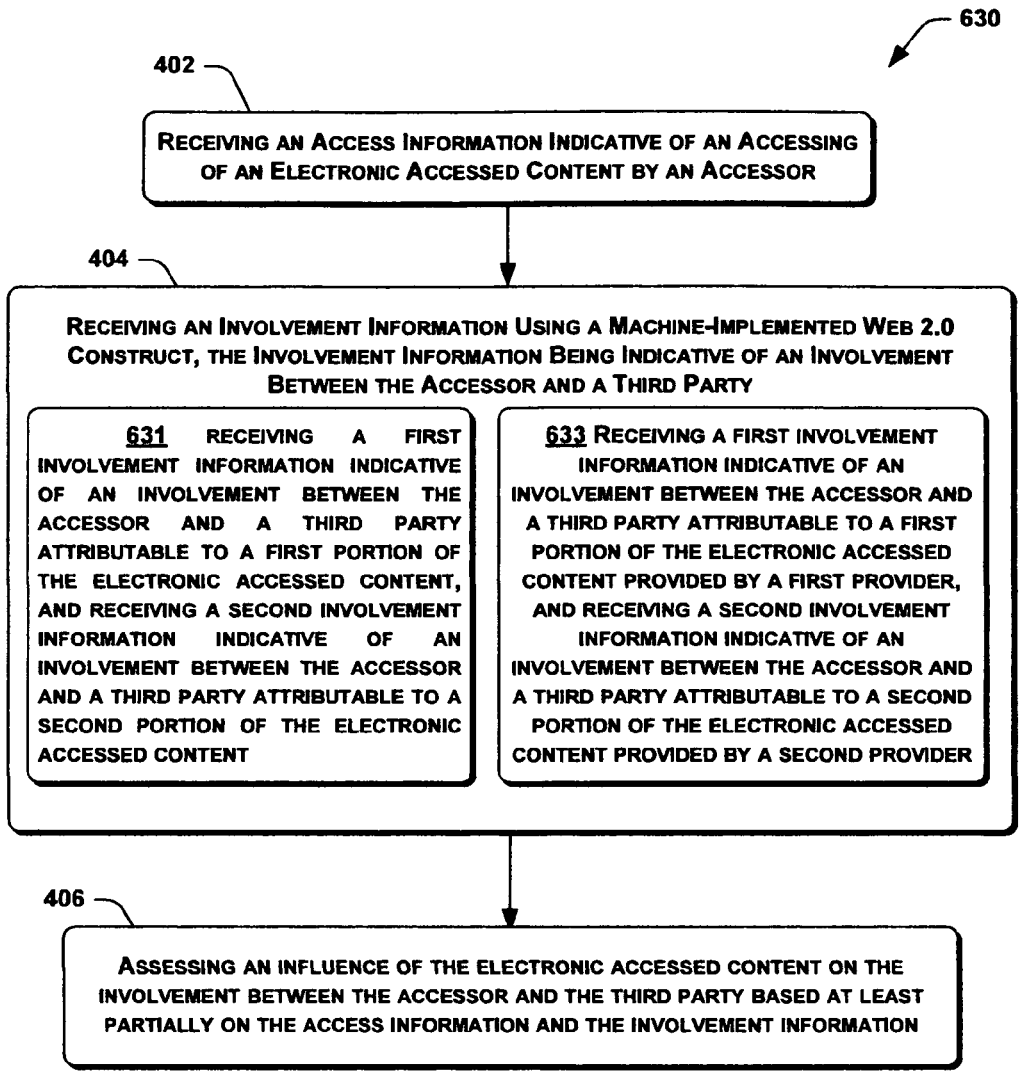
Figure 36:
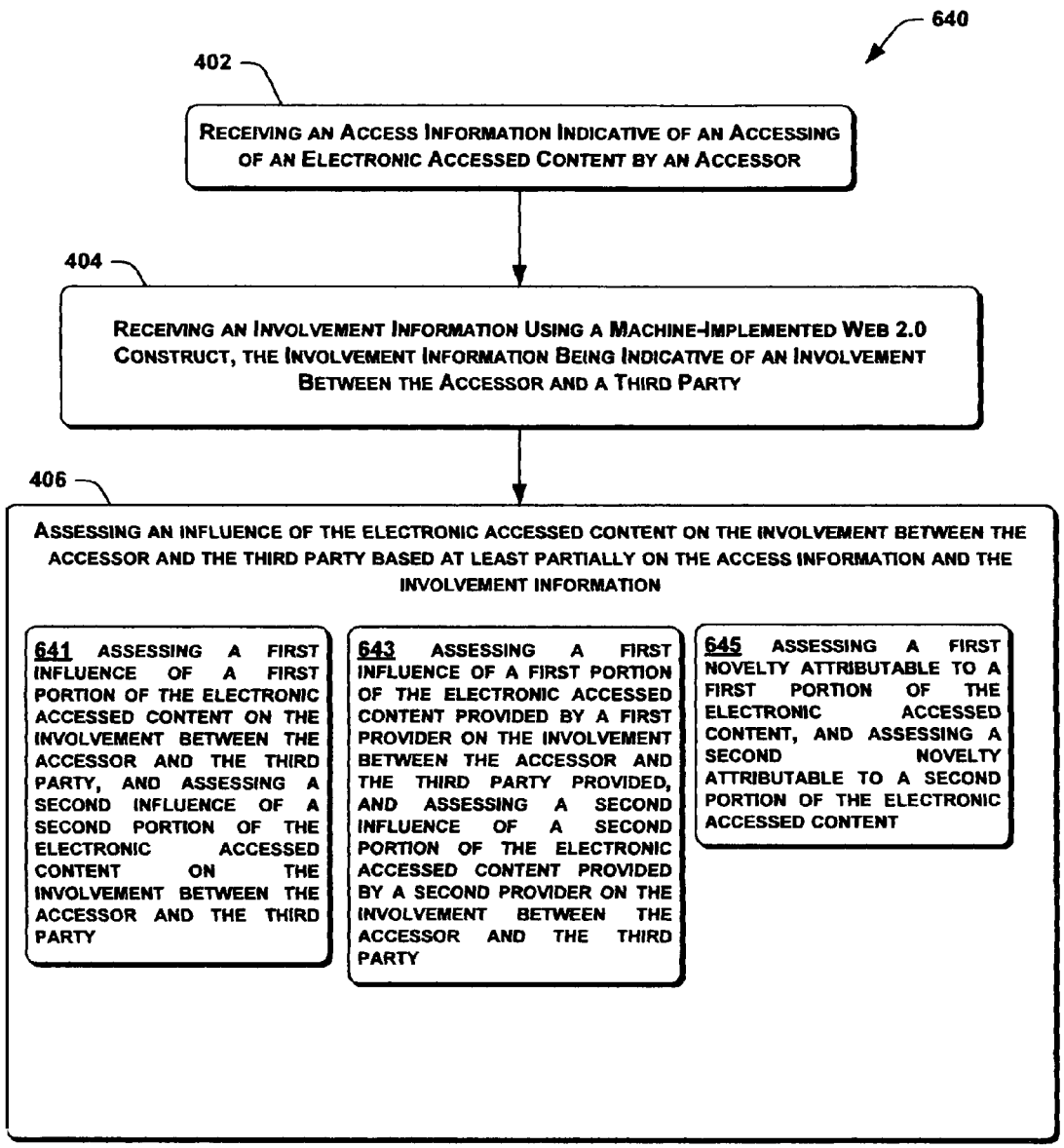

As shown in FIG. 33, in some implementations such as a process 790, assess an influence of the electronic accessed content on the involvement between the accessor and the third party based at least partially on the access information and the involvement information (at 406) may include a correlation between a communication between a content site and a computing device responsive to a human user input, and a communication between the computing device and a beneficiary site at 792 (e.g. determining a high-probability correlation between a consumer viewing a product review on a site of an information broker and the consumer's subsequent purchase of the product and an on-line retail site). In some implementations, the process 790 may further include delivery of a compensation to a provider of the content site in response to the determined correlation at 794 (e.g. performing an online deposit to a bank account of an owner of electronic assessed content based on a high-probability correlation), or informational data corresponding to the determined correlation at 796 (e.g. storing data regarding purchase-and-sale transaction correlations in a memory), or both at 798.

It may be noted that access information indicative of an accessing of an electronic accessed content by an accessor (at 402 of FIG. 5) may occur in other ways. For example, in some implementations, such as a process 620 shown in FIG. 34, access information indicative of an accessing of an electronic accessed content by an accessor (at 402) may include a first access information indicative of an accessing of a first portion of the electronic accessed content and a second access information indicative of an accessing of a second portion of the electronic accessed content at 628 (e.g. receiving first data indicative of an accessing of a first product review of an aggregation of product reviews and receiving a second data indicative of an accessing of a second product review of the aggregation of product reviews). Similarly, in some implementations, access information indicative of an accessing of an electronic accessed content by an accessor (at 402) may include a first access information indicative of an accessing of a first portion of a machine-implemented Web 2.0 construct provided by a first provider and a second access information indicative of an accessing of a second portion of the machine-implemented Web 2.0 construct provided by a second provider at 629 (e.g. receiving first data indicative of an accessing of a web service portion of a mashup of content, and receiving second data indicative of an accessing of a Flash application portion of the mashup of content).

Similarly, involvement information using a machine-implemented Web 2.0 construct, the involvement information being indicative of an involvement between the accessor and a third party (at 404 of FIG. 5) may be accomplished in a variety of additional ways. For example, in some implementations, such as a process 630 shown in FIG. 35, involvement information using a machine-implemented Web 2.0 construct, the involvement information being indicative of an involvement between the accessor and a third party (at 404) may include a first involvement information indicative of an involvement between the accessor and a third party attributable to a first portion of the electronic accessed content and a second involvement information indicative of an involvement between the accessor and a third party attributable to a second portion of the electronic accessed content at 631 (e.g. receiving first data indicative of a first period spent by a consumer shopping at an online retail facility attributable to a first article from an aggregation of product-related articles, and receiving second data indicative of a second period spent by the consumer shopping at the online retail facility attributable to a second article from the aggregation). Similarly, in further implementations involvement information using a machine-implemented Web 2.0 construct, the involvement information being indicative of an involvement between the accessor and a third party (at 404) may include a first involvement information indicative of an involvement between the accessor and a third party attributable to a first portion of the electronic accessed content provided by a first provider and a second involvement information indicative of an involvement between the accessor and a third party attributable to a second portion of the electronic accessed content provided by a second provider at 633 (e.g. receiving first data indicative of a first surfing period spent by a potential soldier surfing information on goarmy.com attributable to a first promotional piece of an aggregation of pieces provided by a former soldier, and receiving second data indicative of a second surfing period spent by the potential soldier attributable to a second promotional piece of the aggregation provided by a current soldier).

In still other implementations, assess an influence of the electronic accessed content on the involvement between the accessor and the third party based at least partially on the access information and the involvement information (e.g., at 406) may be accomplished in a variety of ways. For example, in some implementations, such as a process 640 shown in FIG. 36, assess an influence of the electronic accessed content on the involvement between the accessor and the third party based at least partially on the access information and the involvement information (at 406) may include a first influence of a first portion of the electronic accessed content on the involvement between the accessor and the third party and a second influence of a second portion of the electronic accessed content on the involvement between the accessor and the third party at 641 (e.g. assessing a first influence of a first product review from a consumer e-magazine on an automobile purchase between a buyer and a dealership and assessing a second influence of a second product review from the consumer e-magazine on the automobile purchase). In further implementations, assess an influence of the electronic accessed content on the involvement between the accessor and the third party based at least partially on the access information and the involvement information (at 406) may include a first influence of a first portion of the electronic accessed content provided by a first provider on the involvement between the accessor and the third party provided and a second influence of a second portion of the electronic accessed content provided by a second provider on the involvement between the accessor and the third party at 643 (e.g. assessing a first influence of a first product review from a consumer e-magazine provided by a consumer watchdog group on an automobile purchase between a buyer and a dealership and assessing a second influence of a second product review from the consumer e-magazine provided by an automotive test group on the automobile purchase). Similarly, assess an influence of the electronic accessed content on the involvement between the accessor and the third party based at least partially on the access information and the involvement information (at 406) may include a first novelty attributable to a first portion of the electronic accessed content and a second novelty attributable to a second portion of the electronic accessed content at 645 (e.g. assessing a first novelty attributable to a first product review from a consumer e-magazine and assessing a second novelty attributable to a second product review from the consumer e-magazine).

Figure 37:
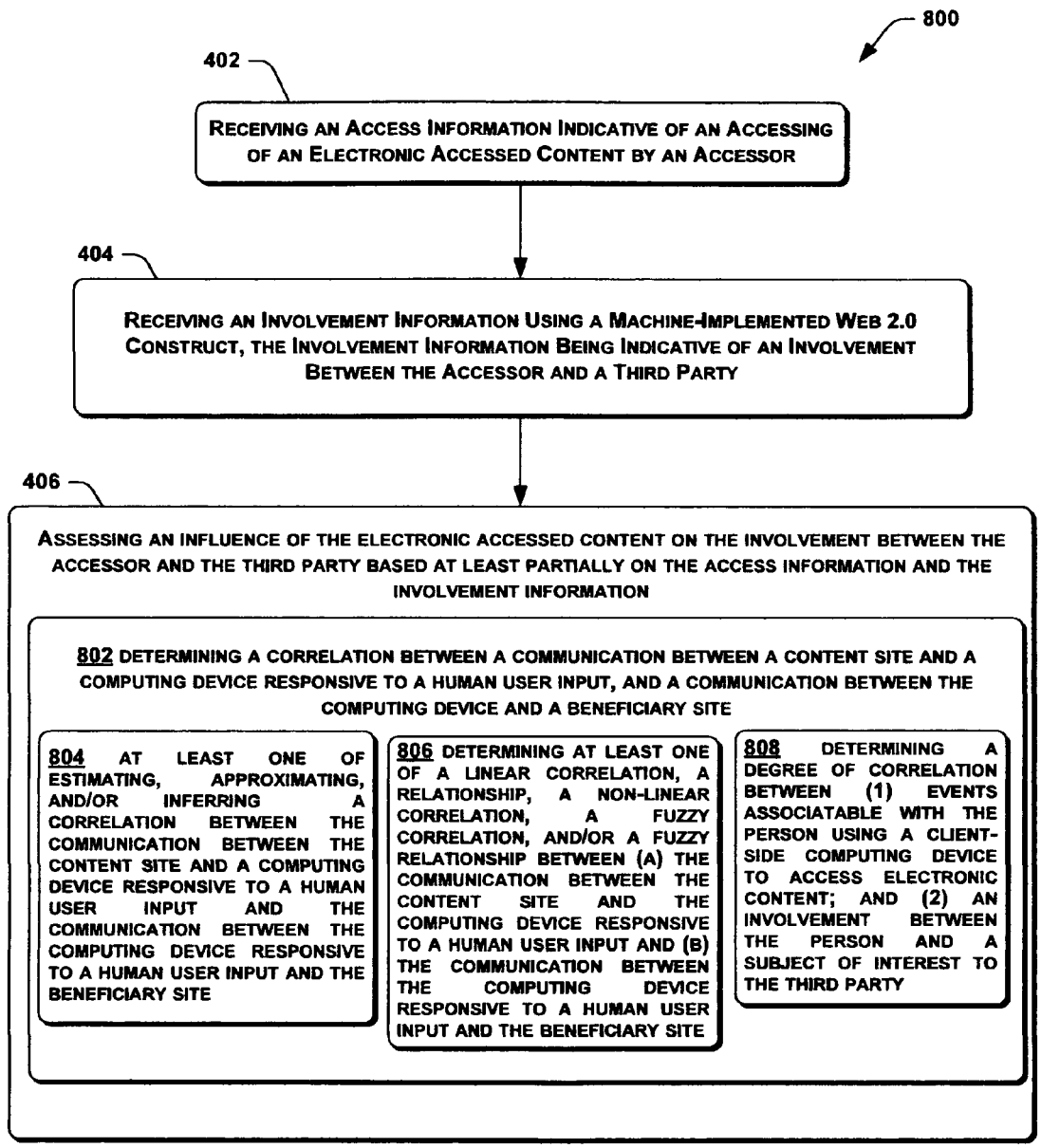

As illustrated in FIG. 37, in some implementations (e.g. process 800), assess an influence of the electronic accessed content on the involvement between the accessor and the third party based at least partially on the access information and the involvement information (at 406) may include determine a correlation between a communication between a content site and a computing device responsive to a human user input, and a communication between the computing device and a beneficiary site at 802 (e.g. determining that a download regarding rental products from a server to a handheld device is correlated to a rental of the rental product from a rental provider). More specifically, in some implementations, determine a correlation between a communication between a content site and a computing device responsive to a human user input, and a communication between the computing device and a beneficiary site (at 802) may include at least one of estimate, approximate, and/or infer a correlation between the communication between the content site and a computing device responsive to a human user input and the communication between the computing device responsive to a human user input and the beneficiary site at 804 (e.g. inferring that an upload regarding the attributes of product A from a server to a handheld device is correlated to a purchase of product A from a retailer).

Similarly, determine a correlation between a communication between a content site and a computing device responsive to a human user input, and a communication between the computing device and a beneficiary site (at 802) may include determine at least one of a linear correlation, a relationship, a non-linear correlation, a fuzzy correlation, and/or a fuzzy relationship between (a) the communication between the content site and the computing device responsive to a human user input and (b) the communication between the computing device responsive to a human user input and the beneficiary site at 806 (e.g. determining that a length of time spent by the accessor browsing a content regarding the attributes of product A is linearly related to a purchase of product A by the accessor from a retailer). In further implementations, determine a correlation between a communication between a content site and a computing device responsive to a human user input, and a communication between the computing device and a beneficiary site (at 802) may include determine a degree of correlation between (1) events associatable with the person using a client-side computing device to access electronic content; and (2) an involvement between the person and a subject of interest to the third party at 808 (e.g. determining a strong correlation between an accessor's browsing of content regarding the attributes of service X and the accessor's subsequent purchase of service Y from a service retailer).

Figure 38:
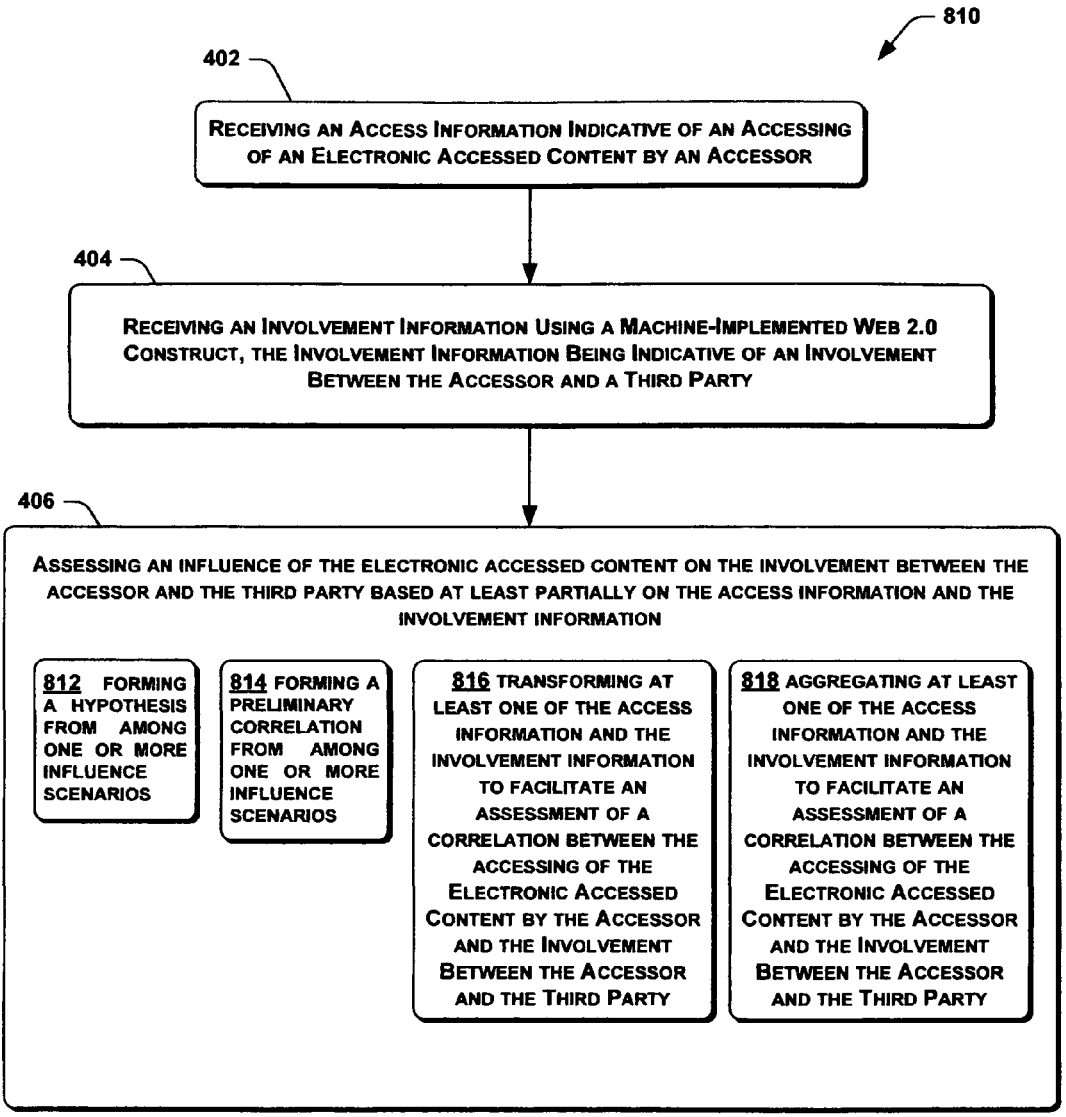

In still other implementations, such as a process 810 shown in FIG. 38, assess an influence of the electronic accessed content on the involvement between the accessor and the third party based at least partially on the access information and the involvement information (at 406) may include form a hypothesis from among one or more influence scenarios at 812 (e.g. forming a hypothesis that the accessor was strongly influenced from among several possible influence levels). Similarly, assess an influence of the electronic accessed content on the involvement between the accessor and the third party based at least partially on the access information and the involvement information (at 406) may include a first influence of a first electronic accessed content provided by a first provider based at least partially on the first access information at 814 (e.g. deciding that the accessor's involvement is strongly correlated with the involvement from among several possible correlation levels).

In other implementations, assess an influence of the electronic accessed content on the involvement between the accessor and the third party based at least partially on the access information and the involvement information (at 406) may include transform at least one of the access information and the involvement information to facilitate an assessment of a correlation between the accessing of the electronic accessed content by the accessor and the involvement between the accessor and the third party at 816 (e.g. filtering outlying instances of the access information and the involvement information to improve the correlation assessment between the accessing and the involvement). Further, assess an influence of the electronic accessed content on the involvement between the accessor and the third party based at least partially on the access information and the involvement information (at 406) may include aggregate at least one of the access information and the involvement information to facilitate an assessment of a correlation between the accessing of the electronic accessed content by the accessor and the involvement between the accessor and the third party at 818 (e.g. compiling historical data regarding the access information and the involvement information to improve the correlation assessment between the accessing and the involvement).

Figure 39:
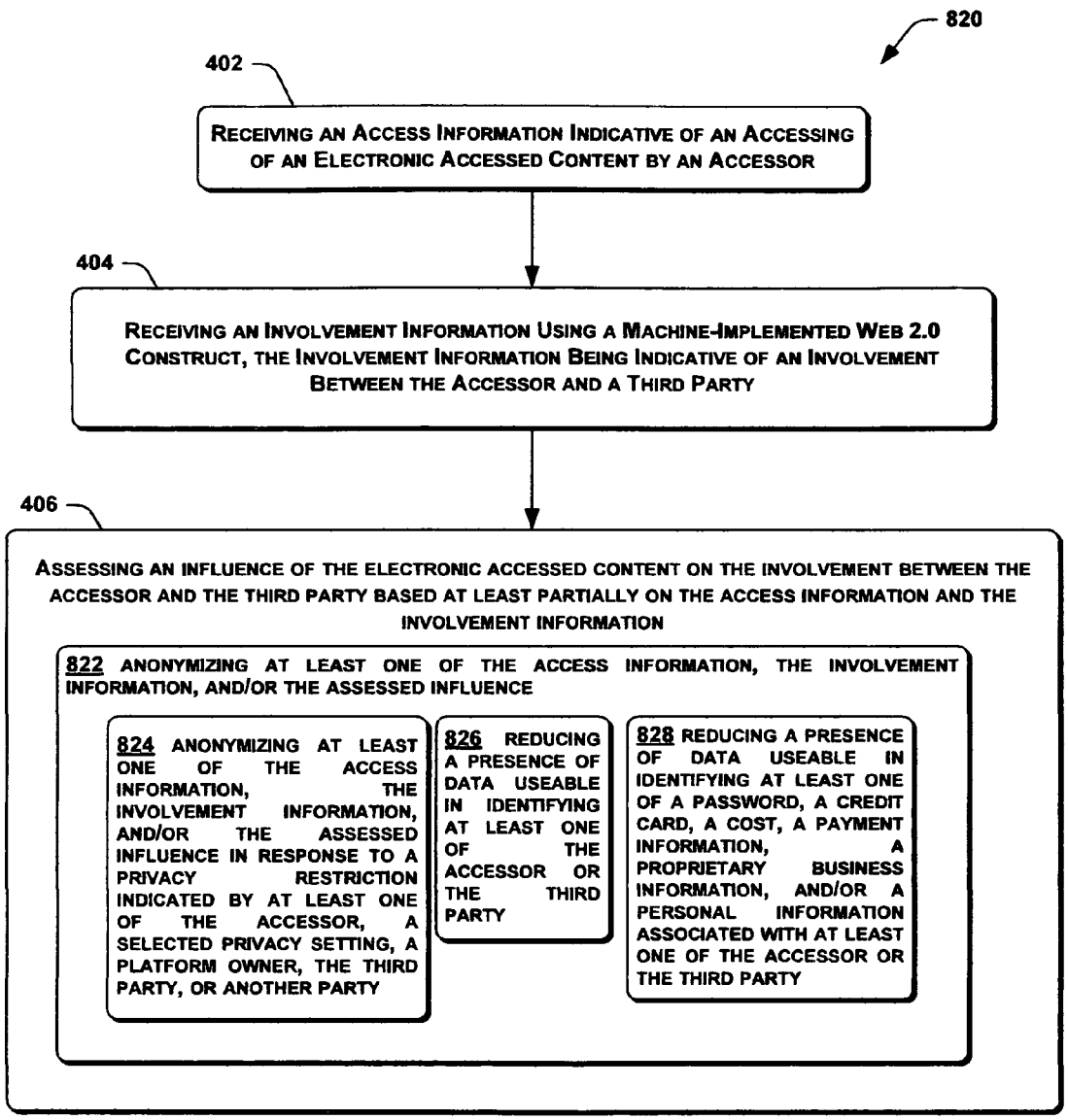

In some implementations, such as a process 820 shown in FIG. 39, assess an influence of the electronic accessed content on the involvement between the accessor and the third party based at least partially on the access information and the involvement information (at 406) may include anonymize at least one of the access information, the involvement information, and/or the assessed influence at 822 (e.g. deleting identifying information regarding an identity of the accessor from the access information and the involvement information). More specifically, anonymize at least one of the access information, the involvement information, and/or the assessed influence (at 822) may include anonymize at least one of the access information, the involvement information, and/or the assessed influence in response to a privacy restriction indicated by at least one of the accessor, a selected privacy setting, a platform owner, the third party, or another party at 824 (e.g. deleting identifying information regarding an identity of the accessor from the access information and the involvement information in accordance with a privacy policy election by the accessor).

In other implementations, anonymize at least one of the access information, the involvement information, and/or the assessed influence (at 822) may include reduce a presence of data useable in identifying at least one of the accessor or the third party at 826 (e.g. generalizing identity information regarding the accessor to a general type of accessor, and generalizing identity information regarding the third party to a general type of third party, from the access information and the involvement information). In further implementations, anonymize at least one of the access information, the involvement information, and/or the assessed influence (at 822) may include reduce a presence of data useable in identifying at least one of a password, a credit card, a cost, a payment information, a proprietary business information, and/or a personal information associated with at least one of the accessor or the third party at 828 (e.g. redacting information regarding details of a consumer transaction between the accessor and the third party from the access information and the involvement information).

Figure 40:
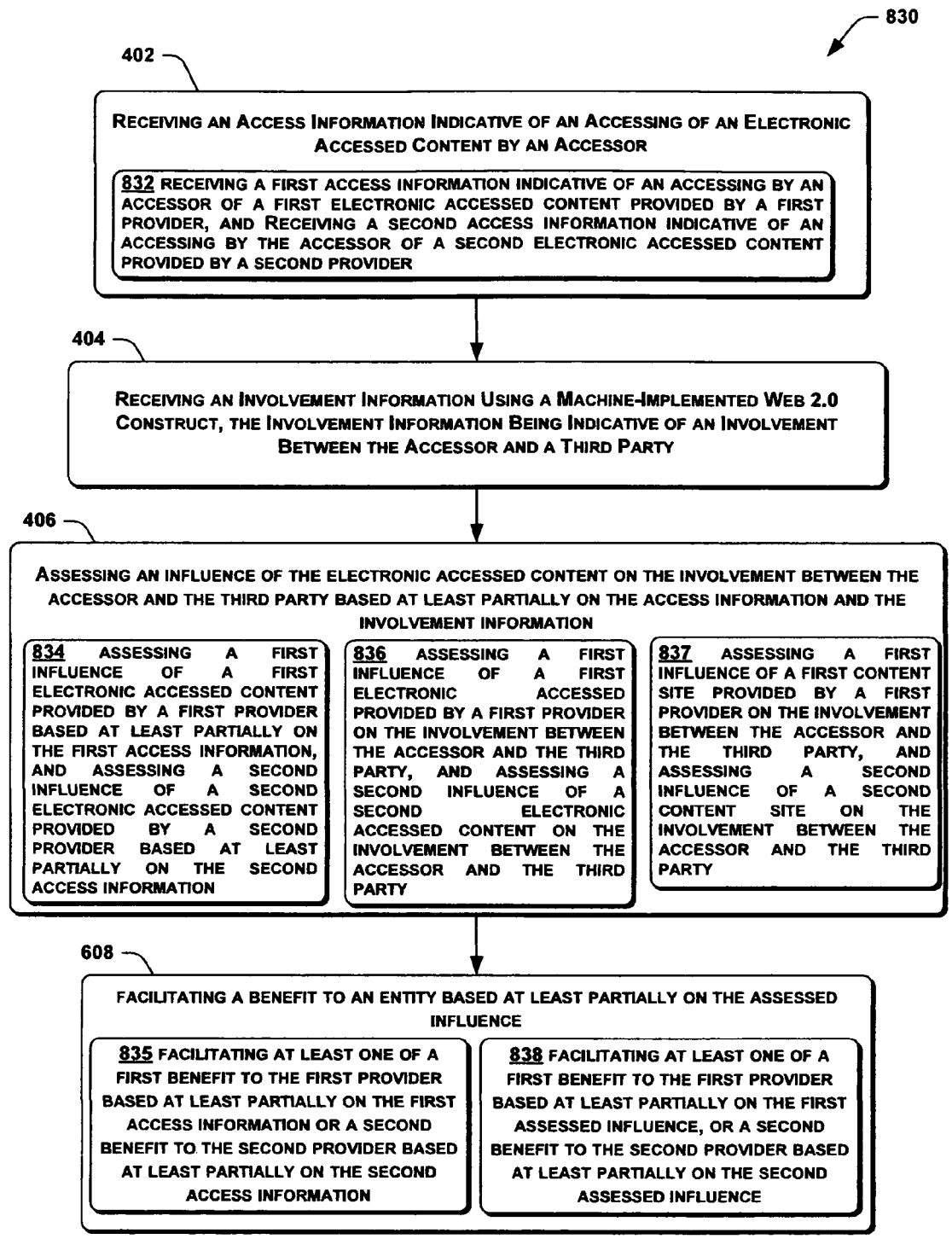

In yet another implementation, a process 830 shown in FIG. 40 may include access information indicative of an accessing of an electronic accessed content by an accessor at 402 (e.g. receiving "hit," access time, or "cursor hovering" information associated with an accessor), involvement information using a machine-implemented Web 2.0 construct, the involvement information being indicative of an involvement between the accessor and a third party at 404 (e.g. receiving information indicating a commercial transaction between a consumer and a provider), assess an influence of the electronic accessed content on the involvement between the accessor and the third party based at least partially on the access information and the involvement information at 406 (e.g. assessing that the accessed content had a moderate influence on the commercial transaction between a consumer and a provider), and facilitate a benefit to an entity based at least partially on the assessed influence at 608 (e.g. adding points to an account of a provider of the accessed content commensurate with the moderate influence).

More specifically, in some implementations, access information indicative of an accessing of an electronic accessed content by an accessor (at 402) may include a first access information indicative of an accessing by an accessor of a first electronic accessed content provided by a first provider and a second access information indicative of an accessing by the accessor of a second electronic accessed content provided by a second provider at 832. Similarly, assess an influence of the electronic accessed content on the involvement between the accessor and the third party based at least partially on the access information and the involvement information (at 406) may include a first influence of a first electronic accessed content provided by a first provider based at least partially on the first access information and a second influence of a second electronic accessed content provided by a second provider based at least partially on the second access information at 834. And in some implementations, facilitate a benefit to an entity based at least partially on the assessed influence (at 608) may include at least one of a first benefit to the first provider based at least partially on the first access information, or a second benefit to the second provider based at least partially on the second access information at 834.

As further shown in FIG. 40, in other implementations, assess an influence of the electronic accessed content on the involvement between the accessor and the third party based at least partially on the access information and the involvement information (at 406) may include a first influence of a first electronic accessed content provided by a first provider on the involvement between the accessor and the third party and a second influence of a second electronic accessed content provided by a second provider on the involvement between the accessor and the third party at 836. Similarly, in some implementations, assess an influence of the electronic accessed content on the involvement between the accessor and the third party based at least partially on the access information and the involvement information (at 406) may include a first influence of a first content site provided by a first provider on the involvement between the accessor and the third party and a second influence of a second content site provided by a second provider on the involvement between the accessor and the third party at 837. In addition, facilitate a benefit to an entity based at least partially on the assessed influence at 608 may include delivery of at least one of a first benefit to the first provider based at least partially on the first assessed influence, or a second benefit to the second provider based at least partially on the second assessed influence at 838.

It should be appreciated that the particular embodiments of systems and processes described herein are merely possible implementations of the present disclosure, and that the present disclosure is not limited to the particular implementations described herein and shown in the accompanying figures. For example, in alternate implementations, certain acts need not be performed in the order described, and may be modified, and/or may be omitted entirely, depending on the circumstances. Moreover, in various implementations, the acts described may be implemented by a computer, controller, processor, programmable device, or any other suitable device, and may be based on instructions stored on one or more computer-readable media or otherwise stored or programmed into such devices. In the event that computer-readable media are used, the computer-readable media can be any available media that can be accessed by a device to implement the instructions stored thereon.

Various methods, systems, and techniques may be described and implemented in the general context of computer-executable instructions, such as program modules, executed by one or more processors or other devices. Generally, program modules include routines, programs, objects, components, data structures, etc. that perform particular tasks or implement particular abstract data types. Typically, the functionality of the program modules may be combined or distributed as desired in various alternate embodiments. In addition, embodiments of these methods, systems, and techniques may be stored on or transmitted across some form of computer readable media.

It may also be appreciated that there may be little distinction between hardware and software implementations of aspects of systems and methods disclosed herein. The use of hardware or software may generally be a design choice representing cost vs. efficiency tradeoffs, however, in certain contexts the choice between hardware and software can become significant. Those having skill in the art will appreciate that there are various vehicles by which processes, systems, and technologies described herein can be effected (e.g., hardware, software, firmware, or combinations thereof), and that a preferred vehicle may vary depending upon the context in which the processes, systems, and technologies are deployed. For example, if an implementer determines that speed and accuracy are paramount, the implementer may opt for a mainly hardware and/or firmware vehicle. Alternatively, if flexibility is paramount, the implementer may opt for a mainly software implementation. In still other implementations, the implementer may opt for some combination of hardware, software, and/or firmware. Hence, there are several possible vehicles by which the processes and/or devices and/or other technologies described herein may be effected, and which may be desired over another may be a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Those skilled in the art will recognize that it is common within the art to describe devices and/or processes in the fashion set forth herein, and thereafter use standard engineering practices to integrate such described devices and/or processes into workable systems having the described functionality. That is, at least a portion of the devices and/or processes described herein can be developed into a workable system via a reasonable amount of experimentation.

The herein described aspects and drawings illustrate different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" (or "operatively connected," or "operatively coupled") to each other to achieve the desired functionality, and any two components capable of being so associated can also be viewed as being "operably couplable" (or "operatively couplable") to each other to achieve the desired functionality. Specific examples of operably couplable include but are not limited to physically mateable and/or physically interacting components and/or wirelessly interactable and/or wirelessly interacting components and/or logically interacting and/or logically interactable components.

Those skilled in the art will recognize that some aspects of the embodiments disclosed herein can be implemented in standard integrated circuits, and also as one or more computer programs running on one or more computers, and also as one or more software programs running on one or more processors, and also as firmware, as well as virtually any combination thereof. It will be further understood that designing the circuitry and/or writing the code for the software and/or firmware could be accomplished by a person skilled in the art in light of the teachings and explanations of this disclosure.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. For example, in some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

As a further example of "open" terms in the present specification and claims, it will be understood that usage of a language construction "A or B" is generally interpreted as a non-exclusive "open term" meaning: A alone, B alone, and/or A and B together.

Although various features have been described in considerable detail with reference to certain preferred embodiments, other embodiments are possible. Therefore, the spirit or scope of the appended claims should not be limited to the description of the embodiments contained herein.

What is claimed is:

1. A system, comprising:
    at least one communication component configured to receive:
        access information indicative of an accessing of an electronic accessed content by an accessor; and
        involvement information indicative of an involvement between the accessor and a third party,
        wherein at least one of the accessing of the electronic accessed content or the involvement between the accessor and the third party includes at least using a machine-implemented Web 2.0 construct;
    an influence assessment component configured to assess an influence of the electronic accessed content on the involvement between the accessor and the third party based at least partially on the access information and the involvement information; and
    a benefit facilitation component configured to facilitate a benefit to an entity based at least partially on the assessed influence.

2. The system of claim 1, wherein at least one communication component configured to receive access information indicative of an accessing of an electronic accessed content by an accessor comprises:
    at least one communication component configured to receive data indicative of an accessor accessing at least one of a first network-available electronic content having a first electronic-content portion or a second network-available electronic content having a second electronic-content portion.

3. The system of claim 2, wherein at least one communication component configured to receive data indicative of an accessor accessing at least one of a first network-available electronic content having a first electronic-content portion or a second network-available electronic content having a second electronic-content portion comprises:
    at least one communication component configured to receive data indicative of an accessor accessing at least one of a first network-available electronic content having a first electronic-content portion relevant to the third-party or a second network-available electronic content having a second electronic-content portion relevant to the third-party.

4. The system of claim 2, wherein at least one communication component configured to receive data indicative of an accessor accessing at least one of a first network-available electronic content having a first electronic-content portion or a second network-available electronic content having a second electronic-content portion comprises:
    at least one communication component configured to receive data indicative of an accessor viewing at least one of a first network-available electronic content having a first electronic-content portion or a second network-available electronic content having a second electronic-content portion.

5. The system of claim 1, wherein at least one communication component configured to receive involvement information indicative of an involvement between the accessor and a third party comprises:
    at least one communication component configured to receive data using a machine-implemented Web 2.0 construct indicative of a behavior by the accessor with respect to the third-party.

6. The system of claim 1, wherein at least one communication component configured to receive involvement information indicative of an involvement between the accessor and a third party comprises:
    at least one communication component configured to receive data using a machine-implemented Web 2.0 construct useable in inferring an involvement between the accessor and the third-party.

7. The system of claim 1, wherein at least one communication component configured to receive involvement information indicative of an involvement between the accessor and a third party comprises:
    at least one communication component configured to receive involvement information using a web service.

8. The system of claim 1, wherein at least one communication component configured to receive involvement information indicative of an involvement between the accessor and a third party comprises:
    at least one communication component configured to receive involvement information using an Ajax (Asynchronous JavaScript and XML (Extensible Markup Language)) application.

9. The system of claim 1, wherein at least one communication component configured to receive involvement information indicative of an involvement between the accessor and a third party comprises:
    at least one communication component configured to receive involvement information using a Flash application.

10. The system of claim 1, wherein at least one communication component configured to receive involvement information indicative of an involvement between the accessor and a third party comprises:

at least one communication component configured to receive involvement information using a mashup that includes the electronic accessed content and at least one of a web service, an Ajax application, a Flash application, an electronic content, or another electronic accessed content.

11. The system of claim 1, wherein at least one communication component configured to receive involvement information indicative of an involvement between the accessor and a third party comprises:
   at least one communication component configured to receive involvement information using an open-source machine-implemented Web 2.0 construct.

12. The system of claim 1, wherein at least one communication component configured to receive access information indicative of an accessing of an electronic accessed content by an accessor comprises:
   at least one communication component configured to receive access information indicative of an accessing of a machine-implemented Web 2.0 construct by an accessor.

13. The system of claim 12, wherein at least one communication component configured to receive access information indicative of an accessing of a machine-implemented Web 2.0 construct by an accessor comprises:
   at least one communication component configured to receive access information indicative of an accessing of an Ajax (Asynchronous JavaScript and XML (Extensible Markup Language)) application by an accessor.

14. The system of claim 12, wherein at least one communication component configured to receive access information indicative of an accessing of a machine-implemented Web 2.0 construct by an accessor comprises:
   at least one communication component configured to receive access information indicative of an accessing of a Web 2.0 electronic content by an accessor.

15. The system of claim 12, wherein at least one communication component configured to receive access information indicative of an accessing of a machine-implemented Web 2.0 construct by an accessor comprises:
   at least one communication component configured to receive access information indicative of an accessing by an accessor of a mashup that includes the machine-implemented Web 2.0 construct and at least one of a web service, an Ajax application, a Flash application, an electronic content, or another machine-implemented Web 2.0 construct.

16. The system of claim 1, further comprising:
   at least one content-providing component configured to provide electronic accessed content for access by the accessor.

17. The system of claim 16, wherein at least one content-providing component configured to provide electronic accessed content for access by the accessor comprises:
   at least one content-providing component configured to asynchronously provide electronic accessed content for access by the accessor.

18. The system of claim 16, wherein at least one content-providing component configured to provide electronic accessed content for access by the accessor comprises:
   at least one content-providing component configured to provide a mashup of the electronic accessed content with at least one other subject matter for access by the accessor.

19. The system of claim 16, wherein at least one content-providing component configured to provide electronic accessed content for access by the accessor comprises:

via an engine operable to communicate with a server that hosts the electronic accessed content.

20. The system of claim 16, wherein at least one content-providing component configured to provide electronic accessed content for access by the accessor comprises:
   at least one providing component configured to mash up the electronic accessed content with at least one of a web service, an Ajax application, a Flash application, an electronic content, or another electronic accessed content.

21. The system of claim 1, wherein at least one communication component configured to receive access information indicative of an accessing of an electronic accessed content by an accessor comprises:
   at least one communication component configured to receive access information from a monitoring component that is external relative to a provider of the electronic accessed content.

22. The system of claim 1, wherein at least one communication component configured to receive access information indicative of an accessing of an electronic accessed content by an accessor comprises:
   at least one communication component configured to receive access information from a monitoring component that is local relative to a provider of the electronic accessed content.

23. The system of claim 1, wherein at least one communication component configured to receive access information indicative of an accessing of an electronic accessed content by an accessor comprises:
   at least one communication component configured to receive access information from an engine loaded locally relative to the accessor.

24. The system of claim 1, wherein at least one communication component configured to receive access information indicative of an accessing of an electronic accessed content by an accessor comprises:
   at least one communication component configured to receive access information via an Ajax application loaded locally relative to the accessor.

25. The system of claim 1, wherein at least one communication component configured to receive access information indicative of an accessing of an electronic accessed content by an accessor comprises:
   at least one communication component configured to receive access information via an engine operable to render an interface accessible to the accessor.

26. The system of claim 1, wherein the influence assessment component configured to assess an influence of the electronic accessed content on the involvement between the accessor and the third party based at least partially on the access information and the involvement information comprises:
   an influence assessment component configured to determine the assessed influence using an assessment component that is local relative to a provider of the electronic accessed content.

27. The system of claim 1, wherein the influence assessment component configured to assess an influence of the electronic accessed content on the involvement between the accessor and the third party based at least partially on the access information and the involvement information comprises:
   an influence assessment component configured to determine the assessed influence using an engine loaded locally relative to the accessor.

28. The system of claim 1, wherein the influence assessment component configured to assess an influence of the electronic accessed content on the involvement between the accessor and the third party based at least partially on the access information and the involvement information comprises:
    an influence assessment component configured to determine the assessed influence using an Ajax application loaded locally relative to the accessor.

29. The system of claim 1, wherein the influence assessment component configured to assess an influence of the electronic accessed content on the involvement between the accessor and the third party based at least partially on the access information and the involvement information comprises:
    an influence assessment component configured to provide an indication of the assessed influence.

30. The system of claim 29, wherein the influence assessment component configured to provide an indication of the assessed influence comprises:
    an influence assessment component configured to provide an indication of the assessed influence for determining a benefit to a provider of the electronic accessed content.

31. The system of claim 29, wherein the influence assessment component configured to provide an indication of the assessed influence comprises:
    an influence assessment component configured to provide an indication of the assessed influence for determining a ranking of the electronic accessed content.

32. The system of claim 1, wherein the benefit facilitation component configured to facilitate a benefit to an entity based at least partially on the assessed influence comprises:
    a benefit facilitation component configured to facilitate delivery of at least one of a compensation, privilege, or reward to at least one of an owner of a first electronic content or an owner of a second electronic content in response to the assessed influence.

33. The system of claim 1, wherein the benefit facilitation component configured to facilitate a benefit to an entity based at least partially on the assessed influence comprises:
    a benefit facilitation component configured to facilitate delivery of a first benefit to an owner of a first electronic content and a second benefit to an owner of a second electronic content in response to an assessed influence by the first electronic content or the second electronic content on the involvement between the accessor and the third-party, a difference between the first benefit and the second benefit responsive to an evaluation of an influence of the first electronic content or an evaluation of an influence of the second electronic content.

34. The system of claim 1, wherein the benefit facilitation component configured to facilitate a benefit to an entity based at least partially on the assessed influence comprises:
    a benefit facilitation component configured to facilitate delivery of a benefit to an owner of a first electronic content or an owner of a second electronic content in response to the assessed influence by the first electronic content or the second electronic content on the involvement between the accessor and the third-party.

35. The system of claim 1, wherein the benefit facilitation component configured to facilitate a benefit to an entity based at least partially on the assessed influence comprises:
    a benefit facilitation component configured to facilitate a benefit to at least one entity based at least partially on at least one of a first influence attributable to a first portion of the electronic accessed content and a second influence attributable to a second portion of the electronic accessed content.

36. The system of claim 1, wherein at least one communication component configured to receive comprises:
    at least one communication component configured to receive data indicative of an affinity of the accessor.

37. The system of claim 1, wherein at least one communication component configured to receive involvement information indicative of an involvement between the accessor and a third party comprises:
    at least one communication component configured to receive data gathered through a process running on a content site indicative of communication between the content site and a computing device responsive to a human user input.

38. The system of claim 1, wherein the influence assessment component configured to assess an influence of the electronic accessed content on the involvement between the accessor and the third party based at least partially on the access information and the involvement information comprises:
    an influence assessment component configured to determine a correlation between a communication between a content site and a computing device responsive to a human user input, and a communication between the computing device and a beneficiary site.

39. The system of claim 1, wherein at least one communication component configured to receive involvement information indicative of an involvement between the accessor and a third party comprises:
    at least one communication component configured to receive:
        a first involvement information indicative of an involvement between the accessor and a third party attributable to a first portion of the electronic accessed content; and
        a second involvement information indicative of an involvement between the accessor and a third party attributable to a second portion of the electronic accessed content.

40. The system of claim 1, wherein at least one communication component configured to receive involvement information indicative of an involvement between the accessor and a third party comprises:
    an influence assessment component configured to assess:
        a first influence of a first portion of the electronic accessed content on the involvement between the accessor and the third party; and
        a second influence of a second portion of the electronic accessed content on the involvement between the accessor and the third party.

41. The system of claim 1, wherein at least one communication component configured to receive involvement information indicative of an involvement between the accessor and a third party comprises:
    an influence assessment component configured to assess:
        a first novelty attributable to a first portion of the electronic accessed content; and
        a second novelty attributable to a second portion of the electronic accessed content.

42. The system of claim 1, wherein the influence assessment component configured to assess an influence of the electronic accessed content on the involvement between the accessor and the third party based at least partially on the access information and the involvement information comprises:

an influence assessment component configured to anonymize at least one of the access information, the involvement information, or the assessed influence.

43. The system of claim 42, wherein the influence assessment component configured to anonymize at least one of the access information, the involvement information, or the assessed influence comprises:
an influence assessment component configured to reduce a presence of data useable in identifying at least one of the accessor or the third party.

44. The system of claim 1, wherein the influence assessment component configured to assess an influence of the electronic accessed content on the involvement between the accessor and the third party based at least partially on the access information and the involvement information comprises:
an influence assessment component configured to assess:
a first influence of a first electronic accessed content provided by a first provider based at least partially on a first access information; and
a second influence of a second electronic accessed content provided by a second provider based at least partially on a second access information.

45. The system of claim 1, wherein one or more of the at least one communication component, the influence assessment component, or the benefit facilitation component is at least partially implemented using one or more processing devices.

46. A system, comprising:
at least one determination component configured to:
determine access information indicative of an accessing of an electronic accessed content by an accessor; and
determine involvement information indicative of an involvement between the accessor and a third party, wherein at least one of the accessing of the electronic accessed content or the involvement between the accessor and the third party includes using a machine-implemented Web 2.0 construct; and
an influence assessment component configured to determine an influence of the electronic accessed content on the involvement between the accessor and the third party based at least partially on the access information and the involvement information.

47. The system of claim 46, wherein one or more of the at least one determination component or the influence assessment component is at least partially implemented using one or more processing devices.

48. The system of claim 46, wherein at least one determination component configured to determine access information indicative of an accessing of an electronic accessed content by an accessor comprises:
at least one determination component configured to determine access information indicative of an accessing of a machine-implemented Web 2.0 construct by an accessor.

49. The system of claim 48, wherein at least one determination component configured to determine access information indicative of an accessing of a machine-implemented Web 2.0 construct by an accessor comprises:
at least one determination component configured to determine access information indicative of an accessing of an Ajax (Asynchronous JavaScript and XML (Extensible Markup Language)) application by an accessor.

50. The system of claim 46, wherein at least one determination component configured to determine involvement information indicative of an involvement between the accessor and a third party comprises:

at least one determination component configured to determine involvement information using a mashup that includes the electronic accessed content and at least one of a web service, an Ajax application, a Flash application, an electronic content, or another electronic accessed content.

51. The system of claim 46, wherein the influence assessment component configured to assess an influence of the electronic accessed content on the involvement between the accessor and the third party based at least partially on the access information and the involvement information comprises:
an influence assessment component configured to facilitate a benefit associated with a provider of the electronic accessed content based at least partially on an assessed influence.

52. A system, comprising:
means for determining access information indicative of an accessing of an electronic accessed content by an accessor;
means for determining involvement information indicative of an involvement between the accessor and a third party, wherein at least one of the accessing of the electronic accessed content or the involvement between the accessor and the third party includes using a machine-implemented Web 2.0 construct; and
means for assessing an influence of the electronic accessed content on the involvement between the accessor and the third party based at least partially on the access information and the involvement information.

53. The system of claim 52, wherein at least one of the means for determining access information, the means for determining involvement information, or the means for assessing an influence is at least partially implemented using one or more processing devices.

54. The system of claim 52, wherein the means for determining access information indicative of an accessing of an electronic accessed content by an accessor comprises:
means for determining access information indicative of an accessing of a machine-implemented Web 2.0 construct by an accessor.

55. The system of claim 54, wherein the means for determining access information indicative of an accessing of a machine-implemented Web 2.0 construct by an accessor comprises:
means for determining access information indicative of an accessing by an accessor of a mashup that includes the machine-implemented Web 2.0 construct and at least one of a web service, an Ajax application, a Flash application, an electronic content, or another machine-implemented Web 2.0 construct.

56. The system of claim 52, wherein the means for assessing an influence of the electronic accessed content on the involvement between the accessor and the third party based at least partially on the access information and the involvement information comprises:
means for facilitating a benefit associated with a provider of the electronic accessed content based at least partially on an assessed influence.

57. The system of claim 52, wherein the means for determining involvement information indicative of an involvement between the accessor and a third party comprises:
means for determining involvement information using a Flash application.

* * * * *